United States Patent [19]
Chandler

[11] Patent Number: 5,884,245
[45] Date of Patent: Mar. 16, 1999

[54] DISCRIMINATE REDUCTION DATA ACQUISITION

[75] Inventor: Larry S. Chandler, Falls Church, Va.

[73] Assignee: The United States of America as represented by the Secretary of the Navy, Washington, D.C.

[21] Appl. No.: 898,003

[22] Filed: Jul. 25, 1997

Related U.S. Application Data

[63] Continuation of Ser. No. 417,340, Apr. 5, 1993, Pat. No. 5,619,432.

[51] Int. Cl.$^6$ ........................................ G06E 1/00
[52] U.S. Cl. ............................. 742/189; 364/735
[58] Field of Search ................. 702/85, 86, 89, 702/189, 199, 190; 364/718.03, 724.1

[56] References Cited

U.S. PATENT DOCUMENTS

| | | | |
|---|---|---|---|
| 4,709,234 | 11/1987 | Forehand et al. | 73/152.02 |
| 4,889,132 | 12/1989 | Hutcheson et al. | 600/481 |
| 4,920,489 | 4/1990 | Hubelbank et al. | 600/515 |
| 5,263,486 | 11/1993 | Jeffreys | 600/517 |
| 5,475,628 | 12/1995 | Adams et al. | 364/724.1 |
| 5,495,432 | 2/1996 | Ho | 364/724.1 |

*Primary Examiner*—Louis Arana
*Assistant Examiner*—Craig Steven Miller
*Attorney, Agent, or Firm*—Howard Kaiser

[57] ABSTRACT

Discriminate reduction data processing is disclosed as means of providing multivariate linear and nonlinear data reduction for the evaluation of statistically representative approximating parameters which effectively minimize parametric expressions representing sums of normalized datum variances. Weight factors are provided as products of datum error deviation coordinate normalizing proportions to account for nonlinearities, nonuniform error distributions, variable precision uncertainties. Selective data sampling is provided so as not to require certain transformation weight factor coordinate normalizing proportions. Conformal analysis is provided as an optional replacement for regression analysis to account for errors in more than a single variable parameter. Nested parameter evaluation is provided to evaluate parameters that are embedded within term functions. Applications and enhancements include provisions for general forms of curve fitting, data transformation, function approximation and corresponding forms of real time linear and nonlinear data processing. A logic control unit is configured to provide control signals to effectuate data reduction whereby a representation is provided.

20 Claims, 22 Drawing Sheets

SAMPLE BIVARIATE APPLICATION OF DISCRIMINATE RECTIFICATION

1. EXPRESS ASSEMBLED INFORMATION BY REPRESENTATIVE DEPENDENT AND INDEPENDENT COORDINATE POINTS (FOR EXAMPLE, $r_i$ AND $s_i$).

ASSEMBLED INFORMATION REPRESENTED BY THE
COORDINATE POINTS, $(r_i, s_i)$ IN A $r, s$ COORDINATE SYSTEM.

3. REPRESENT THE UNCERTAINTY PROBABILITIES IN A NONSKEWED NONBIASED FORM EXPRESSED RELATIVE TO FUNDAMENTAL VARIABLE PARAMETERS (FOR EXAMPLE, x AND y).

4. ESTABLISH A RELATIONSHIP BETWEEN FUNDAMENTAL COORDINATES AND REPRESENTATIVE ONES.

5. TRANSFORM THE REPRESENTATIVE COORDINATE POINTS TO A FUNDAMENTAL COORDINATE SYSTEM WHICH WILL PROVIDE FOR AN ASSUMED NONSKEWED NONBIASED UNCERTAINTY DISTRIBUTION.

6. DETERMINE AN APPROPRIATE APPROXIMATIVE FUNCTION.
$Y = Y(X, A, B)$.

DETERMINE AN APPROPRIATE FORM FOR THE
TRANSFORMATION WEIGHT FACTOR.

$$W \approx \left| \frac{C}{\left(\frac{\partial G}{\partial X} - A \frac{\partial F}{\partial X}\right)\left(\frac{\partial G}{\partial Y} - A \frac{\partial F}{\partial Y}\right)} \right|$$

PERFORM DISCRIMINATE g ON f AND f ON g
REGRESSION ANALYSIS.

DETERMINE AN APPROPRIATE FORM FOR THE TRANSFORMATION WEIGHT FACTOR.

$$W \approx \left| \frac{C}{\left(\frac{\partial G}{\partial X} - A\frac{\partial F}{\partial X}\right)\left(\frac{\partial G}{\partial Y} - A\frac{\partial F}{\partial Y}\right)} \right|.$$

PERFORM DISCRIMINATE CONFORMAL ANALYSIS.

CHARACTERIZE THE ASSEMBLED INFORMATION WITH THE
APPROPRIATE PARAMETRIC REPRESENTATION.

```
┌─────────────────────────────────┐
│   TWO PARAMETER ITERATION       │
│   (MINIMIZING DIFFERENCES)      │
└─────────────────────────────────┘
                │
                ▼
┌─────────────────────────────────┐
│   Set initial estimates         │
│   for parameters A and B.       │
│   EA = estimate of A            │
│   EB = estimate of B            │
└─────────────────────────────────┘
                │
                ▼
┌─────────────────────────────────┐
│ Preset iteration parameters.    │
│ nsc = number of search cycles   │
│ difA = A estimate difference    │
│ dif2 = B estimate difference    │
│   Adis = A discrepancy          │
│   Bdis = B discrepancy          │
│   Aie = A iteration error       │
│   Bie = B iteration error       │
│   ic = iteration counter    76  │
└─────────────────────────────────┘
                │
                ▼
              ( A )
                │
                ▼
┌─────────────────────────────────┐
│   Compute new values            │
│   for parameters A and B        │
│   using estimated               │
│   values, EA and EB,            │
└─────────────────────────────────┘
                │
                ▼
┌─────────────────────────────────┐
│   Store previous values         │
│   for estimate differences      │
│       oAdis = Adis              │
│       oBdis = Bdis          77  │
└─────────────────────────────────┘
                │
                ▼
              ( B )
```

FIG. 11A

DISCRIMINATE REDUCTION DATA ACQUISITION

This application is a continuation of application Ser. No. 08/417,340, filed 5 Apr. 1995, now U.S. Pat. No. 5,619,432, issued on 8 Apr. 1997.

The invention described herein may be manufactured and used by or for the Government of the United States of America for governmental purposes without the payment of any royalties thereon or therefor.

BACKGROUND OF THE INVENTION

The present invention relates to data processing, more particularly to data reduction in correspondence with parametric relationships.

In the past, efforts to fit both linear and nonlinear parametric relationships to experimental data have relied heavily upon transformations and approximations that stem directly from or can be derived as traditional forms of least-squares regression analysis. The basic concepts typical of the procedure were first formally enunciated in 1805 in a paper by A. M. Legendre who utilized the associated techniques in a study of certain astronomical observations. Similar techniques were independently developed and considered as early as 1795 by C. F. Gauss. Both bivariate and multivariate forms of the traditional least-squares regression analysis are valid for linear data reduction applications when errors are limited to nonskewed variations in a single variable parameter.

The present invention provides conformal analysis as an optional replacement for traditional regression analysis. It also provides explicit form for composite coordinate normalizing coefficients which are included as weight factors, which are composed of coordinate normalizing proportions, unique to each datum and corresponding rectified form, which make it possible to expand bivariate and multivariate, regression analysis and conformal analysis to provide improved forms of linear and nonlinear multidimensional data processing. The present invention represents major breakthroughs in multivariate statistical analysis and automatic data processing. Alternate reduction procedures are disclosed and employed to account for nonuniform error distributions, variations in precision uncertainties, and errors in more than a single variable parameter. Automated or semi-automated processes providing these expanded analysis capabilities are referred to by the inventor as discriminate reduction data processing. Adaptation is considered for use of discriminate reduction data processing to provide velocity dependent representations of non-stationary multiple frequency band hydroacoustic sound pressure data.

SUMMARY OF THE INVENTION

In view of the foregoing, it is an object the present invention to provide automated multipurpose discriminate reduction data processing, utilizing a machine with a memory, arithmetic processor, and logic control unit to transform data representing variations in measurable phenomenon to a generally more manageable, statistically representative form. In accordance with the present invention, multipurpose versatility is provided by automated forms of data reduction as follows:
1. Discriminate forms of regression analysis provide data transformation normalization for appropriately weighted single and multiple parameter evaluation. (Valid applications may require negligible precision uncertainty in one or more variable parameters.)
2. Sectional regression analysis provides for simple linear and nonlinear two parameter evaluations and linear multiple parameter evaluations. These forms of sectional regression analysis will account for multivariate precision uncertainty for linear applications without a need for iteration.
3. Conformal analysis accounts for multivariate precision uncertainty and provides for accurate evaluation of one or more term coefficients and a corresponding initial constant.
4. Nested parameter evaluation provides for resolution of parameters other than initial constants and term coefficients by using Taylor series approximations to linearize coordinate normalizing approximation deviations as expressed in terms of corrections to and successive approximations of parameters that may be embedded, or nested, within one or more terms of the approximative equation.
5. Discriminate reduction data processing implemented with appropriately controlled analog-to-digital sampling provides forms of real time linear and nonlinear data processing.
6. Provided analog forms for time and/or spatially dependent transformation weight factor coordinate normalizing proportions provide for reduction of a continuum (or a plurality of piecewise continua) of data points.

It is a further object of this invention to provide such data processing which reduces or eliminates bias introduced by indiscriminate rectification of nonlinear data. In accordance with the present invention, form is provided for individually normalized datum variances as represented by the square of coordinate normalizing approximation deviations which can be accommodated in the reduction process by the inclusion of coordinate normalizing proportions of newly discovered normalizing coefficients and/or by selective data sampling.

Another object of the present invention is to provide such data processing which accounts for bias errors that are introduced by nonuniform (or skewed) error distributions associated with the representative form of the original data. In accordance with the present invention skewed error distributions are accounted for by assuming provision of an appropriate selection of fundamental variables, pertinent derivatives, and corresponding approximative equations with appropriate data sampling during the initializing process of sample acquisition and data reduction characterization, also by:
1. employing the final stages of a subsidiary process of discriminate rectification utilizing a final stage discriminate rectifier or integrated fact simile to provide transformation weight factors; or
2. providing at-set-derivative data sampling during sample acquisition.

Another object of this invention is to provide such data processing which accounts for variable precision uncertainty when, or if, it is made available. In accordance with this invention option is provided to include composite precision weight factors which are combined products of pertinent respective coordinate normalizing proportions representing precision uncertainty, each said coordinate normalizing proportion providing data precision normalization for the corresponding variable degree of freedom.

A further object of this invention is to provide such data processing which accounts for significant errors in more than a single variable. According to this invention, automated forms of conformal analysis and/or sectional regression analysis are provided to account for multivariate precision uncertainties and to statistically compensate for errors in more than a single variable.

A further object of this invention is to provide such data processing which affords alternate forms of data sampling for data acquisition. According to this invention:

1. At-set-derivative data sampling provides for the use of orthogonal and nonorthogonal transformations (corresponding to specific approximative equations which adequately represent the data) without including certain otherwise pertinent transformation weight factor coordinate normalizing proportions.
2. Between-zero-derivative data sampling provides for the evaluation of transformation weight factors without the inherent problem of division by zero.
3. For certain specialized applications (when the explicit form of the approximative equation is available) sampling of preprocessed analog signals may provide for (or directly provide) transformation weight factors and/or associated sums and sums of products without need of iteration.

Yet another object of this invention is to provide such data processing which affords adequate numerical resolution. Each datum should generally be considered as being an exact statistically representative sample. Fortran instructional code provided in this disclosure for general data manipulation and array element preparation, as an example, is limited to real*8 precision. The included instructional code provided for determinant resolution is limited to real*16. It should be noted that this precision is only intended for limited application. Modifications to the computational precision (reflected in the instructional code and incorporated into the control command logic) may be needed to provide for evaluation of increased numbers of approximating parameters. According to this invention Provided processing precision should be initially set sufficiently high and/or increased as necessary to prevent excessive truncation or rounding of products and sums as the data are processed.

A further object of this invention is to provide such data processing which obtains results with a minimum number of iterations. This invention provides iteration algorithms which employ iteration cycle counters with limits which can be adjusted (corresponding to the approximative equation) to optimize between result accuracy and required iteration time.

Another object of this invention is to provide such data processing which affords means for product output or media, as any type of machine with memory which can preserve, display, utilize, transport, and/or store an approximating representation of the original data.

Other objects, advantages and features of this invention will become apparent from the following detailed description of the invention when considered in conjunction with the accompanying drawings.

BRIEF DESCRIPTION OF THE DRAWINGS

In order that the present invention may be clearly understood, it will now be described, by way of example, with reference to the accompanying drawings, wherein like numbers indicate the same or similar components and wherein:

FIG. 11A through FIG. 11C are a flow diagram illustrating a two parameter iteration in accordance with the present invention.

DETAILED DESCRIPTION OF THE INVENTION

Discriminate Reduction Data Acquisition and Processing Systems

Discriminate reduction data acquisition and processing systems in accordance with the present invention are equipped to receive data, to provide automated or semi-automated discriminate reduction data processing, and to provide means, display, media, or product output to preserve, illustrate, transport, and/or store an evaluated parametric representation of variation in measurement which is characteristic of variable phenomenon and uncertainty as represented by the information being processed.

Figure 1:
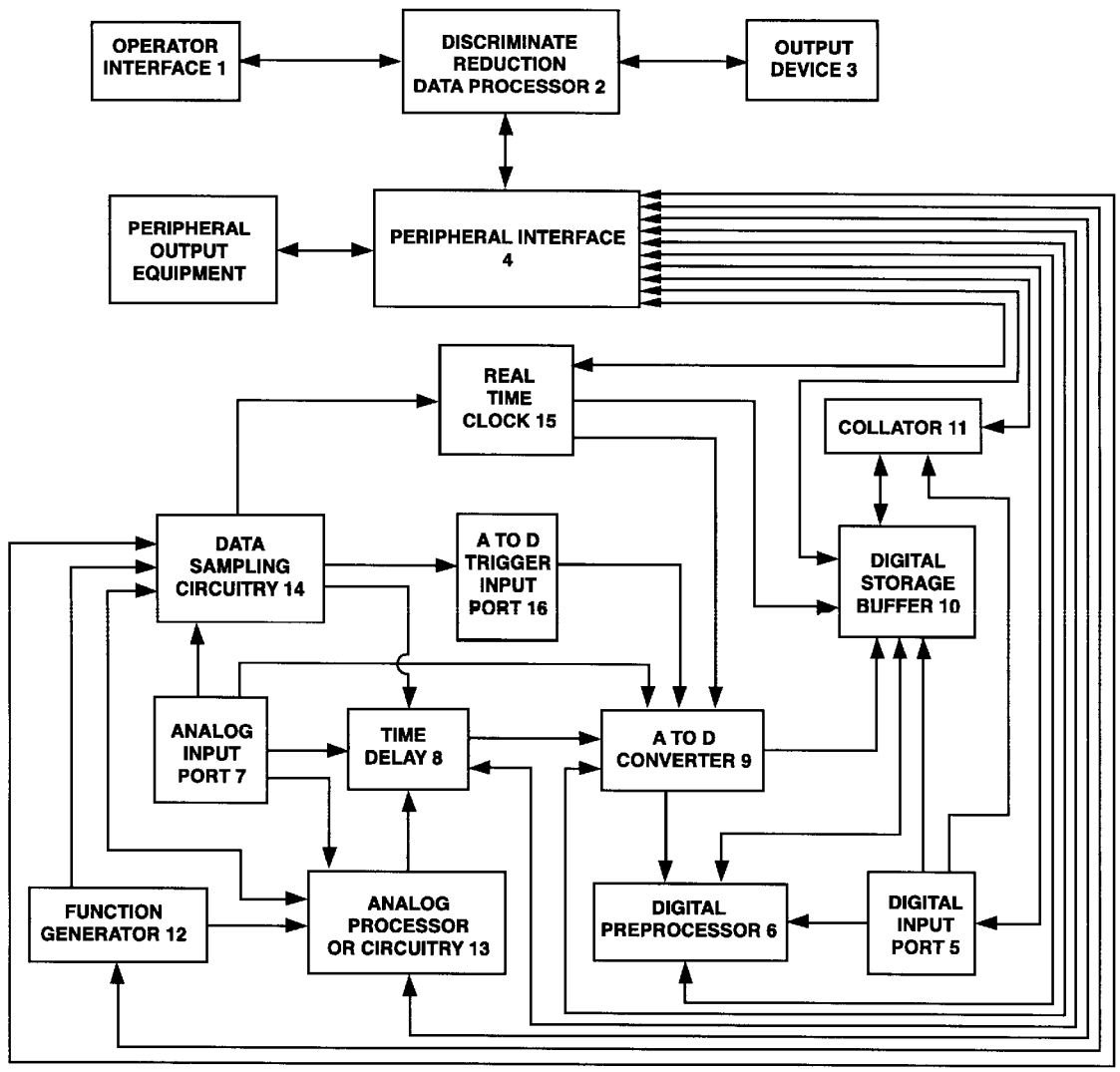
FIG. 1 is a block diagram of a discriminate reduction data acquisition and processing system in accordance with the present invention.

Referring now to FIG. 1, the required complexity of a representative system is dependent upon the incoming (or available) information and the characterized form or forms of the approximative equations. Provided approximative equations are generally determined by inherent characteristics of the data being processed. FIG. 1 depicts the fundamental components of an adaptable discriminate reduction data processing system including an operator interface 1, a discriminate reduction data processor (DRDP) 2, and an output device 3. The operator interface provides for input commands and/or manual data entry as supported by the logic control unit (LCU) of the DRDP. The DRDP includes the central system machine. Utilizing operational logic circuitry, it manipulates data in memory and controls operation of peripheral data reduction components and system(s), either directly or through an optional peripheral interface 4.

Auxiliary equipment may be included to provide for automatic analog and/or distal data throughput and/or signal conditioning. Provided auxiliary equipment may be either hard wired, adapted to and connected, or attached through the optional peripheral interface 4. Portions of FIG. 1 depict inclusion of certain optional auxiliary equipment..

FIG. 1 shows a digital input port 5 for modem or automatic digital data entry. A digital preprocessor 6 is provided to select or transform data to a preferred form prior to reduction by the DRDP. The digital preprocessor may also automate steps of discriminate rectification or provide the functions of a final stage discriminate rectifier.

FIG. 1 shows an analog input port 7 for real time and/or spatial data acquisition and processing. A time delay 8 (or equivalent such as a trigger delay or sample hold in the A to D converter) provides signal synchronization. An analog-to-digital (A to D) converter 9 is included to convert analog data to digital form. A digital storage buffer 10, which may be an integral part of the memory of the DRDP, is provided to accumulate and, as necessary, sequentially transfer the digitized data to (or in) controlled memory for processing. The collator 11, which may be included as part of the DRDP, provides for any pertinent data base management including data organization and sorting prior to reduction. The collator will include access to data base memory as provided for support information and data access. Memory provided for data base support may be independent, it may be an included part of the digital storage buffer 10, or it may be included memory provided by the DRDP or reduction system.

A function generator 12 is available to provide control for alternate forms of data sampling as well as provide generated input for system calibration and analog processing.

The analog processor or circuitry 13 provides forms of analog signal conditioning, and preprocessing which may include the functions of a final stage discriminate rectifier. The analog processor may also provide integrated sums and integrated sums of products as alternately provided to estimate approximating parameters.

FIG. 1 includes discriminate reduction data sampling circuitry 14 to pass data, and to supply sampling information to a real time clock 15 and to a trigger input port 16 of the A to D converter.

FIG. 1 shows peripheral output equipment which is attached via the peripheral interface 4 as optional auxiliary equipment to provide enhanced forms of data related display, and/or to supply representation of variation in measurement which is characteristic of variable phenomenon to media and/or to product output.

Figure 2:
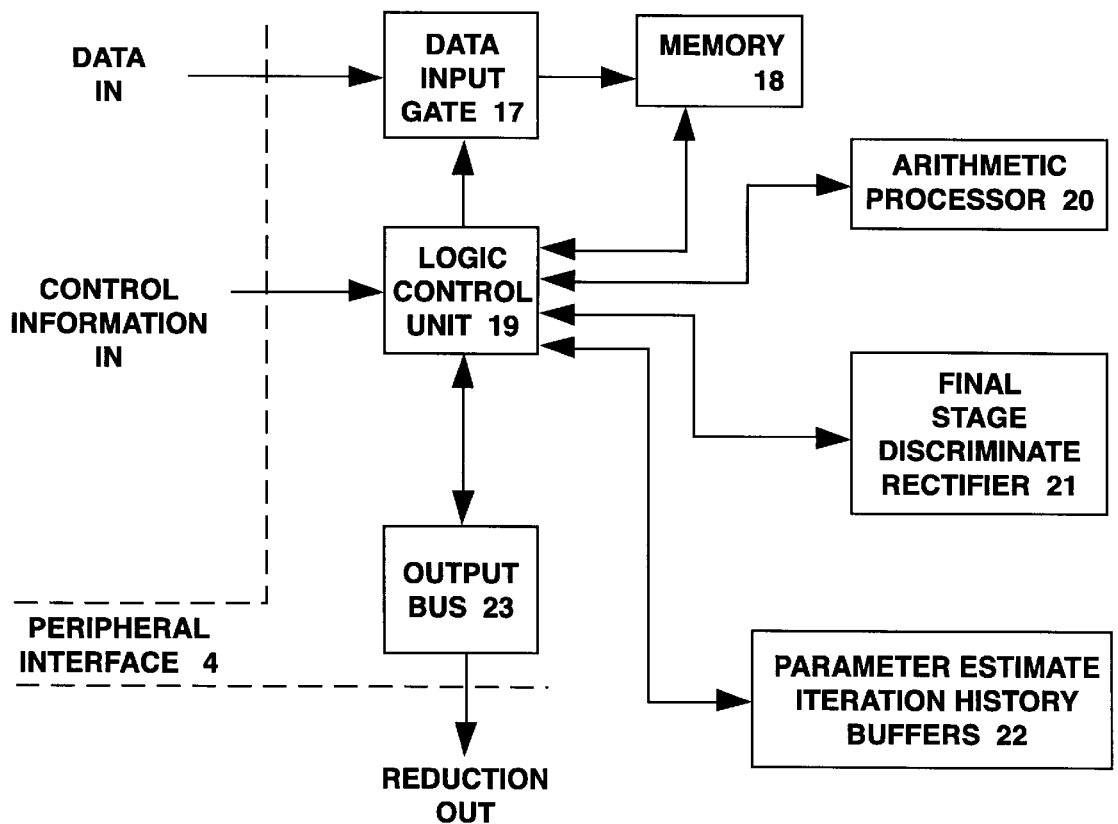
FIG. 2 depicts the discriminate reduction data processor.

With reference to FIG. 2, The DRDP is a central processing system providing multipurpose data reduction, whereby steps of discriminate reduction data processing are enabled and executed in accordance with or in response to machine control signals from a logic control unit. FIG. 2 depicts the components of a discriminate reduction data processor 2, including a peripheral interface 4 (which is optional), a data input gate 17, a memory 18 (containing data or provided with data via the data input gate), a logic control unit 19 configured to provide a selected form (or various forms) of discriminate reduction data processing, an arithmetic processor 20, a final stage discriminate rectifier 21 (or output of the same in digitized form as provided by the LCU or by the processing system), parameter estimate iteration history buffers 22 or registers (which may be included in the logic control unit 19, the arithmetic processor 20, or in the memory 18), and an output bus 23 (which may be attached to or included as part with the peripheral interface 4).

For some embodiments of the present invention, incoming information, which is provided in form of representative measure as data, is passed through the data input gate 17 into the memory 18, where it is acted upon, as represented and manipulated by the LCU and arithmetic processor. Estimated or provided derivatives along with provided parameter estimates are incorporated and/or utilized to formulate corresponding transformation weight factors. The provided data along with estimated or incoming transformation weight factors are manipulated by the arithmetic processor as activated by machine control signals from the LCU to formulate corresponding sums, sums of products, determinants, and solution sets: and to estimate the approximating parameters. For some embodiments of the present invention, said representative measure as provided in analog form is passed through analog circuitry where it is combined with formulated analog transformation weight factor coordinate normalizing proportions and generated term function representations to provide integral sums which are utilized to estimate the approximating parameters.

Successive approximations as may be required are based upon comparison of differences, or successive estimates of the average normalized datum variance and/or other estimated parameters. Selected best values are determined by comparing successive differences and/or successive estimates.

Processing precision preferably is initially set sufficiently high and/or increased as necessary to prevent excessive truncation or rounding of products and sums as the data are processed (or else forms of reduction that can be provided will be limited by the available precision).

The DRDP is equipped to accommodate system and/or user provided instructional code or control command logic (such as logic circuitry or alternate form of binary operation code) to retrieve, or make available and provide for the evaluation of functions and derivatives that are characterized by the approximative equation and corresponding fundamental approximation variables. Rectified data forms as represented by approximative equations may be predetermined, user specified, or specified by an interactive or fully automated discriminated rectification process.

The logic control unit 19 is a machine or composite of machines which provides control signals which activate logic gate and/or switch control circuitry for processing. It also provides machine control signals for the receipt, and transfer of, commands, initial estimates and coded function definitions as may be required. The said logic control unit (LCU) is configured with control command logic, such as may be in the form of binary code and/or integrated binary logic circuitry, to effectuate at least one form of discriminate reduction data processing. That is, it is configured to provide machine control signals to execute consecutively (or in order as provided) the steps that are essential to act upon data including functions as evaluated or provided to or in system memory, in order to effectuate at least one form of the process referred to herein as discriminate reduction data processing.

The LCU is configured to effectuate a particular form or a plurality of forms of discriminate reduction data processing by at least one of three methods:

1. It may be constructed or manufactured to include printed or integrated binary logic circuitry or read only memory or fact simile which can provide the essential control command logic.
2. It may be packaged with and connected to printed or integrated circuitry or read only memory or fact simile which can provide the essential control command logic.
3. It may be provided with or connected to random access memory containing the essential operational or instructional code.

In accordance with this invention, control command logic is operational instructional code which is in a form that can be acted upon by a logic control unit to provide corresponding control signals. The appendices characterize typical instructional code in accordance with the present invention. APPENDIX 1 provides an example of instructional code written in Fortran to provide control command logic for discriminate reduction data processing to effectuate automated forms of precision-normalized regression analysis, discriminate regression analysis, and conformal analysis type 1, including:

1. an input/output provision 24 to select options; to supply data, support parameters, and initial estimates; and to transfer approximating parameters as or for data representation, for preservation, display, utilization, and/or storage;
2. a provision setting array dimensions and arithmetic operation precision 25;
3. a provision to set iteration cycle limits 26;
4. a provision to initialize parameters and set initial estimates 27;
5. a provision to access functions and derivatives 28 as provided or evaluated according to system or user provided control command logic or instructional code;
6. a provision to designate a specific coefficient as a resolute 29;
7. a provision to check information validity 30;
8. a provision to include pertinent precision weight factors and/or configure the DRDP to provide final stage discriminate rectification utilizing provided differential change in measured phenomenon 31 (using values supplied to the array Ux);
9. a provision to configure the DRDP to provide final stage discriminate rectification utilizing user or system supplied function definitions 32;
10. a provision to combine pertinent weight factors to supply appropriate coordinate normalization 33;
11. a provision to characterize matrix array modifications to provide for conformal analysis type 1 34;
12. a provision to set up matrix arrays 35;
13. a provision to estimate average normalized datum variance and evaluate the sum of the corresponding coordinate normalizing approximation deviations 36;
14. a provision to select between conformal analysis type 1 and regression analysis 37;
15. a provision to modify matrix arrays to provide conformal analysis type 1 38;
16. a provision to check for and store best estimates 39;
17. a provision to obtain solutions to matrix equations 40;
18. a provision to iterate and provide estimates as successive approximations 41;

APPENDIX 2 provides somewhat similar instructional code which has been modified to provide optional selection of conformal analysis type 2.

APPENDIX 3 provides instructional code with provision to solve matrix equations. Other embodiments may omit steps of resolving and dividing by the coefficient matrix determinant, for example, to provide relative solutions using type 2 conformal analysis.

APPENDIX 4 provides instructional code with provision to resolve the determinants.

APPENDIX 5 provides instructional code with provision to evaluate nested parameters by minimizing also with respect to composite coefficients. Other embodiments may provide for minimizing with respect to first order corrections to nested parameters.

APPENDIX 6 provides sample instructional code for an application program to consolidate the instruction code provisions of APPENDIX 1, APPENDIX 2 and APPENDIX 5, and configure the LCU (of an appropriately equipped Discriminate reduction data processor or processing system) with fortran binary operation code to effectuate certain user or system specified forms (including specified enhanced forms) of automated linear and nonlinear precision-normalized regression analysis, discriminate regression analysis, conformal analysis types 1 and 2, and nested parameter evaluation as included, said user or system specified forms being specified by the inclusion of user or system supplied subroutines as indicated by included commentary instructions.

Discriminate reduction data processing is not restricted to include all or only these illustrated provisions, and said provisions are not restricted by the exemplary form of the Fortran instructional code as presented in this disclosure.

These exemplary provisions can be readily adapted or used as type example to configure and provide binary operation code for various state of the art logic control units. They also provide sufficient description of the reduction techniques for the design and implementation of state of the art printed or integrated circuitry, computer chips or alternate provisions which may be utilized as or to configure logic control units with control command logic to provide a particular form or plurality of forms of discriminate reduction data processing. Included provisions of the instructional code can also be supplied in the form of dedicated software or packaged in read only memory. They can be altered in form, using state of the art techniques and corresponding equipment modifications, to provide adaptations such as providing alternate forms of nested parameter evaluation, alternate forms of conformal analysis, forms of sectional regression analysis, increased precision, relative solutions, or other modifications as needed to provide for more specific or more general applications of discriminate reduction data processing.

For reduction requiring iteration, data are provided to the arithmetic processor where they are combined with weight factor estimates. Output from the arithmetic processor representing approximating parameters is evaluated by comparative manipulation as activated by machine control signals from the LCU. Updated estimates of approximating parameters and corresponding evaluated derivatives are cycled through the arithmetic processor. Estimates are compared to previous estimates in the iteration history buffers 22. Output is passed from the arithmetic processor for containment in memory 18 and/or passed through an output bus 23 to an output device 3, or to peripheral output equipment as provided for containment in or transport to memory or product output, considered as machine with memory, for display, preservation, utilization, transport, and/or storage of the resultant approximating representation of the original data.

In accordance with this invention, forms of machine with memory that may be considered for representation containment as product output include discs, tapes, circuitry, data bases, files, records, film, compendium, paper with imprint, or other product utilized for representation containment as may be provided.

The transformation weight factors are included as products of respective and pertinent coordinate normalizing proportions, each representing a variable degree of freedom. Each coordinate normalizing proportion is assumed and provided to supply respective datum error deviation coordinate normalization for the corresponding degree of freedom. The respective coordinate normalizing proportions are generally formulated from evaluated derivatives of estimated approximation deviations as provided by user supplied or system contained instructional code or control command logic. Alternately, certain transformation weight factor coordinate normalizing proportions can be rendered as not being required by appropriate selective data sampling. For other embodiments of the present invention certain coordinate normalizing proportions of transformation weight factors are formulated utilizing estimates or measures of differential change in the considered phenomenon with respect to variables representing the corresponding degrees of freedom. For example, assuming real time data are adequately described by the approximative equation the actual derivative of the incoming signal (or available data) may provide preferred estimates and expedite processing. (For spatial applications such as profilemetry, for example, where amplitude can be expressed as a continual function of a spatial coordinate, a corresponding spatial derivative may provide said preferred estimates.) The evaluated or actual derivatives are subjected to operations of final stage discriminate rectification as they are made available.

Figure 3:
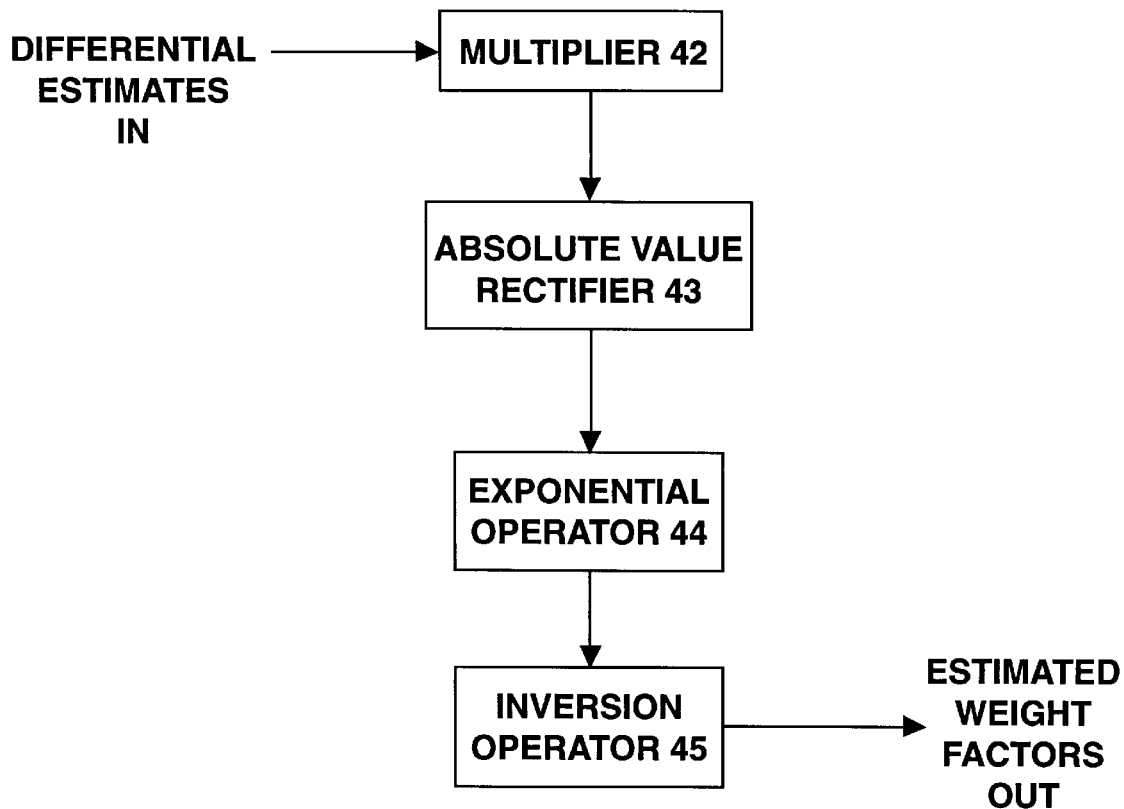
FIG. 3 is a block diagram illustrating a final stage discriminate rectifier in accordance with the present invention.

Reference is now being made to FIG. 3, which illustrates characteristic components of a final stage discriminate rectifier including a multiplier 42, an absolute value rectifier 43, an exponential operator 44, and an inversion operator 45.

Operations of a final stage discriminate rectifier 21 effectuate certain pertinent steps of nonlinear discriminate reduction data processing. In accordance with the present invention, the final stage discriminate rectifier is a machine or a composite system of machines providing the operations of final stage discriminate rectification to establish weighting of and/or to provide analog or digital data representation of transformation weight factor coordinate normalizing proportions. The final stage discriminate rectifier may be a self contained analog or digital system or unit, a computer chip, or it may be a multipurpose system or machine providing the same operations. Said operations may be provided by means including the following: they may be incorporated by a preprocessing element included with the data sampling circuitry 14 and/or the analog processor or circuitry 13; or they may be included as part of the digital preprocessor 6. More often (for reduction which requires iteration) said operations are included as a function provided by the logic control unit 19, configured to incorporate operations of final stage discriminate rectification, which are to act upon representative measure of differential change in phenomenon or approximation deviation (estimated, evaluated, or provided) as considered with respect to fundamental variables and provide corresponding transformation weight factors or coordinate normalizing proportions of the same as herein disclosed, which can be used in discriminate reduction data processing, can be used similarly as in discriminate reduction data processing, or can be used in error quantification to provide data representations in terms of approximating parameters which substantially minimize parametric expressions which represent sum or sums of coordinate normalizing approximation deviations or which represent sum or sums of coordinate-normalized datum variances or relative or nondimensional forms of the same, as herein disclosed.

Estimated derivatives for n pertinent degrees of freedom are combined in the multiplier 42. The resultant estimates (or products of estimates) are passed through the absolute value rectifier 43 and exponential operator 44 (as applicable) where they are converted to absolute values and raised to a power of two divided by n degrees of freedom. The inverse is provided by the inversion operator 45 to form estimation of transformation weight factors.

The order of operations may be altered to produce the same or similar results. The exponential operator 44 is not generally required for two dimensional applications. In accordance with the present invention, there is no difference between raising a number to a power of one and not raising said number to a power.

Constant values for derivatives, which are not determined by iteration, need not be included and consequently, the multiplier is not an essential element for all embodiments.

Certain coordinate normalizing proportions may be provided independently by alternate provisions for final stage discriminate rectification or by independent final stage discriminate rectifiers. Such coordinate normalizing proportions can be individually included to provide corresponding coordinate normalization.

Division by zero (which cannot be provided by the inversion operator) is handled in one of two ways, either by replacing zero valued derivatives with assumed values, or by selective data sampling. For analog applications, actual limits of the analog circuitry can provide the former, however, it is advisable that replacement values corresponding to discontinuities not be included in the reduction. Evaluation and integration between and not including points of zero slope is provided by forms of between-zero-derivative data sampling.

Considering embodiments of the present invention that may be provided by using analog circuitry, assuming negligible error, and providing data as an analog signal which is adequately represented by the explicit form of the approximative equation, estimates of the time and/or spatially dependent coordinate normalizing proportions of the transformation weight factors may be provided as a continuum (or piecewise continuum) by said analog circuitry. The resultant analog data representation can be digitized and considered in digital form; or it can be operated on in analog form, combined with analog signals representing evaluated term functions (dependent and/or independent), and summed utilizing analog integration techniques as provided by a selected form of discriminate reduction data processing to evaluate approximating parameters.

In accordance with the present invention, selective data sampling circuitry is utilized in real time data acquisition to prevent invalid weighting that might result from replacement values. Intervals between data samples are determined at least in part by at least one characteristic of the data being sampled. The time intervals are not considered to be predictable, and consequently the acquisition also includes simultaneous representation or sampling of time.

As an example, selective data sampling circuitry, as illustrated herein, is circuitry which responds to incoming data by providing a pulse train which triggers analog-to-digital conversion. Now referring to FIG. 4, Between-zero-derivative data sampling is a form of between-set-derivative data sampling, providing sampling of data between selected values of the function derivative. For between-zero-derivative data sampling, data samples to be included in the reduction are taken between zero crossings of the first derivative of the incoming signal. For real time data reduction simultaneous measurements or representation of time (or time intervals) are included with the data samples. Time intervals for some embodiments of the present invention can be determined by the sample count, more often, time samples as directly corresponding to non-equal interval data samples are determined by methods including simultaneously digitizing a generated ramp voltage or periodic wave, or by reading a real time clock.

Figure 4:
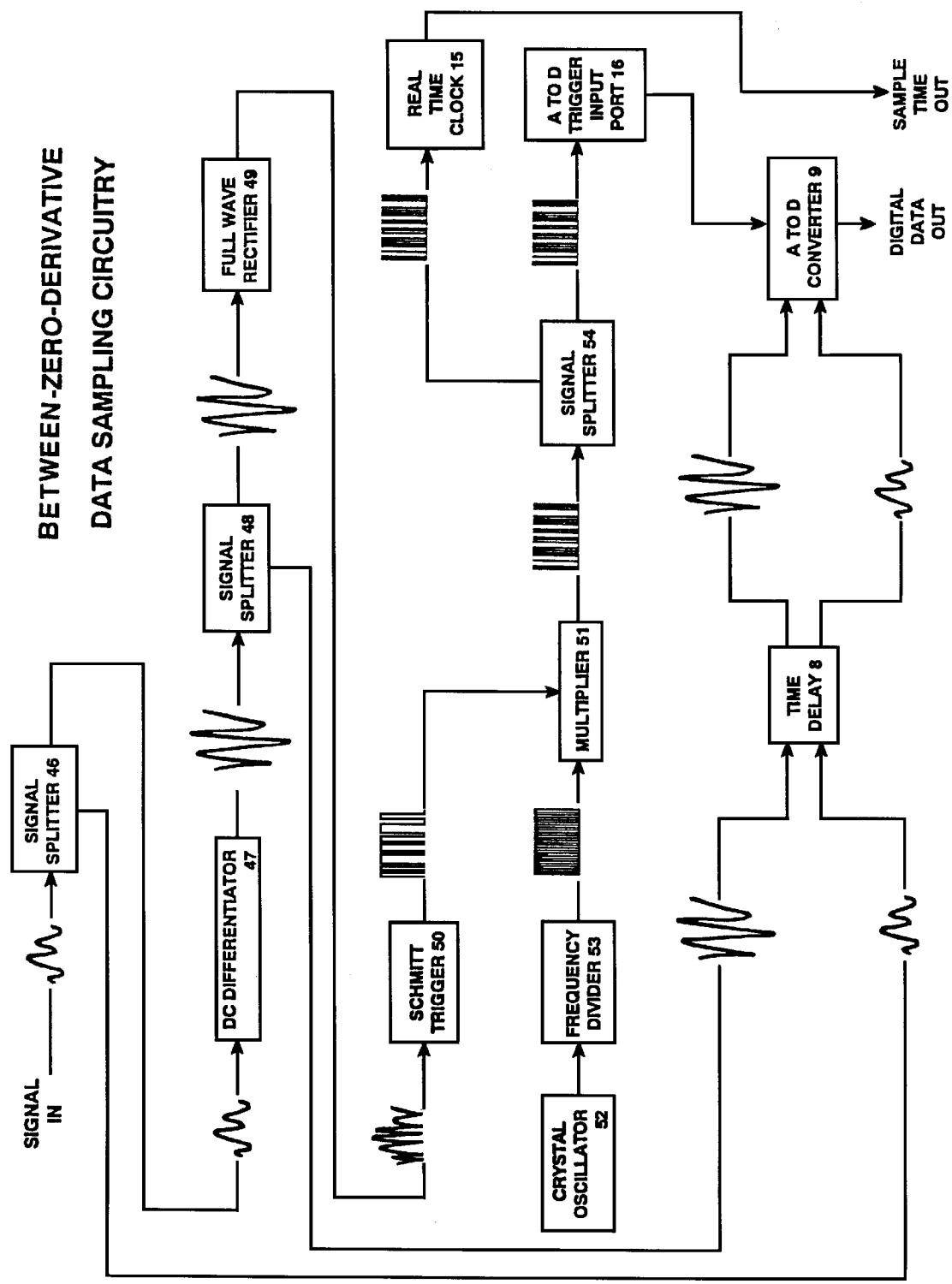
FIG. 4 illustrates typical circuitry for between-zero-derivative data sampling in accordance with the present invention.

FIG. 4 provides example of circuitry typical of between-zero-derivative data sampling. The real time signal is passed through a signal splitter 46 where it is separated into two components. One component is passed through a synchronizing time delay 8 to the A to D converter 9. The remaining component is passed through an RC differentiator 47, a signal splitter 48, a full wave rectifier 49, a Schmitt trigger 50, into a multiplier 51, where it is combined with output from a crystal oscillator 52 and a frequency divider 53 or an alternate pulse train. Output from the multiplier is passed through a signal splitter 54 to the A to D trigger input port and real time clock. To facilitate weight factor estimation, the derivative of the signal from a differentiator 47 and signal splitter 48 can also be passed via time delay 8 to the A to D converter where it is converted to digital form.

Alternatively, transformation weight factors are not required if differential change in phenomenon as estimated with respect each of the n fundamental coordinates is considered to be constant or equal to zero. Also, any coordinate normalizing proportions of transformation weight factors, that are considered to be invariant, need not be included, that is, provided that the differential change in phenomenon as estimated with respect to corresponding fundamental coordinates is constant or equal to zero for all included data. At-set-derivative data sampling is included in accordance with the present invention to provide data samples corresponding to fixed values for said differential change.

Figure 5A:
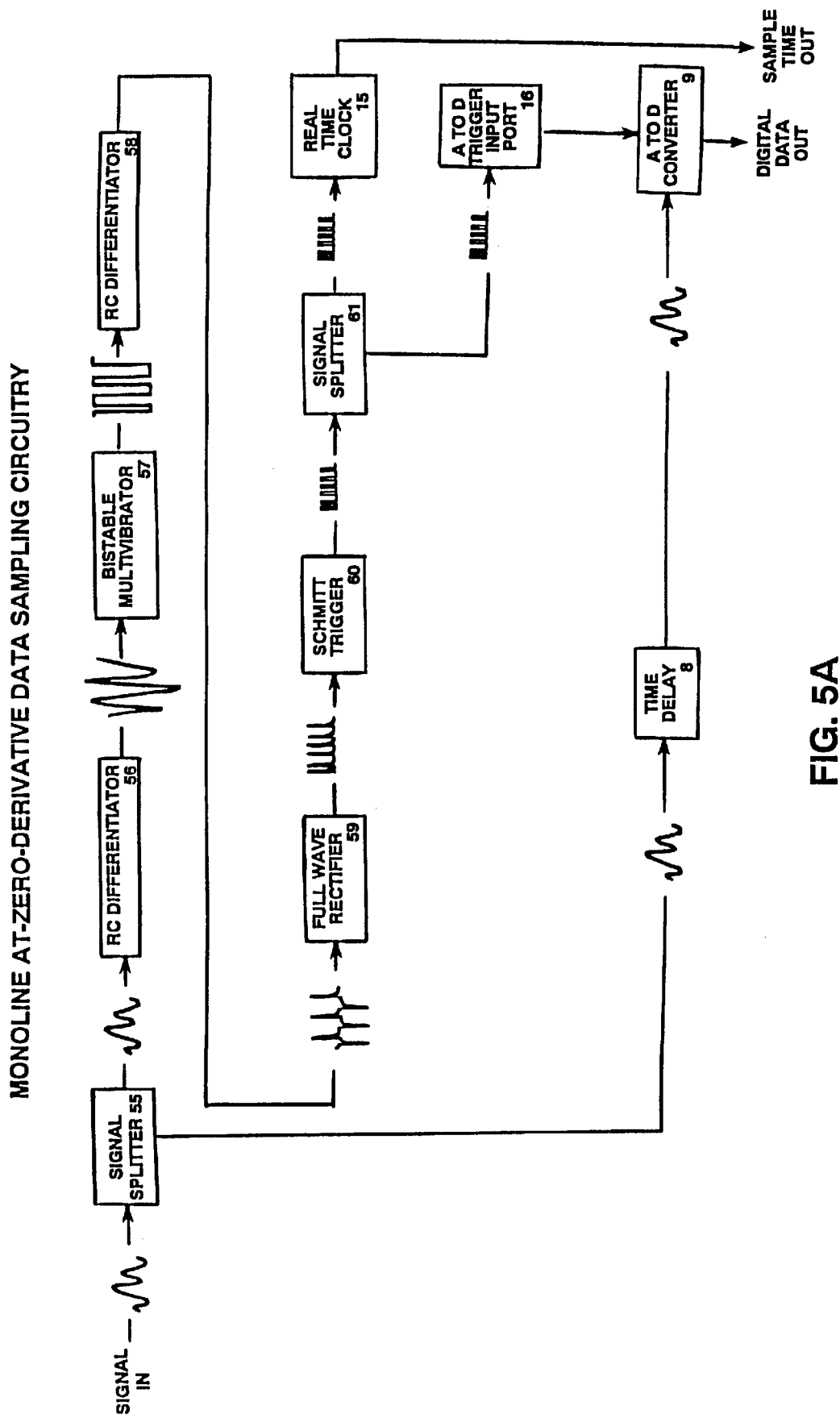
FIG. 5A and 5B diagram typical circuitry for discriminate monoline and bioline analog-to-digital at-zero-derivative data sampling in accordance with the present invention.
Figure 5B:
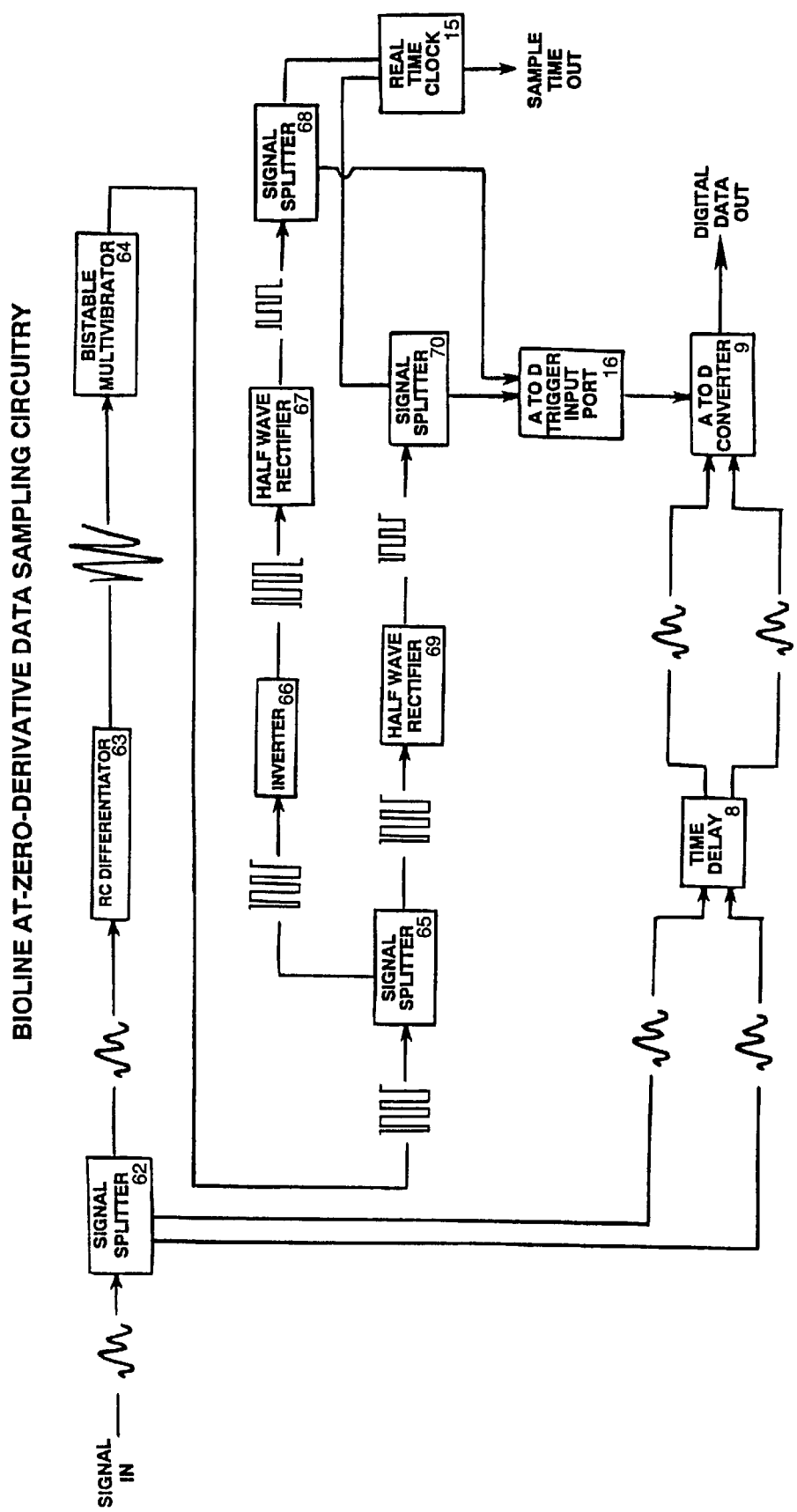

For example, referring now to FIG. 5A and FIG. 5B, at-zero-derivative data sampling is provided (as a form of at-set-derivative data sampling) so as not to require inclusion of certain coordinate normalizing proportions in the transformation weight factors. For at-zero-derivative data sampling, time data samples to be included in the reduction are taken corresponding near to, or within marginal limits of, the zero crossings of the first derivative of the incoming signal (or provided data). Marginal limits are established by the limitations of the circuitry as provided. Said limits for at-zero-derivative data sampling are correspondingly near to each zero crossing of the data. Marginal limits ideally should be set for data sample selection to provide variation which is consistent with the uncertainty in the corresponding measurement of time.

FIG. 5A and FIG. 5B describes typical circuitry for monoline and bioline forms of real time at-zero-derivative analog-to-digital data sampling. FIG. 5A describes circuitry for discriminate monoline sampling. The real time signal is passed through a signal splitter 55 where it is separated into two components. The first component, after passing through an optional time delay 8 (which might be included for time synchronization) is provided as input to the A to D converter 9. The second component is modified to trigger the A to D converter at zero crossings of the first time derivative. It is passed through an RC differentiator 56, a bistable multivibrator 57, another RC differentiator 58, a full wave rectifier 59, and a Schmitt trigger 60. The resulting pulse train is passed through a signal splitter 61 to the A to D trigger input port 16 and a real time clock 15.

Bioline sampling provides alternate analog-to-digital sampling for respective positive and negative values for the derivative of the incoming data. It requires an additional A to D channel for each signal (or each signal component) being digitized. Bioline sampling is provided for high frequency resolution. FIG. 5B provides example of circuitry for discriminate bioline analog-to-digital sampling as applied to at-zero-derivative data sampling. The real time signal is passed through a signal splitter 62 where it is separated into three components. Two components are passed through synchronizing time delay 8 circuits to parallel input ports of the A to D converter 9. The remaining component is passed through an RC differentiator 63, a bistable multivibrator 64, and a second signal splitter 65. One leg of the resulting pulse train is passed through an inverter 66, a half wave rectifier 67 and a third signal splitter 68 to a parallel A to D trigger input port and real time clock. The other leg is not inverted but is passed through a half wave rectifier 69 and signal splitter 70 to another parallel A to D trigger input port and real time clock. Somewhat similar circuitry can be readily provided for embodiments which may include other forms of at-set-derivative data sampling. For certain applications it is advantageous to collect at-set-derivative samples corresponding to more than one selected value for the derivative of incoming signal derivative. At-multiple-derivative data sampling is provided in accordance with the present invention by splitting said incoming signal into at multiple of like components and providing analog-to-digital data sampling for each like component, whereby said like components of the same signal are sampled at points in time (and/or space) corresponding to different selected values for the derivative.

Figure 6:
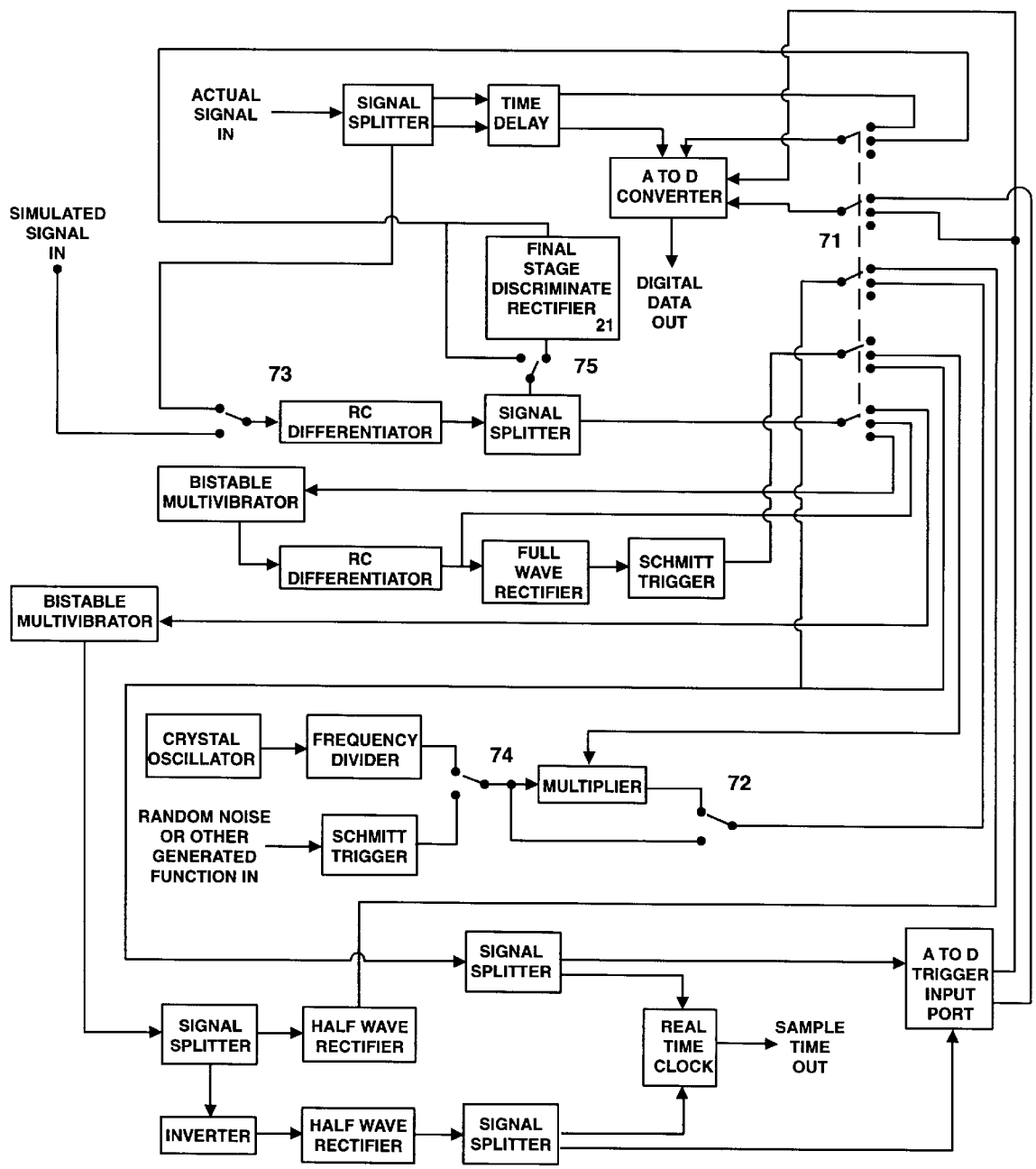
FIG. 6 is a diagram illustrating selective data sampling circuitry including switching in accordance with the present invention.

For some embodiments of this invention optional selection of data sampling techniques may be provided. Reference is now being made to FIG. 6, which is a diagram illustrating an exemplary switching arrangement for selective data sampling circuitry 14, providing for various forms of analog to digital sampling. The multiple switch 71 provides selection between forms of at-zero-derivative data sampling and between-zero-derivative data sampling. Switches 72, 73, and 74 provide for discriminate or indiscriminate sampling, function simulation, and random or function defined sampling, respectively. Random and function defined forms of selective data sampling provide unequal interval sampling that may for some applications reduce bias that would otherwise be introduced by equal interval sampling. Switch 75 provides option for the derivative of the incoming signal to be passed through an analog final stage discriminate rectifier 21 (or included stages of the same) before digitization. Switching may be either manual or logic controlled and electronically activated. Selection of the appropriate switching arrangement and corresponding data sampling circuitry depends upon the explicit form of the real time data that are to be processed.

The exemplary selective data sampling circuitry as illustrated by FIG. 4, FIG. 5A, FIG. 5B and FIG. 6 will most likely require standard isolation circuitry such as operational amplifiers (not shown in the figures) between the various stages of the signal conditioning.

Discriminate Reduction Data Processing

In accordance with the present invention, discriminate reduction data processing is provided to process information in order to generate appropriate and statistically accurate analytical data representations of variation in characteristic measurement which are generated by means including automated evaluation of approximating parameters which substantially minimize parametric expressions which are assumed to represent sums of squares of coordinate-normalized datum variances.

Embodiments of the present invention which include normalization as herein disclosed thereby establishing representation for the sum of coordinate-normalized datum variances, are rendered as a form of discriminate reduction data processing by including at least one of the following:

1. weighting of squared deviations or "squared approximation deviations" by substantially including at least one variant transformation weight factor coordinate normalizing proportion in evaluating at least one approximating parameter;
2. weighting of squared deviations or "squared approximation deviations" by including a plurality of weight factors in evaluating at least one approximating parameter, whereby at least some of said weight factors each substantially include at least one variant factor which is representative measure of differential change in phenomenon or approximation deviation (as estimated, evaluated, or provided) with respect to a variable corresponding to one of at least two variable degrees of freedom; the absolute value of said representative measure being included, or being raised to a power not equal to negative two and then being included, as or in place of at least one transformation weight factor coordinate normalizing proportion, which within processing accuracy substantially corresponds in magnitude to the absolute value of the inverse of said derivative being raised to a power other than two;

3. weighting of squared deviations or "squared approximation deviations" by substantially including at least one variant precision weight factor coordinate normalizing proportion in evaluating at least one approximating parameter;

4. weighting of squared deviations or "squared approximation deviations" by including a plurality of weight factors in the evaluation of at least one approximating parameter, whereby at least some of said weight factors each substantially include at least one factor which is determined uncertainty as provided, or raised to a power not equal to negative two, and included as or in place of at least one precision weight factor coordinate normalizing proportion, which within processing accuracy substantially corresponds in magnitude to the absolute value of the inverse of said determined uncertainty being raised to a power other than two; said determined uncertainty corresponding to one of at least two variable degrees of freedom, whereby said weight factor is not the inverse of the sum of squares of component uncertainty;

5. subjecting representation of differential change in phenomenon or approximation deviation (as estimated, evaluated, or provided) with respect to pertinent or assumed fundamental variables to automated operations which provide corresponding transformation weight factors or which provide coordinate normalizing proportions of the same for weighting of squared deviations or "squared approximation deviations";

6. intermittent measure and related sample time being generated by accessing and selectively sampling real time data by means of analog-to-digital conversion and simultaneous time representation acquisition, providing dependent variable measurement with simultaneous time representation corresponding to at least one selected recurrent value for the change in said dependent variable with respect to time;

7. nested parameter evaluation whereby a parametric expression representing coordinate normalizing approximation deviation includes at least one nested parameter, and wherein at least one represented coordinate normalizing approximation deviation in said parametric expression is represented as a parametric first order Taylor series approximation, and whereby at least one estimate of a first order correction for a nested parameter is evaluated to substantially minimize the sum of the square of said parametric expression.

Enhancements to the reduction process and/or to discriminate reduction data processing systems may include provision for sectional regression analysis, nested parameter evaluation, discriminate forms of real time linear and non-linear data processing and alternate forms of conformal analysis as described herein. Sequential reductions and modifications to the reduction process and said systems may also include provisions which require or provide other known and available forms of parameter evaluation and/or data processing.

Figure 11B:
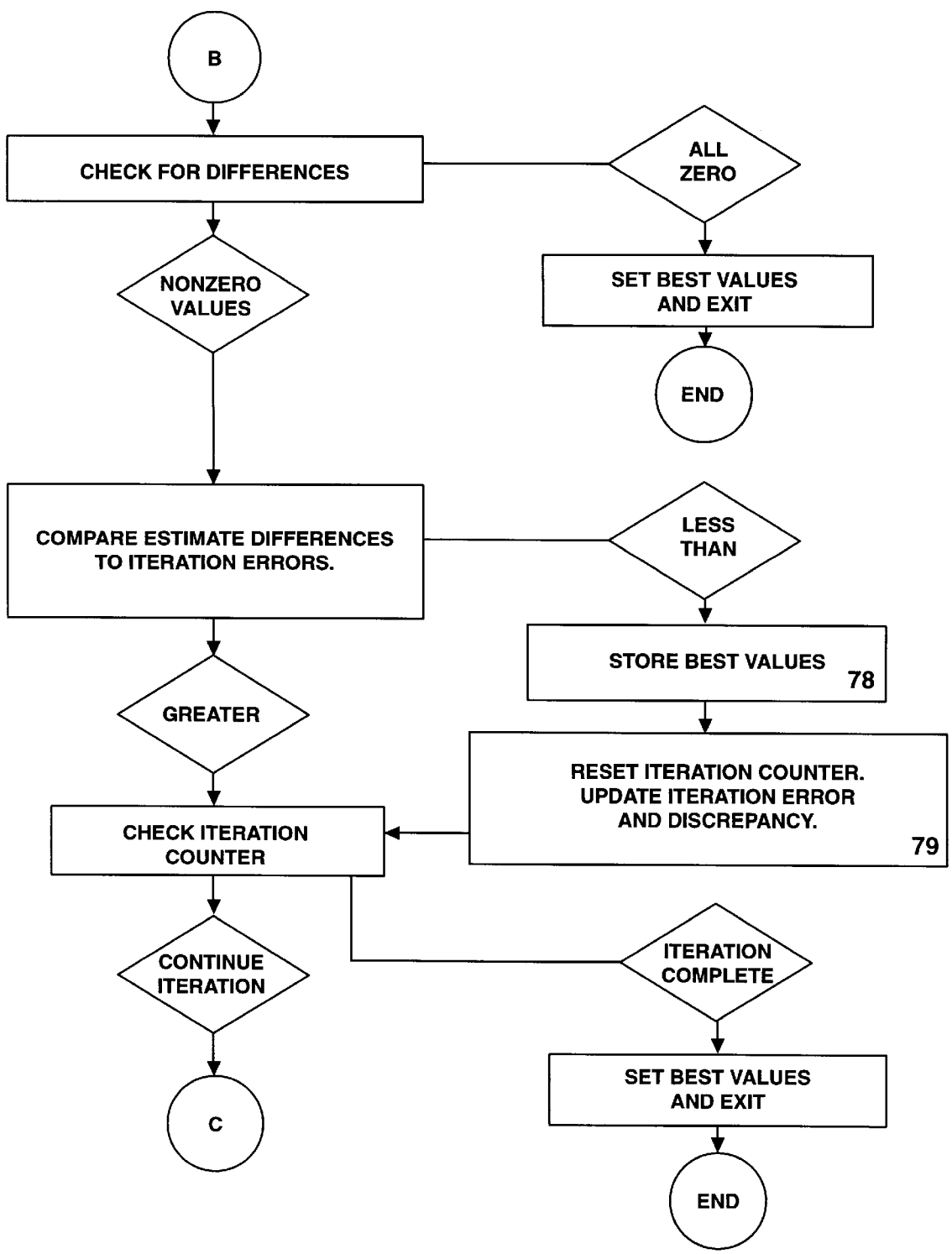
Figure 11C:
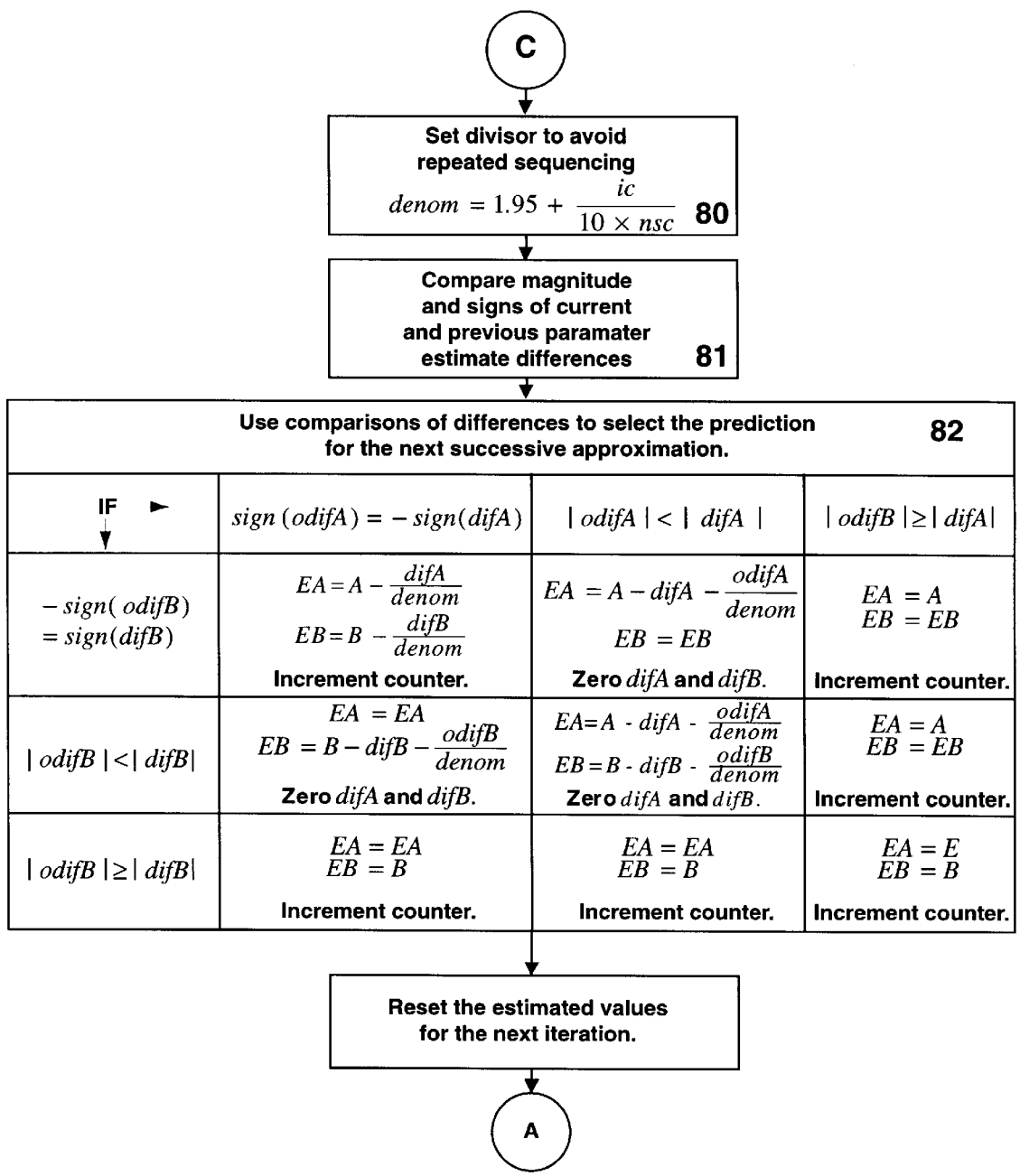

In accordance with the present invention, neither inclusion of weight factors which just only represent the weight of one dimensional spurious deviations nor inclusion of weight factors which just only represent the weight of the measure of the function cofactor of a resolute parameter are considered to render normalization as herein disclosed to provide representation for the sum of coordinate normalized datum variances. Embodiments of the present invention, wherein the parametric expressions for the sum of squared approximation deviations do not include weighting or do include other known or provided forms of either invariant or variant weighting, are rendered as a form of discriminate reduction data processing by including automated forms of at least one of the following:

1. Data acquisition provided so as not to require inclusion of transformation coordinate normalizing proportions, by selectively sampling data to provide intermittent measure and related sample time as generated by accessing and selectively sampling real time data by means of analog-to-digital conversion and simultaneous time representation acquisition, providing dependent variable measurement with simultaneous time representation corresponding to at least one selected recurrent value for the change in said dependent variable with respect to time;

2. conformal analysis providing explicit or relative solution;

3. conformal analysis type 1 providing explicit or relative solution;

4. conformal analysis type 2 providing explicit or relative solution;

5. sectional regression analysis providing explicit or relative solution;

6. iteration wherein the number of iterations allowed between improved estimates is determined by a designated number and iteration is terminated when the number of iterations allowed is exceeded, and wherein an extrapolation, which is a function of the iteration count between each iteration cycle, is included in provision for successive approximations;

7. two parameter iteration including the provisions of FIG. 11A, FIG. 11B and FIG. 11C;

8. two parameter iteration including decision making in correspondence with the table 82 of FIG. 11A through FIG. 11C;

9. multiple parameter iteration including provisions 41 in accordance with APPENDIX 1

10. iteration including the following steps for decision making:

(a) if a history of differences is not available new estimates are set equal to the most recently computed values, a history of differences is established, the iteration count is incremented, and the iteration is continued;

(b) if the absolute value of any current differences is smaller than the absolute value of corresponding previous ones, new estimates are set equal to the most recently computed values, the history of differences is maintained, the iteration count is incremented, and the iteration is continued;

(c) if none of the absolute values of current differences are smaller than absolute values of previous estimates, but the sign of all the current differences is opposite to the corresponding previous signs, corresponding new estimates are extrapolated between the computed values and previous estimates, the iteration is continued, the history of differences is maintained, and the iteration count is incremented; and (d) if the signs of any current differences are the same as the signs of the previous ones and changes in all differences are increasing in magnitude, corresponding new estimates are extrapolated back, the iteration is continued, but the history of differences is not maintained, and the iteration count is not incremented.

The explicit forms of parameter evaluation, one or more of which, being included in automated form, will render associated data reduction as form of discriminate reduction data processing as herein disclosed, are:

1. linear and nonlinear, precision-normalized regression analysis, providing explicit or relative solution (excluding linear applications when variant precision weight factors representing at least one variant coordinate normalizing proportion are not included, and excluding any applications wherein included weight factors just only represent the weight of the measure of the function cofactor of a resolute);
2. integral or nonintegral discriminate regression analysis, providing explicit or relative solution (excluding linear applications when variant precision weight factors representing at least one variant coordinate normalizing proportion are not included and excluding any applications wherein included weight factors just only represent the weight of the measure of the function cofactor of a resolute);
3. integral or nonintegral conformal analysis, including type 1 or type 2, or any alternate form of conformal analysis, providing explicit or relative solution by the same.

Relative solution can be provided for all applications by multiplying the initial constant and all term coefficients by a constant value or by including constant proportion in provided weight factors.

Precision-normalized regression analysis is a form of discriminate regression analysis, generally linear, and not requiring transformation weight factor coordinate normalizing proportions. Precision-normalized regression analysis varies from traditional forms of bivariate and multivariate regression analysis by weighting the square of the approximation deviations with variant weight factors which include at least one of n precision weight factor coordinate normalizing proportions, said one precision weight factor coordinate normalizing proportion being variant and being defined for n degrees of freedom as the inverse of the nth root of the square (or the square of the nth root) of the corresponding coordinate variable measurement precision uncertainty as determined and/or estimated.

To provide precision-normalized regression analysis for data which can be represented by a rectified approximative equation of the form $$P_0 + CQ_c + \sum_{j=1}^{h} P_j Q_j = 0,$$

the representative linear matrix equation to be solved for explicit solution is $$\begin{bmatrix} \sum_{i=1}^{N} w_i & \sum_{i=1}^{N} w_i Q_{1_i} & \cdots & \sum_{i=1}^{N} w_i Q_{h_i} \\ \sum_{i=1}^{N} w_i Q_{1_i} & \sum_{i=1}^{N} w_i Q_{1_i} Q_{1_i} & \cdots & \sum_{i=1}^{N} w_i Q_{1_i} Q_{h_i} \\ \cdots & \cdots & \cdots & \cdots \\ \sum_{i=1}^{N} w_i Q_{h_i} & \sum_{i=1}^{N} w_i Q_{1_i} Q_{h_i} & \cdots & \sum_{i=1}^{N} w_i Q_{h_i} Q_{h_i} \end{bmatrix} \begin{Bmatrix} P_0 \\ P_1 \\ \cdots \\ P_h \end{Bmatrix} = \begin{Bmatrix} -\sum_{i=1}^{N} w_i C Q_{c_i} \\ -\sum_{i=1}^{N} w_i C Q_{c_i} Q_{1_i} \\ \cdots \\ -\sum_{i=1}^{N} w_i C Q_{c_i} Q_{h_i} \end{Bmatrix},$$

where h represents the number of non-resolute term coefficients being evaluated; $P_0$ and $P_j$ represent general approximative parameters; $Q_j$ represents term functions; C is a relative constant or resolute, and $Q_c$ is the function cofactor of the resolute which is most likely considered in functional form to represent a dependent variable. Weighting is provided by inclusion of the precision weight factor, $w_i$, comprising at least one variant precision weight factor coordinate normalizing proportion; $Q_{1_i}, \ldots, Q_{h_i}$ are evaluated term functions, N represents the number of datum available or selected for processing; and $P_0, P_1, \ldots, P_h$ represent the approximating parameters that are to be evaluated and provided by the reduction process.

Forms of discriminate regression analysis, other than precision-normalized regression analysis, vary from traditional nonlinear rectified forms (or linearized forms) of bivariate and multivariate regression analysis by weighting the square of the approximation deviations with variant weight factors which include at least one of n transformation weight factor coordinate normalizing proportions, said one transformation weight factor coordinate normalizing proportion being variant and respectively defined for n degrees of freedom as the inverse of the nth root of the square of the estimated differential change in measured phenomenon (or related approximation deviation) taken with respect to the coordinate-corresponding fundamental variable which represent the respective degree of freedom. (Invariant coordinate normalizing proportions need not be included in the transformation weight factor.) The representative linear matrix equation to be solved in order to provide explicit solution by discriminate regression analysis is $$\begin{bmatrix} \sum_{i=1}^{N} W_i[w_i] & \sum_{i=1}^{N} W_i[w_i]Q_{1_i} & \cdots & \sum_{i=1}^{N} W_i[w_i]Q_{h_i} \\ \sum_{i=1}^{N} W_i[w_i]Q_{1_i} & \sum_{i=1}^{N} W_i[w_i]Q_{1_i}Q_{1_i} & \cdots & \sum_{i=1}^{N} W_i[w_i]Q_{1_i}Q_{h_i} \\ \cdots & \cdots & \cdots & \cdots \\ \sum_{i=1}^{N} W_i[w_i]Q_{h_i} & \sum_{i=1}^{N} W_i[w_i]Q_{1_i}Q_{h_i} & \cdots & \sum_{i=1}^{N} W_i[w_i]Q_{h_i}Q_{h_i} \end{bmatrix} \begin{Bmatrix} P_0 \\ P_1 \\ \cdots \\ P_h \end{Bmatrix} = \begin{Bmatrix} -\sum_{i=1}^{N} W_i[w_i]CQ_{c_i} \\ -\sum_{i=1}^{N} W_i[w_i]CQ_{c_i}Q_{1_i} \\ \cdots \\ -\sum_{i=1}^{N} W_i[w_i]CQ_{1_i}Q_{h_i} \end{Bmatrix},$$

where weighting is provided by inclusion of a transformation weight factor, $W_i$, comprising at least one transformation weight factor coordinate normalizing proportion. For certain embodiments which include data acquisition by at-set-derivative data sampling, the transformation weight factor may be replaced by any constant value. The brackets around the precision weight factors, $[w_i]$ provide for optional inclusion.

For embodiments which include analog processing to provide the specific and pertinent operations of evaluating including multiplying, and integrating, the included summations may be replaced by integrals (or sums of piecewise continuous integrals). The corresponding integral matrix equation providing explicit solution by integral forms of discriminate regression analysis is $$\begin{bmatrix} \Sigma\int W[w]dt & \Sigma\int W[w]Q_1 dt & \ldots & \Sigma\int W[w]Q_h dt \\ \Sigma\int W[w]Q_1 dt & \Sigma\int W[w]Q_1 Q_1 dt & \ldots & \Sigma\int W[w]Q_1 Q_h dt \\ \ldots & \ldots & \ldots & \ldots \\ \Sigma\int W[w]Q_h dt & \Sigma\int W[w]Q_1 Q_h dt & \ldots & \Sigma\int W[w]Q_h Q_h dt \end{bmatrix} \begin{Bmatrix} P_0 \\ P_1 \\ \ldots \\ P_h \end{Bmatrix} = \begin{Bmatrix} -\Sigma\int W[w]CQ_c dt \\ -\Sigma\int W[w]CQ_c Q_1 dt \\ \ldots \\ -\Sigma\int W[w]CQ_c Q_h dt \end{Bmatrix}.$$

The included summations provide for intermittent integrations as interrupted by function discontinuities. They need not be included for continuous integrations. The integration variable, t, is considered over corresponding intervals for each included integration. It generally represents time, however, for some embodiments of the present invention it may represent an alternate dimension or variable.

Regression analysis is based upon an analytical technique of minimizing a representative sum with respect to approximative parameters that are to be evaluated. One coefficient, a resolute parameter, generally the coefficient of the dependent variable is assumed constant during the process. Conformal analysis as herein disclosed minimizes with respect to the initial constant and all of the included term coefficients of the approximation deviation, as parametrically represented, including the resolute. The technique includes the steps of evaluating approximating parameters by:

a. taking partial derivatives of a representative parametric function or sum with respect to the initial constant and all unknown coefficients, including a resolute,
b. evaluating the partial derivatives using assembled information or available data:
c. replacing the approximative parameters with the approximating parameters that are to be evaluated, and equating the evaluated form for the partial derivatives to zero;
d. consolidating equations by assigning a relative value to the resolute and imposing the interrelated resolute parameter restraints upon non-resolute parameters;
e. dropping the excess restraint equation from the system;
f. solving for the unknown approximating parameters.

Conformal analysis type 1 varies from regression analysis by a constant value, S, that is added to elements of the product column matrix. The required value is expressed by the following equation.

$$S = \sum_{i=1}^{N} [W_i]CQ_c \left( P_0 + CQ_c + \sum_{j=1}^{h} P_j Q_j \right).$$

Said constant value, S, is equal to the sum of the evaluated products (as estimated by successive approximations or provided by alternate form of evaluating) of approximation deviation multiplied by the included term containing the resolute, and by any pertinent or provided weight factor, $W_i$. The representative linear matrix equation to be solved in order to provide explicit solution by type 1 conformal analysis is $$\begin{bmatrix} \sum_{i=1}^{N}[W_i] & \sum_{i=1}^{N}[W_i]Q_{1_i} & \ldots & \sum_{i=1}^{N}[W_i]Q_{h_i} \\ \sum_{i=1}^{N}[W_i]Q_{1_i} & \sum_{i=1}^{N}[W_i]Q_{1_i}Q_{1_i} & \ldots & \sum_{i=1}^{N}[W_i]Q_{1_i}Q_{h_i} \\ \ldots & \ldots & \ldots & \ldots \\ \sum_{i=1}^{N}[W_i]Q_{h_i} & \sum_{i=1}^{N}[W_i]Q_{1_i}Q_{h_i} & \ldots & \sum_{i=1}^{N}[W_i]Q_{h_i}Q_{h_i} \end{bmatrix} \begin{Bmatrix} P_0 \\ P_1 \\ \ldots \\ P_h \end{Bmatrix} = \begin{Bmatrix} -\sum_{i=1}^{N}[W_i]CQ_{c_i} \\ S - \sum_{i=1}^{N}[W_i]CQ_{c_i}Q_{1_i} \\ \ldots \\ S - \sum_{i=1}^{N}[W_i]CQ_{c_i}Q_{h_i} \end{Bmatrix}.$$

The column matrix on the right hand side of the equation is referred to by the inventor as the product column matrix because it is the product of the coefficient matrix and the unknown parameter column matrix. The overall weight factor, $W_i$, when included, may represent constant value, or any variant or invariant weight factor. The preferred form is to include an overall weight factor representing a product of transformation weight factor and/or precision weight factor coordinate normalizing proportions.

Conformal analysis type 2 varies from regression analysis by an increase of order 1 in the matrix equation, and with the elements of the product column matrix represented by repeated values of a specified constant, A, and zero. The rectified approximative equation, including all h+1 coefficients, can be expressed by the form $$P_0 = \sum_{j=1}^{h+1} P_j Q_j = 0.$$

There is no coefficient designated as resolute in the expression. The linear matrix equation that is solved in providing explicit solution using type 2 conformal analysis is $$\begin{bmatrix} \sum_{i=1}^{N}[W_i] & \sum_{i=1}^{N}[W_i]Q_{1_i} & \cdots & \sum_{i=1}^{N}[W_i]Q_{h+1_i} \\ \sum_{i=1}^{N}[W_i]Q_{1_i} & \sum_{i=1}^{N}[W_i]Q_{1_i}Q_{1_i} & \cdots & \sum_{i=1}^{N}[W_i]Q_{1_i}Q_{h+1_i} \\ \cdots & \cdots & \cdots & \cdots \\ \sum_{i=1}^{N}[W_i]Q_{h+1_i} & \sum_{i=1}^{N}[W_i]Q_{1_i}Q_{h+1_i} & \cdots & \sum_{i=1}^{N}[W_i]Q_{h+1_i}Q_{h+1_i} \end{bmatrix} \begin{Bmatrix} P_0 \\ P_1 \\ \cdots \\ P_h \end{Bmatrix} = \begin{Bmatrix} 0 \\ A \\ \cdots \\ A \end{Bmatrix},$$

where $W_i$ is again included to represent any assumed weight factor or constant value. Again, the preferred form is to include an overall weight factor representing a product of transformation weight factor and/or precision weight factor coordinate normalizing proportions.

In accordance with the present invention, since coefficients of all term cofactors representing both dependent and independent variables are included in the unknown parameter column matrix, providing relative solution using type 2 conformal analysis does not require resolution of nor division by the coefficient matrix determinant.

For embodiments which include analog processing to provide the specific and pertinent operations of evaluating including multiplying, and integration, the included summations may be replaced by integrals (or sums of piecewise continuous integrals). The corresponding integral matrix equation providing explicit solution by integral forms of type 2 conformal analysis is $$\begin{bmatrix} \Sigma\!\int[W]dt & \Sigma\!\int[W]Q_1 dt & \cdots & \Sigma\!\int[W]Q_{h+1} dt \\ \Sigma\!\int[W]Q_1 dt & \Sigma\!\int[W]Q_1 Q_1 dt & \cdots & \Sigma\!\int[W]Q_1 Q_{h+1} dt \\ \cdots & \cdots & \cdots & \cdots \\ \Sigma\!\int[W]Q_{h+1} dt & \Sigma\!\int[W]Q_1 Q_{h+1} dt & \cdots & \Sigma\!\int[W]Q_{h+1}Q_{h+1_i} dt \end{bmatrix} \begin{Bmatrix} P_0 \\ P_1 \\ \cdots \\ P_{h+1} \end{Bmatrix} = \begin{Bmatrix} 0 \\ A \\ \cdots \\ A \end{Bmatrix}.$$

The included summations provide for intermittent integrations as interrupted by function discontinuities. They need not be included for continuous integrations. The integration variable may represent any appropriate variable. Unless there is a need to relate the approximating parameters to the constant value, A, there is no need to evaluate or divide by the coefficient matrix determinant to provide relative solution.

It should be noted that forms of conformal analysis other than type 1 and type 2 conformal analysis may not appropriately transfer resolute parameter restraints and hence are not anticipated to provide appropriate results. Such other forms of conformal analysis that might be considered as possible forms for data reduction include forms rendered by either:

1. including constant multiples of the said constant value, S, as positive or negative terms in one or more of the elements of the product column matrix of the representative matrix equation as described to provide forms of type 1 conformal analysis; or by
2. providing alternate combinations and multiples of said specified constant, A, and zero in the formation of the product column matrix of the matrix equation as described to provide forms of type 2 conformal analysis.

Discriminate reduction data processing will generally require effectuation of the following operations:

1. formulation of any included weight factors or weight factor coordinate normalizing proportions;
2. formulation of sums (or integral sums) of weight factors and sums (or integral sums) of products of weight factors multiplied by evaluated term functions;
3. organization of the sums in memory so as to provide correspondence between the provided data and the represented approximating parameters as dictated by the selected analysis type, provided function definitions, and corresponding data reduction procedure;
4. evaluation of estimates for approximating parameters utilizing data as organized in memory;
5. establishment of new estimates as is pertinent. Operation items 1 through 5 may be repeated as provided by control command logic until a requested process is complete or aborted. Assuming the process is not aborted, estimates are provided to memory and/or transferred to an output device 3 and/or peripheral output equipment, FIG. 1E, as provided for display, preservation, utilization, transport, and/or storage.

Formulation and inclusion of weight factors are recommended but not required to render forms of conformal analysis and sectional regression analysis as discriminate reduction data processing.

It should be noted that discriminate reduction data processing is not considered nor provided for applications which reflect only one degree of freedom.

Discriminate Rectification

Figure 7A:
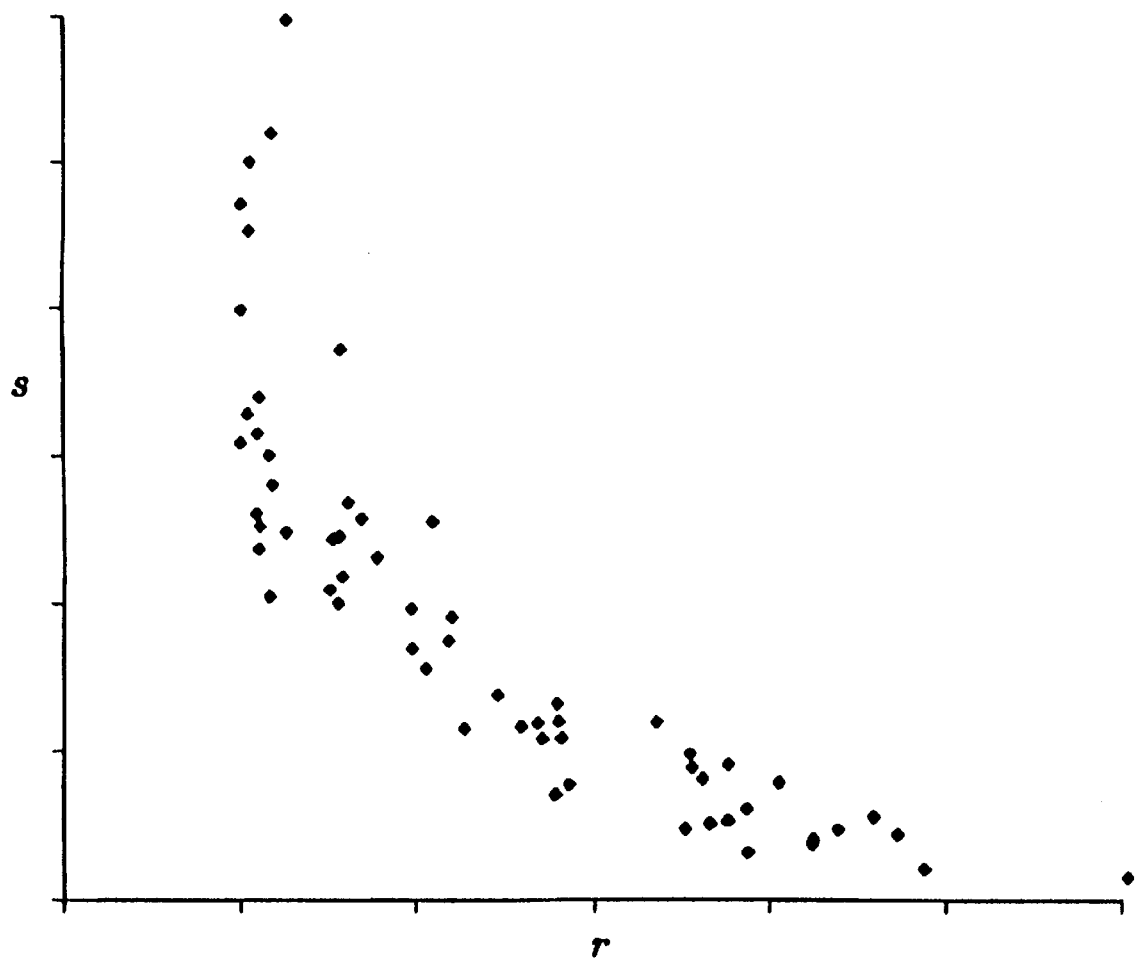
FIG. 7A through 7F illustrate steps of discriminate rectification for a bivariate application in accordance with the present invention.
Figure 7B:
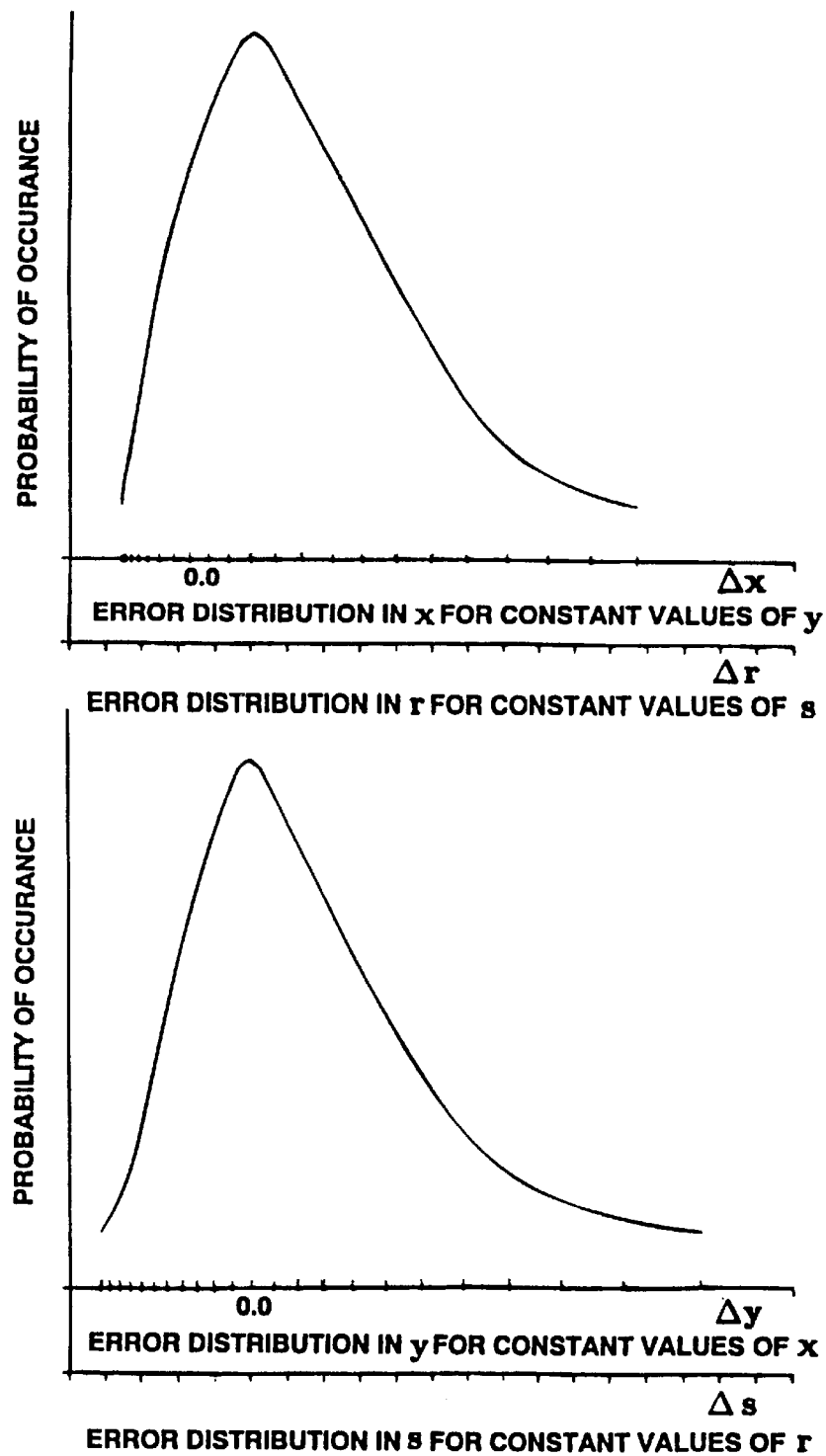
Figure 7C:
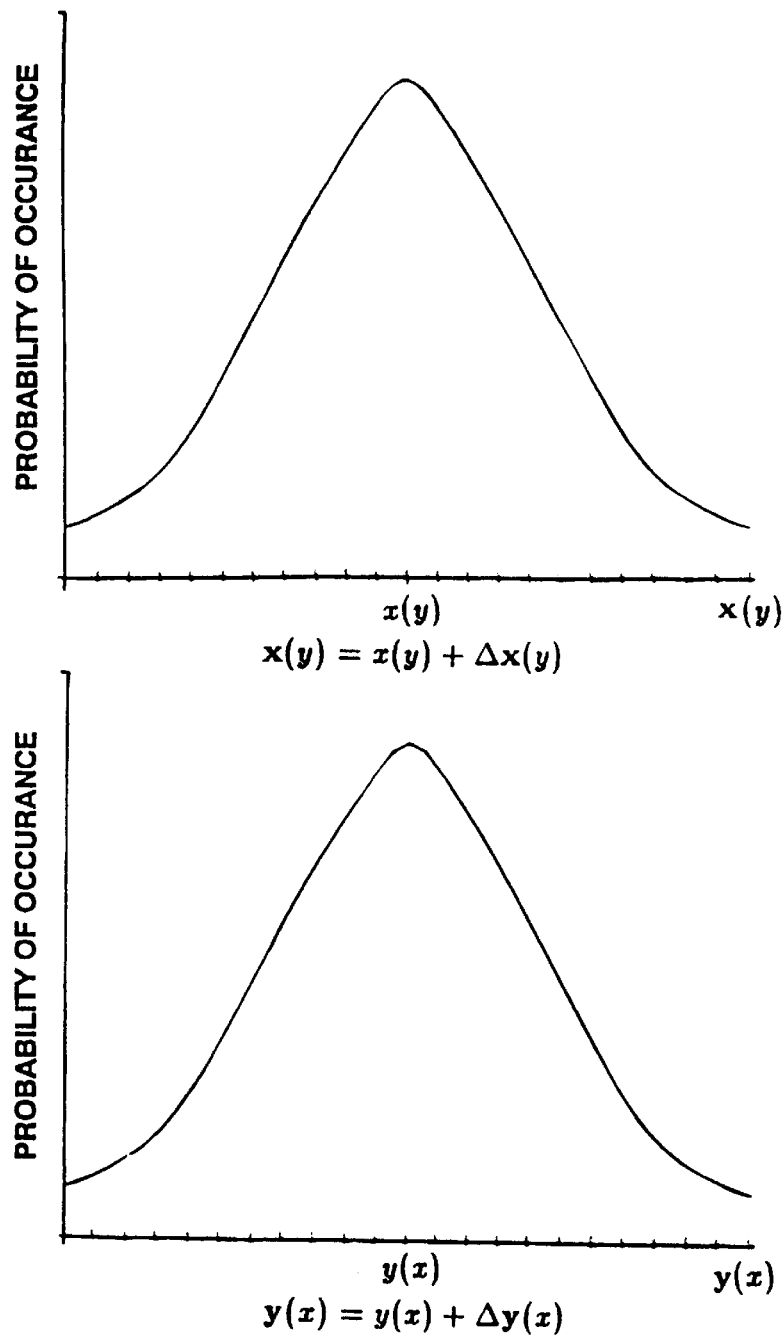
Figure 7D:
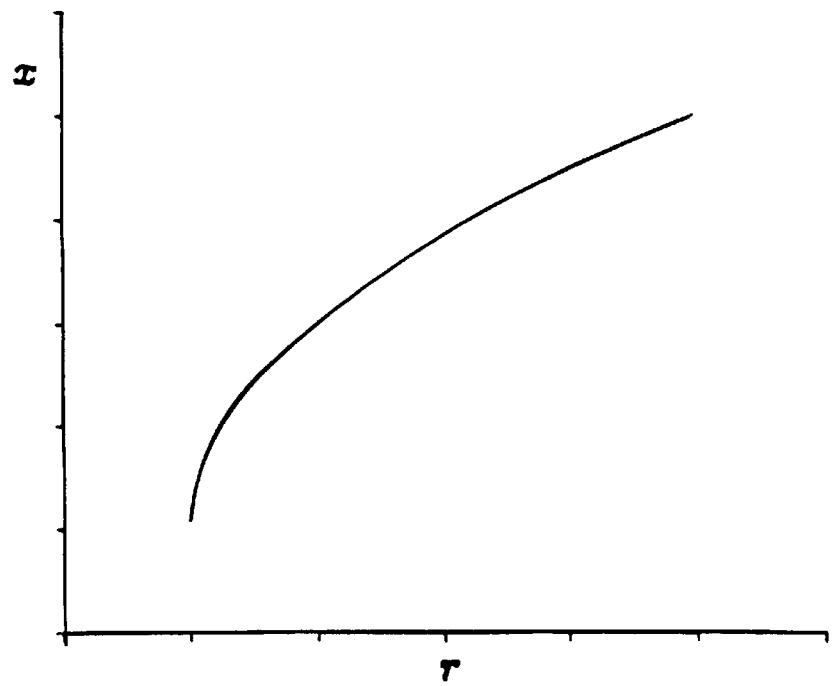
Figure 7D:
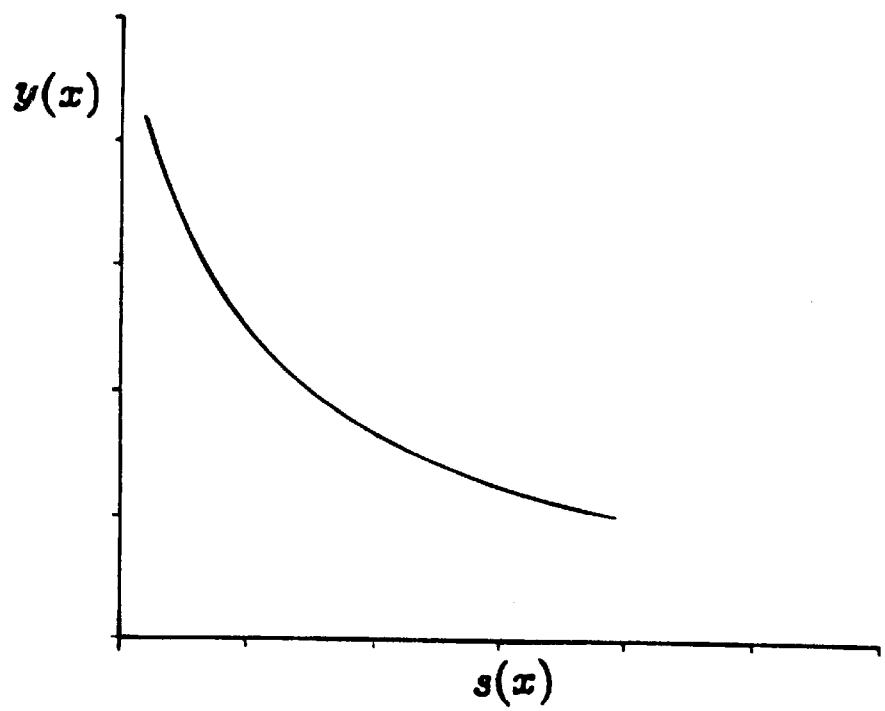
Figure 7E:
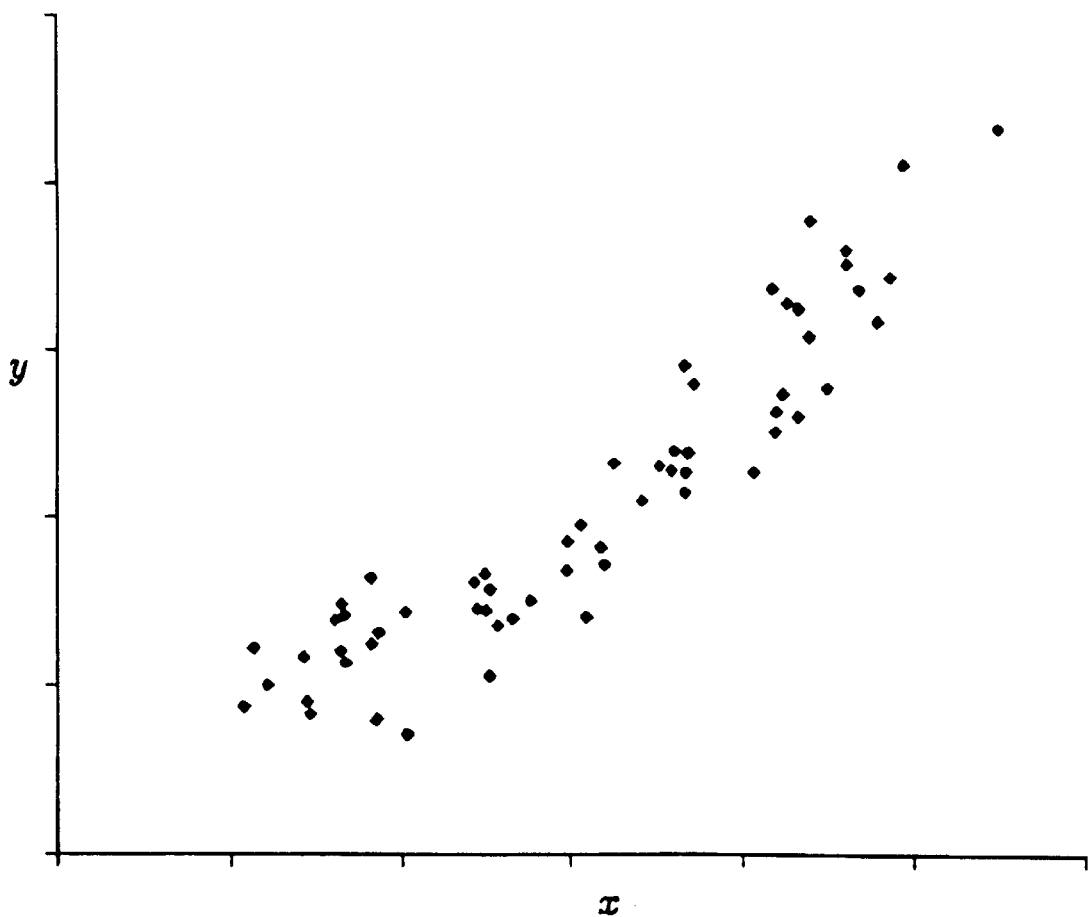
Figure 7F:
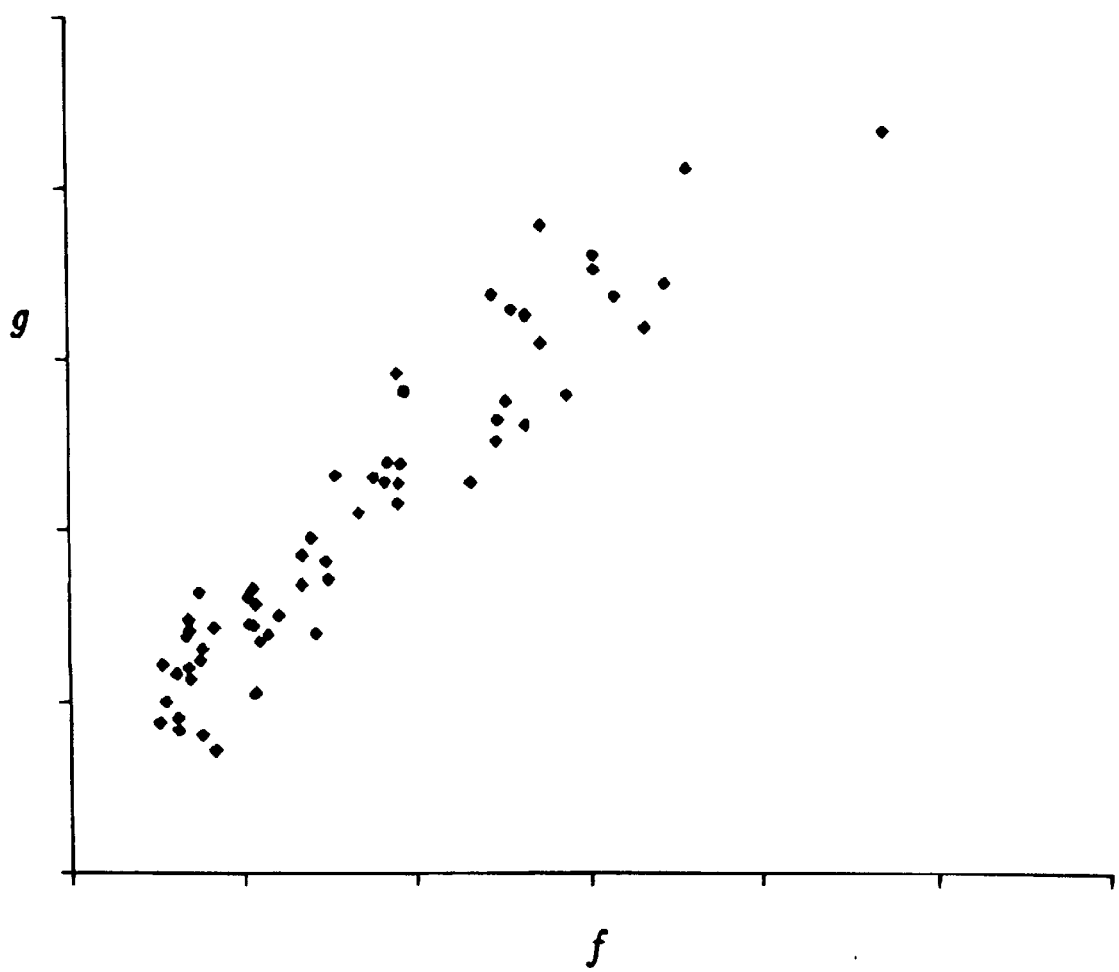

Generally, independent data samples can be represented by error distributions which can be considered as nonskewed, or symmetric about the mean value. Such data can be considered to be represented by fundamental coordinates. (Fundamental coordinates in the context of this disclosure are defined as coordinates which provide nonskewed error distributions for variable measurements.) For example, now referring to FIG. 7A through FIG. 7F, discriminate reduction data processing assumes that the selected rectified approximative equations represent data that have been related to fundamental coordinates. The subsidiary process of providing estimates for transformation weight factors which correspond to both the fundamental coordinates and a selected rectified form is referred to by the inventor as the process of discriminate rectification. FIG. 7A through FIG. 7F illustrate hypothetical bivariate data (with skewed error distributions) at various stages in the process of discriminate rectification. It also portrays the roll of uncertainty in the selection of fundamental variables. FIG. 7A depicts the hypothetical data. FIG. 7B illustrates the skewed error distribution in a representative r s coordinate system as it transforms to a corresponding Gaussian error distribution in a fundamental x y coordinate system. FIG. 7C illustrates the nonskewed Gaussian error distribution in the x y coordinate system. (It should be noted that although a Gaussian error distribution was selected for this particular illustration, the nonskewed form of the error distribution in the fundamental coordinate system is not required to be Gaussian.) FIG. 7D illustrates the relationship between fundamental coordinates and representative ones. FIG. 7E presents the data transformed to a fundamental coordinate system. FIG. 7F presents the same data in rectified form.

The process of discriminate rectification as illustrated can be utilized to establish the fundamental coordinates, determine a parametric representation of the assembled information or data, estimate representative transformation weight factors and/or provide requirements for selective data sampling. The process includes:

1. either verifying variable measurement precision to be nonskewed, or representing assembled information or data in terms of fundamental variables which are characterized by nonskewed error distributions;
2. expressing an appropriate approximative equation in terms of the fundamental variables;
3. transforming the approximative equation to a linear, or rectified, form;
4. providing appropriate data points; and
5. characterizing the transformation of each datum with a corresponding transformation weight factor.

Steps 1,2, and 3 of the process depend upon the inherent properties of the data and, consequently, may require a certain amount of theoretical investigation and uncertainty analysis. The process is finalized in steps 4 and 5 by selecting pertinent data points and/or providing corresponding transformation weight factor estimates. The subsidiary process of collecting data samples which are representative of measurable phenomenon and placing the samples along with pertinent uncertainty information, function representations, and support parameters so as to be in form to be acted upon by the reduction process is referred to herein by the inventor as sample acquisition and data reduction characterization. The subsidiary process of utilizing analog or digital representation of differential change in measured phenomenon (or related approximation deviation) estimated with respect to fundamental coordinates, to provide transformation weight factors is referred to by the inventor as final stage discriminate rectification.

Reduction Considerations

The common object of data reduction systems is to determine parameters which define relationships (which can generally be expressed in the form of equations) to provide convenient representations of assembled information or available data. A general form for a descriptive equation assumed to relate components of hypothetically exact error-corrected data is represented by equation 1.

$$p_{l_0} + \sum_{k=1}^{m_l} p_{l_k} Q_{kl}([x_1, \ldots, x_n, p_1, \ldots, p_n]) = 0. \qquad (1)$$

Lower case characters. $p_{l_0}$ and $p_{l_k}$, represent unique values for the initial constant and coefficients that are characteristic of the error-corrected rectified form. Each of the $m_l$ subscripted functions, $Q_{kl}$, is assumed to be a function of one or more of n fundamental error-corrected datum variables, $\chi_1, \ldots, \chi_n$. (The total number of term functions, $m_l$, in the representation may or may not be equal to the number of variables, n.) Each function, $Q_{kl}$, may also be characterized by the inclusion of any number or combination of n descriptive parameters, $p_1, \ldots, p_n$. An initial constant $P_{l_0}$ may be included as an element of or represented as a function of elements of the set of descriptive parameters. Any function coefficients, $p_{l_k}$ are also assumed to be included in the set of descriptive parameters. An ideal processing system would precisely determine and provide values for all unknown descriptive parameters. The e subscript designates correspondence to a particular rectified form for the equation. The brackets within the parenthesis indicate optional inclusions that depend upon the explicit form of the descriptive equation.

The general form for an approximating equation is represented by equation 2.

$$P_{l_0} + \sum_{k=1}^{m_l} P_{l_k} Q_{kl}([X_1, \ldots, X_n, P_1, \ldots, P_n]) = 0. \qquad (2)$$

The gerund form of the verb, approximating, is used in this context to refer to a single equation of a parametric family of equations. The approximating equation will differ from an ideal descriptive equation by the function deviation. The subscripted functions, $Q_{kl}$, are assumed functions of one or more of the n fundamental approximation variables, $X_1, \ldots, X_n$. The upper case characters, $P_1, \ldots, P_n, P_{l_0}$ and the corresponding coefficients, $P_{l_k}$, represent single valued approximating parameters that are assumed to be characteristic of the assembled information or data. Estimated values for these parameters as represented and provided, or stored, are considered to be a product of the data reduction system. They delineate or characterize variation in characteristic measurement as represented by the approximative equation and as provided by the available data and the reduction process. They may be utilized, for example, to represent quantifications, predictions, definitions, parameter sets, or simply to establish an appropriate approximating equation. In accordance with the present invention, any representation, which is generated by means including evaluating, providing, storing, or utilizing at least one determined quantity representing an approximating parameter, is considered to be a data representation of variation in characteristic measurement.

A general parametric form for a rectified approximative equation is presented by equation 3.

$$P_{l_0} + \sum_{j=1}^{m_l} P_{l_j} Q_{jl}([X_1, \ldots, X_n, P_1, \ldots, P_n]) = 0. \qquad (3)$$

The descriptive adjective, approximative, is used to refer to a parametric family of equations that is assumed to be descriptive of the data. The subscripted functions, $Q_{jl}$, are assumed to be functions of one or more of the n fundamental approximation variables. The slanted upper case characters, $P_1, \ldots, P_n, P_{l_0}$ and the corresponding coefficients, $P_{l_j}$, are parametric representations of values that might be assumed to be characteristic of the assembled information. These parameters (as represented by approximating parameters when subjected to pertinent approximated minimizing restraints) are evaluated by the data reduction system. The general method of evaluation is to determine values for said approximating parameters which minimize an appropriate parametric expression as evaluated in correspondence with provided information.

In accordance with the present invention, an appropriate parametric expression is provided as the sum of squares of coordinate normalizing approximation deviations, which when minimized, represent the sum of the squares of approximation deviations which are individually weighted and assumed to establish representation as the sum of a plurality of actual datum variances which are individually transformed to a corresponding plurality of normalized coordinate systems which (for an appropriate approximative equation and reasonably small error deviation) can be assumed to provide equivalent weighting for all components of each individual datum error deviation.

The Approximation Deviation

The approximation deviation, $v_l$, is defined by the left side of the error-corrected approximating equation (equation 2)

with the assumed error-corrected approximation variables, $X_1, \ldots, X_n$, replaced by the actual error-affected ones, $x_1, \ldots, x_n$.

$$v_l = P_{l_0} + \sum_{k=1}^{m_l} P_{l_k} Q_{kl}([x_1, \ldots, x_n, P_1, \ldots, P_n]) \quad (4)$$

For an appropriately selected approximating equation, the fundamental approximation variables will statistically represent the fundamental error-corrected datum variables, and the approximation deviation can be considered equal to an exact evaluated form which can be expressed by the left side of equation 1 with the actual error-corrected variables replaced by the error-affected ones.

$$v_l \approx p_{l_0} + \sum_{k=1}^{m_l} p_{l_k} Q_{kl}([x_1, \ldots, x_n, p_1, \ldots, p_n]). \quad (5)$$

Traditional forms of regression analysis assume that the error deviations are restricted to and are represented as single dimension deviations which are spurious for multi-dimensional variations of uncertainty. Past efforts to minimize multidimensional error deviations as represented by single dimensional deviations have met with only limited success. (A synopsis of several somewhat successful least-squares analytical models has been prepared by Macdonald and Thompson in the paper "Least-squares Fitting When Both Variables Contain Errors: Pitfalls and Possibilities," Am. J. Phys. 60 (1). January 1992.)

An alternative to the various approaches that have been taken in the past, is to consider a plurality of coordinate systems in one to one correspondence with the available data, and to transform of each datum to a corresponding individually normalized coordinate system that will appropriately weight each component of said datum error deviation to provide equivalent (or nearly equivalent) projections along each corresponding coordinate axis. Such a normalization would appropriately weight each component of each error deviation (in its respective normalized coordinate system) to provide statistically accurate results. Fortunately, by assuming nonskewed error distribution functions for the precision uncertainties, $U_{x_i}$, in $x_i$, and by individually weighting the square of a parametric representation of each approximation deviation utilizing the appropriate precision and/or transformation weight factors, or variant coordinate normalizing proportions of the same, a reduction affording the normalization can be provided. Herein disclosed individually-normalized multiple dimension single datum variances (referred to as coordinate-normalized datum variances) can be represented as the square of coordinate normalizing approximation deviations, $W_l[w][P_{l_0} + \Sigma_{k=1}^{m_l} P_{l_k} Q_{kl}]^2$, which, in parametric form, $W_l([w][P_{l_0} + \Sigma_{k=1}^{m_l} P_{l_k} Q_{kl}]^2$, can be summed and minimized to provide valid (statistically representative) approximations as evaluated approximating parameters. In accordance with the present invention, the squared coordinate normalizing approximation deviations are squared approximation deviations that are individually weighted as herein disclosed (or are rendered by nature or sampling techniques), so as to represent coordinate-normalized datum variances (or relative or nondimensional forms of the same). A parametric expression for the sum of a plurality of squared coordinate normalizing approximation deviations is established as a parametric representation of the sum of squares of approximation deviations that are individually weighted as may be required to parametrically represent the sum of the squares of corresponding multidimensional coordinate-normalized datum error deviations, as herein disclosed, by the inclusion of considered pertinent transformation weight factor coordinate normalizing proportions and/or available and considered pertinent precision weight factor coordinate normalizing proportions.

The Single Datum Variance

A single datum variance (or point variance) can be defined as an estimate of the sum of the squares of the components of corresponding datum error deviation. It is referred to herein as a variance rather than a squared deviation because it may represent either positive or negative components. The suggested form for normalization is disclosed by equations 6 and 7. Equation 6 defines a relative coordinate-normalized form for the datum variance, $v_l$, in terms of n fundamental variables representing the pertinent degrees of freedom.

$$\underline{v}_l = \sum_{k=1}^{n} C[w] \left[ \Delta x_k \left( \prod_{\eta=1}^{n} \frac{\partial x_n}{\partial x_k} \right)^{\frac{1}{n}} \right]^2. \quad (6)$$

Equation 7 defines the n corresponding components of coordinate-normalized datum error deviations, $\underline{\delta}_{lk}$, $$\underline{\delta}_{lk} = (C[w])^{\frac{1}{2}} \Delta x_k \left( \prod_{\eta=1}^{n} \frac{\partial x_n}{\partial x_k} \right)^{\frac{1}{n}}. \quad (7)$$

As should be expected, the coordinate-normalized datum variances as expressed by equation 6 are equal to the sum of the squares of the components of the corresponding coordinate-normalized datum error deviations. An optional precision weight factor, w, is included in the equation to provide normalization with respect to precision uncertainty. The parameter C, included in the equation, is a proportionality constant which is provided for computational convenience. It may be omitted, or replaced by any arbitrary value.

For small error deviation, the normalization disclosed by equations 6 and 7 provides nearly equivalent deviation weighting along all fundamental coordinate axes. This form of normalization, if accurately represented, can be considered to be free from both coordinate and uncertainty bias.

A nondimensional form for the coordinate-normalized datum variance, $\underline{v}_l$, is disclosed by equation 8.

$$\underline{\underline{v}}_l = \sum_{k=1}^{n} \left[ \frac{\Delta x_k}{\left( \prod_{\eta=1}^{n} U_{x_\eta} \right)^{\frac{1}{n}}} \left( \prod_{\eta=1}^{n} \frac{\partial x_n}{\partial x_k} \right)^{\frac{1}{n}} \right]^2. \quad (8)$$

The corresponding nondimensional form for the coordinate-normalized datum error deviations, $\underline{\underline{\delta}}_{lk}$ is disclosed by equation 9.

$$\underline{\underline{\delta}}_{lk} = \frac{\Delta x_k}{\left( \prod_{\eta=1}^{n} U_{x_\eta} \right)^{\frac{1}{n}}} \left( \prod_{\eta=1}^{n} \frac{\partial x_n}{\partial x_k} \right)^{\frac{1}{n}}. \quad (9)$$

A valid estimation of the coordinate-normalized datum variance can now be provided for most applications by including the optional precision weight factor, w, and a transformation weight factor, $W_l$, in the expression for the square of the approximation deviation.

$$\underline{v}_l \approx W_l[w] \left\{ P_{l_0} + \sum_{k=1}^{m_l} P_{l_k} Q_{kl}([x_1, \ldots, x_n, P_1, \ldots, P_n]) \right\}^2. \quad (10)$$

The Precision Weight Factor

The disclosed forms for the nondimensional and coordinate-normalized datum variance and corresponding deviations expressed by equations 6 through 9 imply form for a composite precision normalizing weight factor which can be represented as a product of coordinate normalizing proportions. Combining equation 6 with equation 8 will yield an expression for an overall precision weight factor as a product of component parts.

$$w \propto \prod_{j=1}^{n} \left( \frac{1}{U_{x_j}} \right)^{\frac{2}{n}}. \quad (11)$$

The implied composite precision weight factor, w, as included in equations 6,7, and 10, is disclosed for n degrees of freedom (or n respective fundamental variables) as the inverse of the nth root of the square (or the square of the nth root) of the product of pertinent nonzero coordinate related precision uncertainties, or constant proportion thereof. The composite product of any combination of nonzero, finite, j subscripted, coordinate normalizing proportions, $$\left( \frac{1}{U_{x_j}} \right)^{\frac{2}{n}},$$

which respectively correspond to distinct degrees of freedom, can be considered and employed as a precision weight factor, w. The notation of brackets enclosing the weight factor, [w], as in equations 6,7, and 10, denote that its inclusion is optional. The precision weight factor can be used with either linear or nonlinear approximative equations. It is not necessarily required but may be useful when datum precision is not uniform from point to point and when insufficient data are available to provide an accurate representation at each coordinate location. The precision weight factor may also be useful when combining data sets that are of unequal precision. It is recommended by the inventor that weight factors include all variant precision weight factor coordinate normalizing proportions.

Variant Precision weight factor coordinate normalizing proportions (as determined from measured or estimated error components or uncertainty) can be used with linear approximative equations to provide representation for coordinate-normalized datum variances without including corresponding constant valued transformation weight factors. The right side of equation 10, written to exclude or with an assumed constant value replacing the transformation weight factor, defines form for a precision-normalizing approximation deviation, The Transformation Weight Factor Transformation weight factors may also be provided as variant products of coordinate normalizing proportions, each representing a different variable and corresponding degree of freedom. A transformation weight factor can be best described as the approximate proportionality constant between a coordinate-normalized datum variance (defined by equation 6) and the square of the corresponding precision-normalizing approximation deviation. It has been discovered by the inventor that the transformation weight factors can be defined for practical applications as inversely proportional to the absolute value of the nth root of the square of the product of differential changes in phenomenon (or related approximation deviation) with respect to each of n express fundamental variables (as sampled or evaluated at the representative data points) or constant proportion of the same. A useful analytical expression for approximating the transformation weight factors is disclosed by equation 12.

$$W_{l_i} \approx \frac{C}{\left| \prod_{\eta=1}^{n} \sum_{k=1}^{m_l} P_{l_k} \left( \frac{\partial Q_{kl}}{\partial X_\eta} \bigg|_{x_1, \ldots, x_{n_i}} \right) \right|^{\frac{2}{n}}} \propto \frac{1}{\left| \prod_{\eta=1}^{n} \sum_{k=1}^{m_l} P_{l_k} \left( \frac{\partial Q_{kl}}{\partial X_\eta} \bigg|_{x_1, \ldots, x_{n_i}} \right) \right|^{\frac{2}{n}}}. \quad (12)$$

The transformation weight factor is the composite product of n coordinate normalizing proportions, $$\frac{1}{\left| \sum_{k=1}^{m_l} P_{l_k} \left( \frac{\partial Q_{kl}}{\partial X_\eta} \bigg|_{x_1, \ldots, x_{n_i}} \right) \right|^{\frac{2}{n}}},$$

and an optional proportionality constant, C. The constant can be included because only relative values for weight factors are required to provide proportionate weighting. The constant can be set to any assumed value or, as may be required, it may be set to a value that will provide for numerical evaluation within the computational limits of the processor. It should be noted that transformation weight factors are not required when approximative equations are linear with respect to the fundamental variables, and similarly, invariant coordinate normalizing proportions need not be included in the composite weight factor product.

Once a selected form for the approximative equation is established equation 12 can be employed to provide estimates of transformation weight factors for specific application. (Iteration may or may not be required.) For relatively small errors with nonskewed error distributions, in the limit as the function deviation approaches zero, the approximations for the coordinate-normalized datum variance expressed by equation 10 (including the transformation weight factor as provided by equation 12) are approximately equal to the coordinate-normalized datum variances defined by equation 6.

$$\lim_{P \to p \text{ and } Q \to Q} W_l[w] \left\{ P_{l_0} + \sum_{k=1}^{m_l} P_{l_k} Q_{kl}([x_1, \ldots, x_n, P_1, \ldots, P_n]) \right\}^2 \approx \quad (13)$$

$$\sum_{k=1}^{n} C[w] \left\{ \Delta x_k \left[ \frac{\sum_{j=1}^{m_l} p_{l_j} \left( \frac{\partial Q_{jl}}{\partial X_k} \bigg|_{x_1, \ldots, x_n} \right)}{\left| \prod_{\eta=1}^{n} \sum_{j=1}^{m_l} P_{l_j} \left( \frac{\partial Q_{jl}}{\partial X_\eta} \bigg|_{x_1, \ldots, x_{n_i}} \right) \right|^{\frac{1}{n}}} \right] \right\}^2 \approx$$

-continued $$\sum_{k=1}^{n} C[w] \left[ \Delta x_k \left( \prod_{\eta=1}^{n} \frac{\partial x_n}{\partial x_k} \right)^{\frac{1}{n}} \right]^2 .$$

The discovery of transformation weight factors and its verification by the approximation of equation 13 validate the estimated form for a coordinate-normalized datum variance as expressed by equation 10 and provides for an appropriately normalized parametric representation for the corresponding sum. Transformation weight factors as discovered and defined by the inventor for practical applications, including valid approximations thereof, are the key to non-linear data processing and corresponding multi-dimensional statistical analysis as disclosed by this invention. Also, in accordance with this invention, transformation weight factor coordinate normalizing proportions, formulated and evaluated as representative of datum measurement, multiplied together with the square of the corresponding approximation deviations as defined by equation 4 and multiplied also by any pertinent and available variant precision weight factor coordinate normalizing proportions, provide for the evaluation of the square of coordinate normalizing approximation deviations, to be considered for error quantification as indirect measurements of coordinate-normalized datum variances as herein disclosed. Said indirect measurements of coordinate-normalized datum variances provide for data representation of variation in characteristic measurement which can be considered as descriptive of datum uncertainty.

Parametric Forms for the coordinate-normalized Datum Variance

Parametric forms for the coordinate-normalized datum variance, $V_{li}$, can be written by replacing the constant parameters, P, by corresponding parametric representations, P. The representation is expressed by equation 14.

$$V_{li} = W_{li}([w_i]) \left\{ P_{l_0} + \sum_{k=1}^{m_l} P_{l_k} Q_{kl}([x_{1i}, \ldots, x_{ni}, P_1, \ldots, P_n]) \right\}^2 . \quad (14)$$

The corresponding parametric representation for the sum of the coordinate-normalized datum variances is represented by equation 15.

$$\xi \approx \sum_{i=1}^{N} W_{li}([w_i]) \left[ P_{l_0} + \sum_{j=1}^{m_l} P_{l_j} Q_{jl}|_i \right]^2 . \quad (15)$$

Discriminate Regression Analysis

Traditional regression analysis is a process of representing data or assembled information by minimizing the sum of squared deviations with respect to certain approximative parameters. Normalization generally has been ignored or based upon dividing by the square of estimated uncertainty or spurious representations of squared error deviations. For cases, when measurements are not of the same quality, traditional regression analysis provides for the weighting of the function cofactor of a resolute parameter by the represented weight of corresponding said function cofactor measurement. Discriminate regression analysis according to the present invention is distinguished from traditional forms of regression analysis by utilizing selective at-set-derivative data sampling to establish appropriate normalization weighting, and/or by including at least one variant transformation weight factor coordinate normalizing proportion and/or at least one variant precision weight factor coordinate normalizing proportion to provide normalization weighting which will render squared coordinate normalizing approximation deviations as representing coordinate-normalized datum variances. The explicit form for the normalization is provided for by the approximation of equation 13 and reflected in the parametric estimate for the sum of coordinate-normalized datum variances, which is approximated by a parametric expression for the sum of a plurality of squared coordinate normalizing approximation deviations by equation 15. The initial steps involved in minimizing a parametric expression for the sum of estimated coordinate-normalized datum variances as given by equation 15 will provide a total of $m_l+1$ equations, one of which is not independent. A $m_l+1$ parameter system of equations describing the initial constant, $P_{l_0}$, and all coefficients, $P_{l_k}$, would be indeterminate. However, a solution can be readily determined by initially assuming a constant value for one of the $m_l$ coefficients, $Pm_{l_m}$, which is referred to by the inventor herein as the resolute. (This assumption characterizes the associated discriminate process as a form of regression analysis.) With this assumption, the approximation for the sum of the parametric datum variances as given by equation 15 will take the form expressed by equation 16.

$$\xi \approx \sum_{i=1}^{N} W_{li}([w_i]) \left[ P_{m_{l_0}} + (P_{m_{l_m}} - P_{m_{l_m}})(Q_{ml}|_i) + \sum_{j=1}^{m_l} P_{m_{l_j}}(Q_{jl}|_i) \right]^2 . \quad (16)$$

The assumption is only valid provided that all error deviations (other than that which is aligned with the function cofactor of the resolute) can be neglected. Assuming a specific value for the resolute, will establish a relative magnitude for the remaining coefficients.

Minimizing equation 16 with respect to the me remaining unknown parameters will yield a solution set which can be described by the following determinant equations.

$$\frac{P_{m_{lm}}}{P_{m_{lm}}} = \frac{\begin{vmatrix} a_{l_{0,0}} & \cdots & a_{l_{k-1,0}} & -a_{l_{k+1,0}} & a_{l_{k+1,0}} & \cdots & a_{l_{m-1,0}} & a_{l_{m+l,0}} & \cdots & a_{l_{ml,0}} \\ \cdots & \cdots & \cdots & \cdots & \cdots & \cdots & \cdots & \cdots & \cdots & \cdots \\ a_{l_{0,m-1}} & \cdots & a_{l_{k-l,m-1}} & -a_{l_{m,m-1}} & a_{l_{k+1,m-1}} & \cdots & a_{l_{m-1,m-1}} & a_{l_{m+1,m-1}} & \cdots & a_{l_{ml,m-1}} \\ a_{l_{0,m+1}} & \cdots & a_{l_{k-1,m+1}} & -a_{l_{m,m+1}} & a_{l_{k+1,m+1}} & \cdots & a_{l_{m-1,m+1}} & a_{l_{m+1,m+1}} & \cdots & a_{l_{ml,m+1}} \\ \cdots & \cdots & \cdots & \cdots & \cdots & \cdots & \cdots & \cdots & \cdots & \cdots \\ a_{l_{0,ml}} & \cdots & a_{l_{k-1,ml}} & -a_{l_{m,ml}} & a_{l_{k+1,ml}} & \cdots & a_{l_{m-1,ml}} & a_{l_{m+1,ml}} & \cdots & a_{l_{ml,ml}} \end{vmatrix}}{\begin{vmatrix} a_{l_{0,0}} & \cdots & a_{l_{m-1,0}} & a_{l_{m+1,0}} & \cdots & a_{l_{ml,0}} \\ \cdots & \cdots & \cdots & \cdots & \cdots & \cdots \\ a_{l_{0,m-1}} & \cdots & a_{l_{m-1,m-1}} & a_{l_{m+1,m-1}} & \cdots & a_{l_{ml,m-1}} \\ a_{l_{0,m+1}} & \cdots & a_{l_{m-1,m+l}} & a_{l_{m+1,m+1}} & \cdots & a_{l_{ml,m+1}} \\ \cdots & \cdots & \cdots & \cdots & \cdots & \cdots \\ a_{l_{0,ml}} & \cdots & a_{l_{m-1,ml}} & a_{l_{m+1,ml}} & \cdots & a_{l_{ml,ml}} \end{vmatrix}} \quad (17)$$

The element $a_{l_{0,0}}$ is the sum of the products of the weight factor coordinate normalizing proportions, $\Sigma_{i=1}^{N} W_i[w]$. The elements $a_{l_{ij}}$, $a_{l_{i,0}}$, $a_{l_{0j}}$, for values of i and j between 1 and $m_l$, are given respectively by equations 18, 19, and 20.

$$a_{l_{ij}} = \sum_{i=1}^{N} W_i[w] Q_{it} Q_{jt}|_i. \quad (18)$$

$$a_{l_{i,0}} = \sum_{i=1}^{N} W_i[w] Q_{it}|_i. \quad (19)$$

$$a_{l_{0j}} = \sum_{i=1}^{N} W_i[w] Q_{jt}|_i. \quad (20)$$

Approximate Discriminate Regressions (Assuming Negligible Error)

For ideal data reduction, the sums of products, $a_{l_{ij}}$, $a_{l_{i,0}}$ and $a_{l_{0j}}$, should be evaluated using the error-corrected coordinate points $(\chi_{1i}, \ldots, \chi_{ni})$. Because errors in the data are generally not known, such an evaluation is not generally feasible. Approximations must be made. The first such approximation is to evaluate the sums of products at the error-affected coordinate points, $(x_{1i}, \ldots, x_{ni})$.

$$a_{l_{ij}} \approx \sum_{i=1}^{N} W_i[w] Q_{it} Q_{jt}|_{x_{1i},\ldots,x_{ni}}. \quad (21)$$

$$a_{l_{i,0}} \approx \sum_{i=1}^{N} W_i[w] Q_{it}|_{x_{1i},\ldots,x_{ni}}. \quad (22)$$

$$a_{l_{0j}} \approx \sum_{i=1}^{N} W_i[w] Q_{jt}|_{x_{1i},\ldots,x_{ni}}. \quad (23)$$

Figure 8:
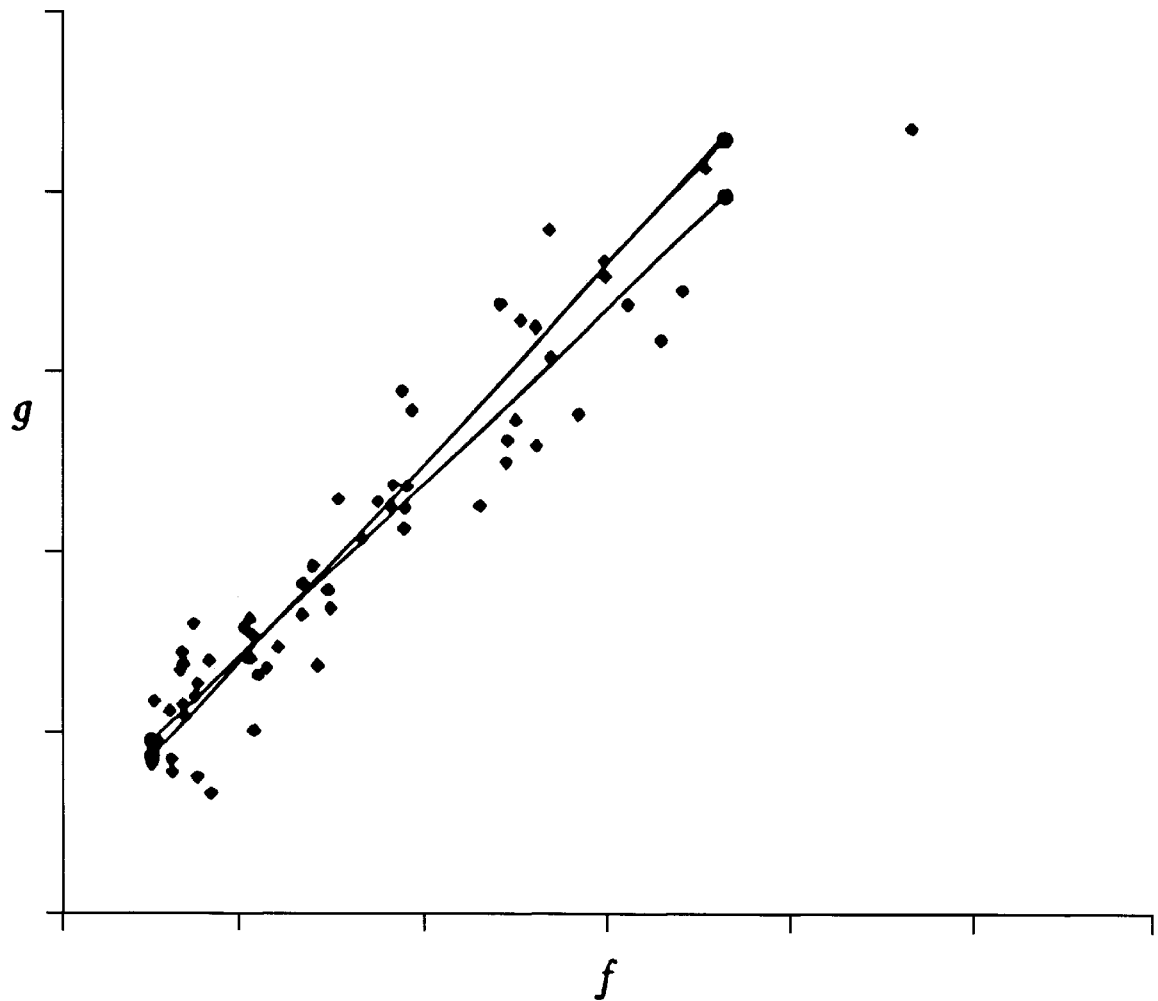
FIG. 8 illustrates sample results of discriminate g on f and f on g regression analysis in accordance with the present invention.

Generally speaking, now referring to FIG. 8, when this approximation is considered for error-affected data, assuming more than a single parameter is to be evaluated, each of the possible regressions will provide a different set of approximating parameters. FIG. 8 illustrates a variation of error-affected results between discriminate g on f and f on g regressions for a bivariate approximative function of the form G(Y)=AF(X)+B, assuming f=F(x) and g=G(y).

In the limit as the precision uncertainty approaches zero, g on f and f on g regressions should converge to a single representation. Traditional forms of g on f and f on g regressions will not necessarily converge. In contrast, considering the same limiting case, discriminate forms of g on f and f on g regressions analysis (which include appropriate forms of transformation weight factors as disclosed by this invention) consistently converge and, in the limit as the precision uncertainty approaches zero, will produce valid approximating parameters. Assuming errors in the fundamental variables to be negligible, discriminate forms of regression analysis will provide approximately the same solution set for each of the regressions. Single parameter solutions can be considered as valid. Two or more parameter solutions can be considered as valid if the relative errors over each variable domain can be considered as negligible for all the fundamental variables, $x_{ji}$. Two or more parameter solutions can also be considered valid if the relative errors in the term functions, $Q_{ji}$, with exception of the function cofactor of the resolute, $Q_{ml}$, can be considered as negligible. The following algorithms have been written in Fortran to provide characteristic instructional code for single parameter and two parameter bivariate and multivariate forms of discriminate regression analysis.

Discriminate single parameter regression analysis, subroutine SPRA:

```
subroutine SPRA(nopt,NDF,Npts,x,EV,Sflag,Ux)
! Perform DISCRIMINATE SINGLE PARAMETER REGRESSION ANALYSIS
!   to estimate an approximate value for EV.
! Assume a function of the form: EV-G(X(1),...,X(NDF)).
real*8 x(NDF,Npts)     ! Assume an Npts data point array
real*8 Ux(NDf,Npts)    ! with NDF variables for each point.
real*8 sumNEV,sumW,W,Wp,spv,G,EV
real*8 GX(8) !Dimension GX to accommodate NDF variables.
integer Sflag,flg,i,j,nopt,NDF,Npts,inv
! If nopt is 1, include the variable uncertainty, Ux.
Sflag=0                ! Preset null data flag.
inv=0                  ! Zero initial count of invalid data points.
```

```
W=1.0d0          ! >  A USER SUBROUTINE, GofX, is required to   <
                 ! >     provide values of the function, G,      <
                 ! >     and corresponding partial derivatives   <
                 ! >     as functions of the input values, x.    <
                 ! >  Required partial derivatives, GX) include  <
                 ! >     the partial of G with respect to each x. <
sumWEV=0.0d0     ! >  Set the GofX output flg to a nonzero       <
sumW=0.0d0       ! >     value when real, finite values cannot be <
do i=1,Npts      ! >     computed for the required parameters.  <
flg=0
Call GofX(x(1,i),G,GX,flg,EV)
! Note: Iteration has not been included in this version
! of single parameter regression analysis. It should
! not be necessary unless at least one of the function
! values G or GX is dependent upon EV.
if(flg.sq.0.) then
  Wp=1.0d0
  if(nopt.eq.1) then
    do j=1,NDF ! Compute the optional precision weight factor.
      if(Ux(j,i).ne.0.0d0) Wp=Wp*Ux(j,i)
    end do
    Wp=dabs(Wp)**(-2.0d0/dfloat(NDF))
  end if
  W=1.0d0    ! Preset transformation weight factor.
  do j=1,NDF                          ! Determine the product
    if(GX(j) .ne.0.0d0) W=W*GX(j)  !   of the derivatives.
  end do       ! Compute the overall weight factor.
  W=Wp*dabs(W)**(-2.0d0/dfloat(NDF))
  sumWEV=sumWEV+W*G     ! Form the sum of W*EV.
  sumW=sumW+W           ! Form the sum of W.
else
  inv=inv+1             ! Count invalid data points.
end if
end do
if(Npts.eq.inv) then
  Sflag=1
  EV=0.0d0
else
  EV=sumWEV/sumW
end if
return
end
```

Discriminate two parameter regression analysis, subroutine TRA:

```
subroutine TRA(N,x,y,A1,B1,A2,B2,flag,Ux,Uy)
!    NONLINEAR BIVARIATE REGRESSION ANALYSIS
! Determine the slope, and G intercept of the lines
!   G(X,Y)=A1*F(X,Y)+B1    and    G(X,Y)=A2*F(X,Y)+B2,
!   representing nonlinear G and F and F on G regressions.
real*8 x(N),Y(N)  ! Assume N point x and y input arrays with
! Inclusion of uncertainties. Ux and Uy, in x and y.
!   is optional.        ! Program modifications are required
real*8 Ux(N),Uy(N).   !  if Uncertainty is to be included.
real*8 A(2),B(2),F,G,FX,FY,GX,GY,of1,esi,eii,Adis,Bdis
real*8 A1,B1,A2,B2,c1,c2,c3,c4,c5,c6,c7,c8,c9,w,sgnl,Bexp
real*8 di1,di2,ds1,ds2,cf1,cf2,denom,dif,sdif
real*8 Gintercept,slope,slo
integer i,ic,nsc,inv,itno,it,flag,flg
  A(1)=A1        ! Preset previous G on F slope estimate.
  B(1)=B1        ! Preset previous G on F intercept estimate.
  A(2)=A2        ! Preset previous F on G slope estimate.
  B(2)=B2        ! Preset previous F on G intercept estimate.
  flag=0         ! Preset invalid regression flag to zero.
  of1=.999d36    ! Set largest computer acceptable magnitude.
  nsc=12         ! Set the number of iteration search cycles.
  it=-1          ! Preset the iteration flag.
  itno=1         ! Set regression iteration to G on F.
1 esi=of1        ! Preset slope iteration error.
  eii=of1        ! Preset intercept iteration error.
  Adis=of1       ! Preset slope discrepancy.
  Bdis=of1       ! Preset intercept discrepancy.
  ds2=A1-A(itno) ! Preset slope-estimate difference.
  di2=B1-B(itno) ! Preset intercept-estimate difference.
  ic=0           ! Preset iteration counter.
```

```
  inv=0          ! Zero initial count of invalid data points.
2 iv=inv         ! Store previous invalid data count.
  inv=0
  c1=0.0d0              ! Preset summations and weight factors.
  c2=0.0d0
  c3=0.0d0        ! >  A USER SUBROUTINE, FG, is required to  <
  c4=0.0d0        ! >     provide values of the functions, F, G, <
  c5=0.0d0        ! >     and corresponding partial derivatives <
  c6=0.0d0        ! >     as functions of the input values, X, Y. <
  W=1.0d0         ! >  Required partial derivatives include;    <
  cf=0.0d0        ! >     the partial of F with respect to X, FX, <
                  ! >     the partial of F with respect to Y, FY, <
                  ! >     the partial of G with respect to X, GX, <
                  ! >     the partial of G with respect to Y, GY. <
                  ! >  If required parameters are functions of   <
                  ! >     slope or intercept use estimated values <
                  ! >     for the slope A, and the intercept, B,  <
                  ! >     to Compute corresponding values for the <
                  ! >     required functions and partial derivatives. <
  do i=1,N        ! >  Set the FG output flag, flg, to a nonzero <
  flg=0           ! >     value when real, finite values cannot be <
                  ! >     computed for the required parameters.  <
  Call FG(x(i),y(i),F,G,FX,FY,GX,GY,flg,A,B)
  if(flg.eq.0) then       ! Include modified data points.
    if(FY*GY.ne.0.) it=1
    if(GX*FX.ne.0.) it=1         ! Set iteration flag.
    if(c1.eq.0.) then
      if(GX-FX*A(itno).ne.0. .and. GY-FY*A(itno).ne.0.) then
        cf=dlog(dabs(GX-FX*A(itno)))
        cf=cf+dlog(dabs(GY-FY*A(itno)))
        if(cf.lt.dlog(of1)/2.0d0) then
          cf=(GX-FX*A(itno))*(GY-FY*A(itno))  ! Determine the
```

```
      else                          ! weight factor
        cf=1.0d0                    ! normalization
      end if                        ! coefficients.
    end if
    cf1=FX*GY
    cf2=FY*GX
  end if
  if(cf.ne.0.) then      ! Determine the weight factor.
    W=dabs(cf/(GX-FX*A(itno))/(GY-FY*A(itno)))
  else
    if(cf1.ne.0.) then
      W=dabs(cf1/FX/GY)
    else
      if(cf2.ne.0.) then
        W=dabs(cf2/FY/GX)
      end if
    end if
  end if
  ! OPTIONAL INCLUSION:
  ! To normalize the weight factor on the uncertainty.
  !   include   W=W/Ux(i)/Uy(i) at this point.
  c1=c1+W    ! Form the sum of products and weight factors.
  c2=c2+W*F
  c3=c3+W*F*F
  c4=c4+W*F*G
  c5=c5+W*G
  c6=c6+W*G*G
  else
    inv=inv+1      ! Count invalid data points.
  end if
end do             ! Print invalid data warning.
if(iv.ne.inv) print 3,inv,N
3 format(x,i4,' invalid data points out of',i4)
if(c2.eq.0.) then
  c7=(c1*c3)
  c8=(c1*c4)
  c9=(c1*c6-c5*c5)
else
  c7=(c1/c2*c3-c2)
  c8=(c1/c2*c4-c5)
  c9=(c1/c2*c6-c5/c2*c5)
end if
if(c7.eq.0.) then
  if(c8.eq.0. .and. c9.eq.0.) then
    flag=1    ! Set invalid regression flag and return.
    if(inv.gt.N=2) flag=2
    ic=nsc+1
    print 4,'The regression is invalid, c7=c8=c9=0.'
4   format(2x,a44,i1)
    goto 5
  end if
  if(c9.ne.0.) sgnl=dsign(1.0d0,c9)
  if(c9*c8.ne.0.) sgnl=dsign(1.0d0,c9*c8)
  A1=sgnl*of1      ! Set infinite slope default value.
else                    ! Check conditions
  if(c8.eq.0. .and. c9.eq.0.) then    ! for zero slope.
    A1=0.0d0        ! Set zero slope.
    B1=0.0d0        ! Set intercept.
    A2=0.0d0
    B2=0.0d0
    goto 5          ! Exit if iteration is not required.
  end if
  A1=c8/c7
end if
if(c8.eq.0.) then
  A2=A1
else
  A2=c9/c8
end if
c10=c3*c5-c2*c4    ! Prepare to compute intercepts.
c11=c4*c5-c2*c6    ! Case C=|A|:      G intercept=B1.
B1=of1             ! Case C=|1/A|:    G intercept=B2.
if(c5.ne.0) B1=dsign(of1,c5)
if(c10.eq.0. .or. c11.eq.0.) B1=0.0d0
if(c10.eq.0. .and. c11.eq.0.) B1=c5/c1
B2=B1                         ! Assume a maximum intercept
if(c2.ne.0.) then             ! To prevent overflow.
  if(c7.ne.0. .and. c5/c2*c3-c4.ne.0.) then
    Bexp=dlog(dabs(c5/c2*c3-c4))-dlog(dabs(c7))
    if(Bexp.lt.dlog(of1)) B1=(c5/c2*c3-c4)/c7
  end if
  if(c8.ne.0. .and. c5/c2*c4-c6.ne.0.) then
    Bexp=dlog(dabs(c5/c2*c4-c6))-dlog(dabs(c8))
    if(Bexp.lt.dlog(of1)) B2=(c5/c2*c4-c6)/c8
  end if
else
  if(c1.ne.0. .and. c5.ne.0.) then
    Bexp=dlog10(dabs(c5))-dlog10(dabs(c1))
    if(Bexp.lt.dlog(of1)) B1=c5/c1
    B2=B1
  end if
end if
5 if(it.lt.0) return    ! Exit if iteration is not required.
  if(itno.eq.1) Slope=A1        ! Assume error in G only.
  if(itno.eq.1) Gintercept=B1
  if(itno.eq.2) slope=A2        ! Assume error in F only.
  if(itno.eq.2) Gintercept=B2
  ds1=ds2                       ! Prepare for iteration.
  ds2=slope-A(itno)
  di1=di2
  di2=Gintercept-B(itno)
  if(ds2.eq.0. .and. di2.eq.0.) goto 10
  if((dabs(di2).le.dabs(eii) .and. dabs(ds2).lt.dabs(esi)) .or.
    (dabs(di2).lt.dabs(eii) .and. dabs(ds2).le.dabs(esi))) then
    if(dabs(di2).lt.dabs(eii) .and. di2.ne.0.) ic=0   ! Reset
    if(dabs(ds2).lt.dabs(esi) .and. da2.ne.0.) ic=0   ! count.
    if(di2.ne.0) eii=di2    ! Store intercept iteration error.
    if(ds2.ne.0) esi=ds2    ! Store slope iteration error.
    Gin=Gintercept   ! Store closest value for intercept.
    slo=slope        ! Store closest value for slope.
    Bdis=di2         ! Store intercept discrepancy.
    Adis=ds2         ! Store slope discrepancy.
    vnu=v            ! Store value for nu.
    alp=alpha        ! Store value for alpha.
    dif=sdif         ! Store slope difference.
  end if
         ! Estimate successive approximations.
         ! using COMPARATIVE DIFFERENCES.
  if(ic.le.nsc .and. (ds2.ne.0. .or. di2.ne.0.)) then
    denom=(1.95d0+dble(ic)/dble(nsc)/10.0d0)
    if(dsign(1.0d0,di2)*di1.le.0.) then
      if(dsign(1.0d0,ds2)*ds1.le.0.) then
        A(itno)=slope-ds2/denom
        B(itno)=Gintercept-di2/denom
      else
        A(itno)=slope
        if(dabs(ds1).lt.dabs(ds2)) then
          A(itno)=slope-ds2-ds1/denom
          goto 7
        end if
      end if
    else
      if(dabs(di1).ge.dabs(di2)) B(itno)=Gintercept
      if((ds2.le.0. .and. ds1.gt.0.)
        .or. (ds2.ge.0. .and. ds1.lt.0.)) then
        if(dabs(di1).lt.dabs(di2)) goto 6
      else
        if(dabs(ds1).ge.dabs(ds2)) A(itno)=slope
        if(dabs(ds1).lt.dabs(ds2) .and. dabs(di1).lt.dabs(di2)) then
          A(itno)=slope-ds2-ds1/denom
6         B(itno)=Gintercept-di2-di1/denom
7         ds2=0.0d0
          di2=0.0d0
          ic=ic-1
        end if
      end if
    end if
    ic=ic+1
    if(ic.le.nsc) goto 2   ! Cycle through computations using
  end if                   ! updated values for the intercept.
8 A(itno)=slo-Adis         ! Set slope equal to best value.
  B(itno)=Gin-Bdis         ! Set intercept equal to best value.
  print 4,' ITERATION RESULTS:   Slope        Intercept'
  print 9,'       Estimated;',slope,Gintercept
  print 9,'        Computed;',slo,Gin
  if(ds2.ne.0. .or. di2.ne.0. .or. v.lt.0.)
  print 9,' Iteration error;',esi,eii
  print 9,'A(itno),1/A(itno) difference;',dif
9 format(2x,a17,2e15.7)
10 itno=itno+1             ! Set regression iteration to F on G.
```

```
if(itno.eq.2) goto 1    ! Repeat regression iteration.
A1=A(1)
A2=A(2)
B1=B(1)
B2=B(2)
return
end
```

Application of discriminate reduction data processing requires definition of approximative equations. Computer programs can certainly be devised to select appropriate equations from a choice of equations by employing forms of discriminate rectification as described in this disclosure. For most applications, selection of the appropriate form for the approximative equation and fundamental variables will be estimated or determined by preliminary analysis or theoretical investigation. Corresponding user or system defined instructional code may be utilized to provide control command logic to incorporate specific or interactive parametric relationships which represent approximative equations and corresponding derivatives. The following Fortran instructional code provides two examples of a user supplied subroutine, FG, that may be employed to characterize parametric relationships for corresponding bivariate two parameter applications.

EXAMPLE 1: (Considering the approximative equation Y=AlogX+B)

```
subroutine FG(x,y,F,G,FX,FY,GX,GY,flg,A,B)
! SAMPLE FG SUBROUTINE FOR ANALYSIS WITH
!           NONSKEWED VARIATION
!       ABOUT THE FUNCTION Y=A*logX+B
real*8 x,y,F,G,FX,FY,GX,GY,A,B
integer flg
flg=0
G=y           ! Compute G.
GY=1.0d0      ! Compute dG/dY.
GX=0.0d0      ! Compute dG/dX.
if(x.gt.0.0d0) then
  F=dlog(x)   ! Compute F.
  FX=1.0d0/x  ! Compute dF/dX.
  FY=0.0d0    ! Compute dF/dY.
else
  flg=1.      ! Set output flag for invalid data.
end if
return
end
```

EXAMPLE 2: (Considering the approximative equation Y=Ae$^x$+B)

```
subroutine FG(x,y,F,G,FX,FY,GX,GY,flg,A,B)
! SAMPLE FG SUBROUTINE FOR ANALYSIS WITH
!           NONSKEWED VARIATION
!       ABOUT THE FUNCTION Y=A*e**X+B
real*8 x,y,F,G,FX,FY,GX,GY,A,B
integer flg
flg=0
G=y                        ! Compute G.
GY=1.0d0                   ! Compute dG/dY.
GX=0.0d0                   ! Compute dG/dX.
F=2.71B2B1B2B460d0**x      ! Compute F.
FX=F                       ! Compute dF/dX.
FY=0.0d0                   ! Compute dF/dY.
return
end
```

Sectional Regression Analysis

Figure 9A:
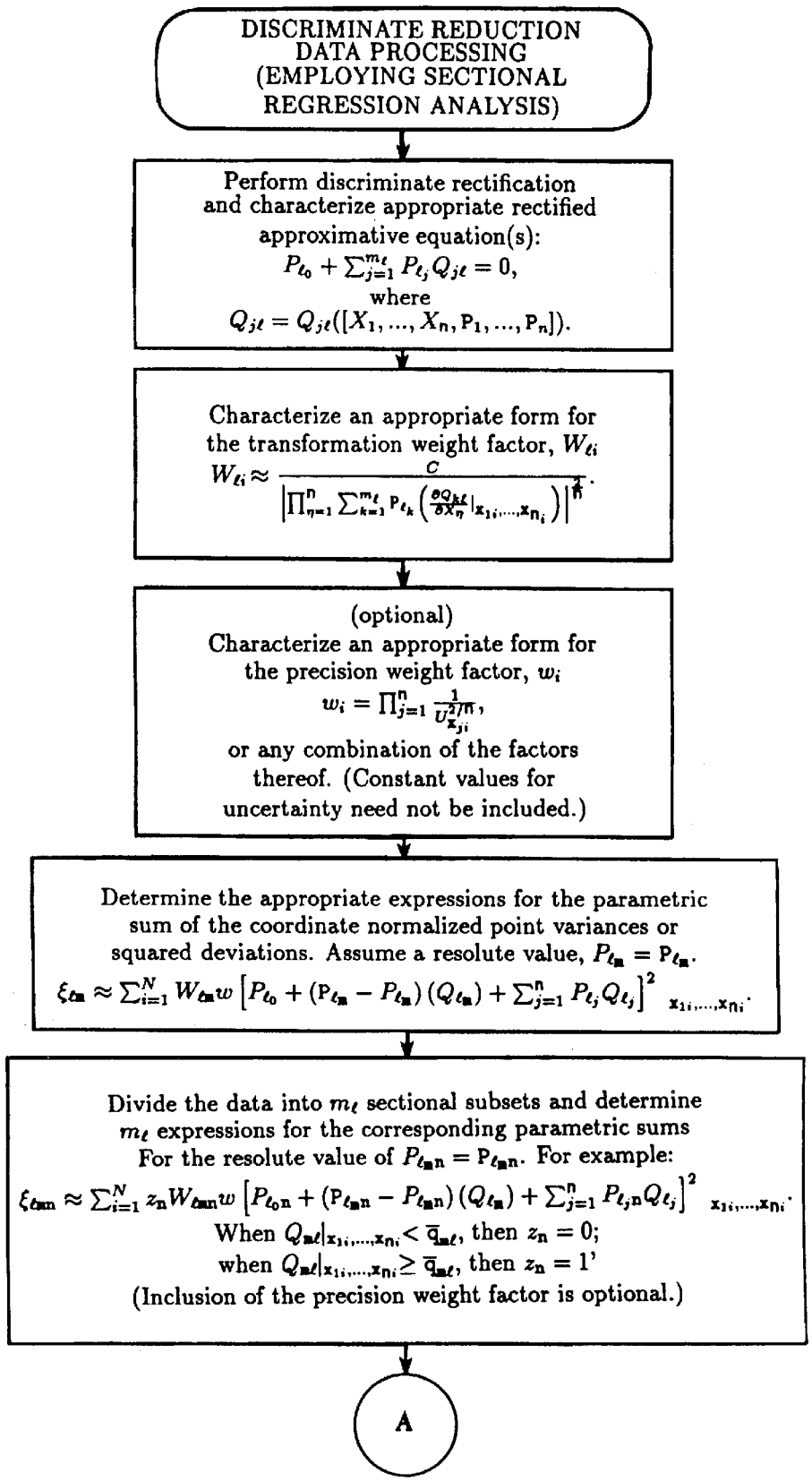
FIG. 9A and FIG. 9B are a flow diagram providing discriminate sectional regression analysis in accordance with the present invention.
Figure 9B:
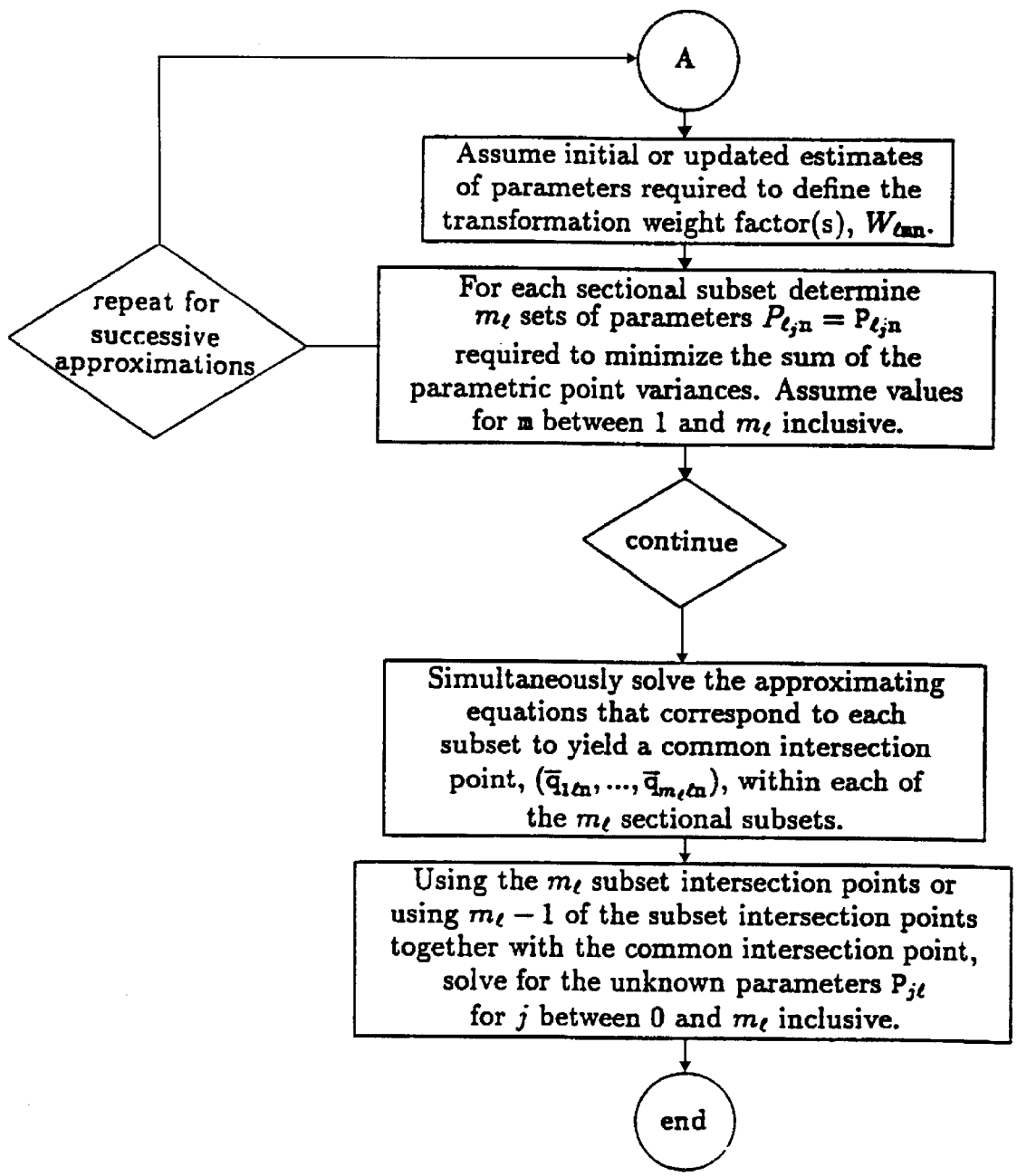

It is interesting to note that appropriately formulated regression solutions for bivariate or multivariate approximative equations of the form expressed by equation 15, with different coefficients selected as the resolute will intersect at a common point. With reference to FIG. 9, this point can be considered to represent valid approximating coordinates. In accordance with the present invention, by dividing the data into $m_l$ data sets, $m_l$ valid data points can be determined and the approximating equation, simultaneously represented by each of the points can also be determined. FIG. 9 is a flow diagram depicting discriminate reduction data processing employing sectional regression analysis. The process is viable, but of less consequence than other form of analysis provided herein. It can be quite convenient especially for two parameter evaluations. The following algorithm characteristic of the technique has been written in Fortran, as an example, to provide typical instructional code for two parameter bivariate and multivariate forms of sectional regression analysis.

Sectional two parameter regression analysis, subroutine sFIT:

```
Subroutine sfit(N,x,y,slope,Gintercept,flag)
! Employ SECTIONAL LEAST SQUARES APPROXIMATION to
!   determine the slope, and intercept of the line:
!           G(X,Y)=slope*F(X,Y)+Gintercept.
! of N input data point x and y of equal precision.
real*8 x(N),y(N) ! Assume a uniform distribution
real*8 A1,B1,A2,B2,slope,Gintercept
integer flag,N
A1=slope            ! Set predetermined estimates.
A2=slope            ! When iteration is required,
B1=Gintercept       ! predetermined estimates may
B2=Gintercept       ! provide faster convergence.
call TRA(N/2,x,y,A1,B1,A2,B2,flag)
if(flag.gt.0)return    ! Exit for invalid data.
if(A1.eq.A2)then
  call TRA(N,x,y,A1,B1,A2,B2,flag)
  if(A1.eq.A2)then
    slope=A1
    Gintercept=B1
    return
  end if
end if
x1=(B2-B1)/(A1-A2)  ! Determine first sectional point.
y1=(B2*A1-B1*A2)/(A1-A2)
Call TRA(N/2,x(n/2+1),y(N/2+1),A1,B1,A2,B2,flag)
if(flag.gt.0)return    ! Exit for invalid data.
if(A1.eq.A2)then
  call TRA(N,x,y,A1,B1,A2,B2,flag)
  if(A1.eq.A2)then
    slope=A1
    Gintercept=B1
    return
  end if
end if
x2=(B2-B1)/(A1-A2)  ! Determine second sectional point.
y2=(B2*A1-B1*A2)/(A1-A2)
if(x1-x2.ne.0.)then
  slope=(y1-y2)/(x1-x2)              ! Determine the slope.
  Gintercept=(x1*y2-x2*y1)/(x1-x2)   ! Determine intercept.
else
  flag=1
end if
return
end
```

Conformal Analysis

The word "conformal" as used herein is meant by the inventor to imply that approximating equations resulting from said conformal analysis will in general, referring now to FIG. 10 for example, conform to the data from which they are determined. To determine the appropriate approximating equation the representative sum of squared approximation deviations (normalized or unnormalized) should be minimized with respect to the initial constant and all coefficients, including the resolute. The initial steps of minimizing with respect to all the above mentioned parameters will produce an excess of one equation. In the process of regression analysis, one of the parameters is preset in advance to a constant value. (For example, the coefficient of the dependent variable is generally set equal to one.) The preset parameter is herein referred to as a resolute parameter, or a resolute, meaning a parameter which has been or can be assigned a pre-determined relative value.

A technique of consolidating equations has been discovered by the inventor which will allow representative sums to be minimized with respect to the resolute as well as the initial constant and all of the unknown coefficients. The process of conformal analysis is distinguished from regression analysis by incorporating the technique of consolidating equations to minimize also with respect to resolute parameters. Constant or fixed relative values for these parameters will be set during the minimizing process, after the evaluated partial derivatives have been equated to zero and after the resulting equations of restraint have been consolidated.

Conformal analysis includes:
1. taking partial derivatives of a representative sum with respect to both unknown and resolute parameters;
2. evaluating the partial derivatives using available data;
3. replacing the approximative parameters with approximating parameter representations, and equating the evaluated partial derivatives to zero to form a set of equations which describe the parameter dependent restraints;
4. consolidating the equations into a system of independent equations which will impose any interrelated resolute parameter restraints upon the unknown parameters;
5. assuming constant or relative values for the resolute parameters; and
6. solving the consolidated system of equations to evaluate the approximating parameters and to provide corresponding data representation.

The technique of consolidating equations in accordance with the present invention involves combining the equations which describe the resolute parameter restraints with the equations which describe the unknown parameter restraints so that interrelated resolute parameter restraints will be transferred to and included as additional restraints imposed upon the unknown parameters. The transferred restraints need no longer be considered. Resolute parameters can be set to constant or relative values, and the excess equations (which would impose restraints upon the resolute parameters) can be dropped from the system. There are various choices that can be made to select and/or define the resolute parameters. Also, there are numerous ways to combine the equations, at least two of which appropriately transfer the resolute parameter restraints to insure a valid reduction. Consider the following examples.

EXAMPLE 1

Assuming the form for the parametric sum of normalized datum variances as given by equation 15, the sum can be minimized with respect to the constant parameter, $P_0$, and all of the coefficients $P_{l_j}$. Equating the partial derivatives (evaluated using the available data points) to zero will yield equations 24 and 25.

$$\sum_{i=1}^{N} W_i([w_i]) \left( P_{l_0} + \sum_{j=1}^{m_l} P_{l_j} Q_{jl} \right) \Big|_{x_{1i},...,x_{ni}} = 0. \tag{24}$$

-continued $$\sum_{i=1}^{N} W_i([w_i]) Q_{kl} \left( P_{l_0} + \sum_{j=1}^{m_l} P_{l_j} Q_{jl} \right) \Big|_{x_{1i},...,x_{ni}} = 0, \tag{25}$$

$$k = 1, \ldots, m_l.$$

Equating all of the partial derivatives to zero will produce an excess of one equation. To obtain a solution, select a particular equation, k=m, which has been formed by minimizing with respect to a selected resolute nonzero coefficient. Form $m_l-1$ combined equations by subtracting the selected equation from each of the remaining $m_l-1$ similar equations. Drop the selected equation from the system. The resolute parameter, $P_{l_m}$ can then be set to an arbitrary value, and a solution can be obtained for the me remaining approximating parameters. The $m_l$ independent equations will take the form expressed by equations 26 and 27.

$$\sum_{i=1}^{N} W_i([w_i]) \left( P_{m_{l_0}} + \sum_{j=1}^{m_l} P_{m_{l_0}} Q_{jl} \right) \Big|_{x_{1i},...,x_{ni}} = 0. \tag{26}$$

$$\sum_{i=1}^{N} W_i([w_i])(Q_{kl} - Q_{ml}) \left( P_{m_{l_0}} + \sum_{j=1}^{m_l} P_{m_{l_0}} Q_{jl} \right) \Big|_{x_{1i},...,x_{ni}} = 0. \tag{27}$$

An m subscript has been included on $Pm_{l_k}$ to designate the selected resolute parameter. $P_{l_m}$. When this approach is taken, the expression for the coefficients will take a form similar to that of equations 17, 21, 22, and 23. The expression for $a_{l_{mj}}$ given by equation 21 needs to be modified to include the sum, $$\sum_{i=1}^{N} W_i([w_i]) Q_{ml} \frac{p_{m_{l_0}} + \sum_{j=1}^{m_l} p_{m_{l_j}} Q_{jl}}{p_{m_{lm}}} \Big|_{x_{1i},...,x_{ni}}.$$

The modified equations will take the form expressed by equations 28.

$$a_{l_{mj}} \approx \sum_{i=1}^{N} W_i([w_i]) Q_{ml} Q_{jl} - \tag{28}$$

$$\sum_{i=1}^{N} W_j([w_i]) Q_{ml} \frac{P_{m_{l_0}} + \sum_{j=1}^{m_l} P_{m_{l_j}} Q_{jl}}{P_{m_{lm}}} \Big|_{x_{1i},...,x_{ni}}.$$

Figure 10A:
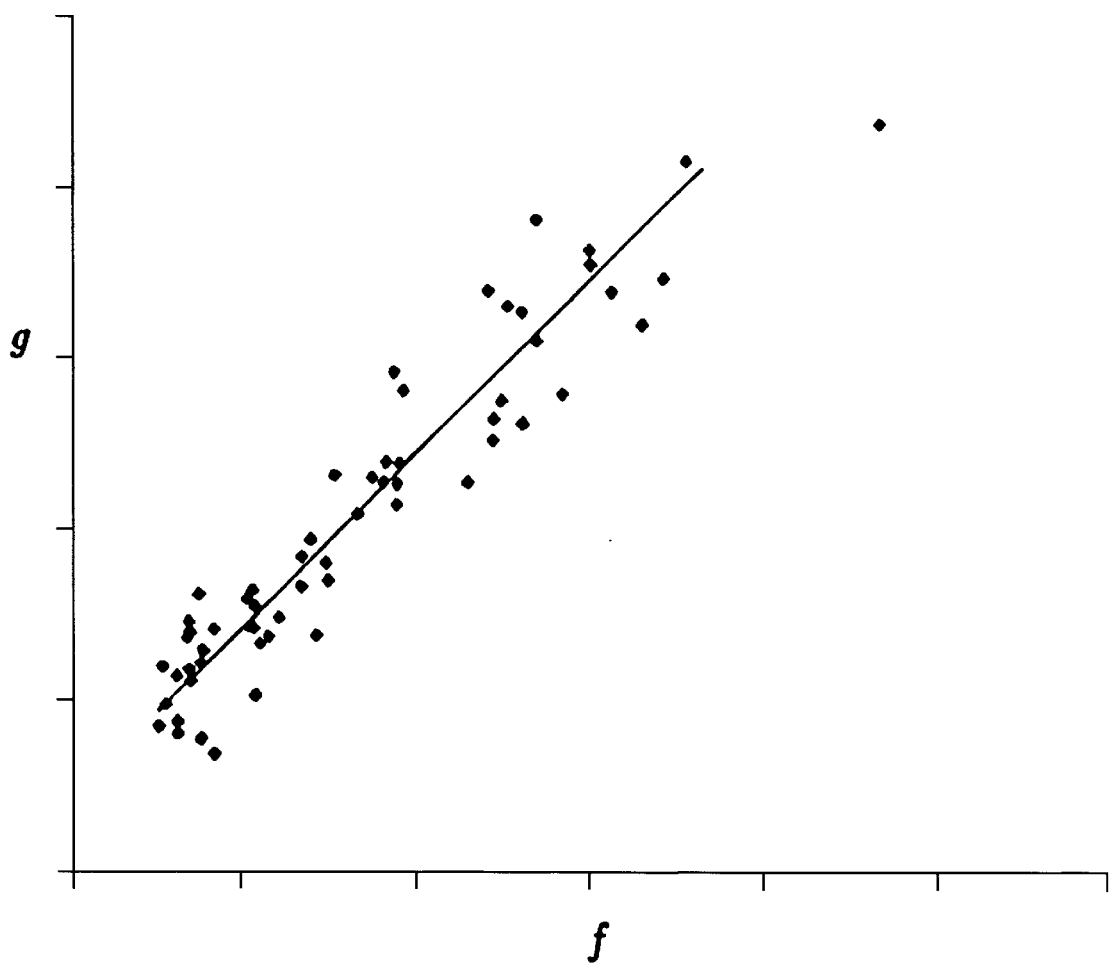
FIG. 10A and 10B illustrate graphic results from a two parameter bivariate application of conformal analysis in accordance with the present invention.
Figure 10B:
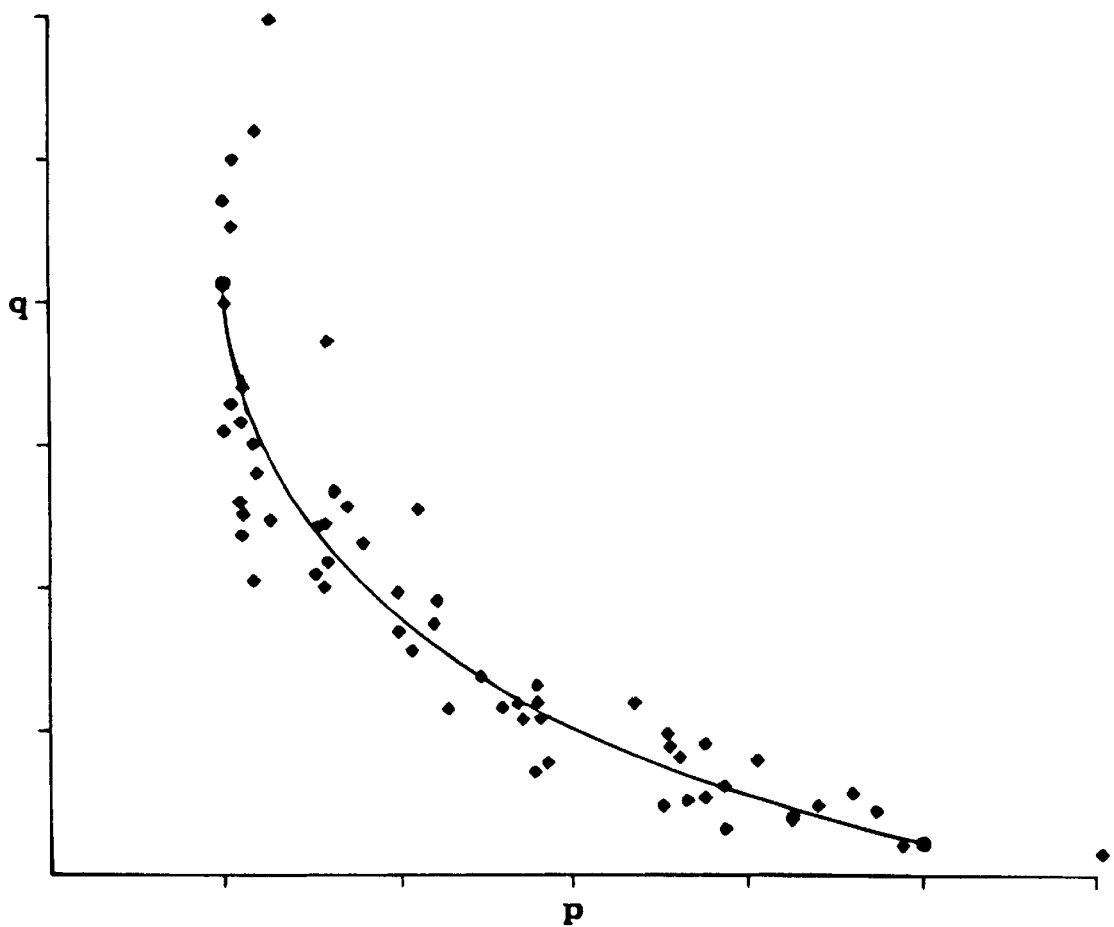

The solution to equations which are expressed in this form generally requires iteration. The related process of data reduction will be referred to as conformal analysis type 1 (or type 1 conformal analysis). FIG. 2B, as previously discussed, provides instructional code for multivariate type 1 conformal analysis. Discriminate forms of the reduction require appropriate normalization (including pertinent variant transformation and precision weight factor coordinate normalizing proportions). FIG. 10A illustrates results of a sample application of discriminate two parameter bivariate conformal analysis. (Results in FIG. 10A are provided in rectified form.) FIG. 10B presents the sample results transformed back to the original representative r s coordinate system. The following Fortran subroutine provides exemplary instructional code for two parameter type 1 conformal analysis.

Two Parameter Type 1 Conformal Analysis, subroutine TT1CA:

```
      subroutine TT1CA(n,x,y,slope,Gintercept,flag,Ux,Uy)
      !       TWO PARAMETER TYPE 1 CONFORMAL ANALYSIS
      !   Determine the slope, and G intercept of the function
      !              G(X,Y)=slope*F(X,Y)+Gintercept.
      real*8 x(N),y(N) ! Assume N point x and y input arrays with
      !   Inclusion of uncertainties, Ux and Uy, in x and y.
      !   is optional. Include the dimensions real Ux(N),Uy(N).
      real*8 A,B,F,G,FX,FY,GX,GY,of1,esi,eii,Adis,Bdis,v,vnu
      real*8 slo,slope,Gintercept,c1,c2,c3,c4,c5,c6,c7,c8,c9
      real*8 di1,di2,ds1,ds2,w,sgn1,Bexp,cf1,cf2,denom,dif,sdif
      integer i,ic,inv,it,nsc,flag,flg
      A=slope            ! Preset previous G on F slope estimate.
      B=Gintercept       ! Preset previous G on F intercept estimate.
      flag=0             ! Preset invalid regression flag to zero.
      of1=.999d36        ! Set largest computer acceptable magnitude.
      nsc=12             ! Set the number of iteration search cycles.
      it=-1              ! Preset the iteration flag.
1     esi=of1            ! Preset slope iteration error.
      eii=of1            ! Preset intercept iteration error.
      Adis=of1           ! Preset slope discrepancy.
      Bdis=of1           ! Preset intercept discrepancy.
      ds2=slope-A        ! Preset slope-estimate difference.
      di2=Gintercept-B   ! Preset intercept-estimate difference.
      ic=0               ! Preset iteration counter.
      inv=0              ! Zero initial count of invalid data points.
2     iv=inv             ! Store previous invalid data count.
      inv=0
      c1=0.0d0              ! Preset summations and weight factors.
      c2=0.0d0
      c3=0.0d0    ! >  A USER SUBROUTINE, FG, is required to   <
      c4=0.0d0    ! >  provide values of the functions, F, G,  <
      c5=0.0d0    ! >  and corresponding partial derivatives   <
      c6=0.0d0    ! >  as functions of the input values, X, Y. <
      W=1.0d0     ! >  Required partial derivatives include;   <
      cf=0.0d0    ! >  the partial of F with respect to X, FX, <
                  ! >  the partial of F with respect to Y, FY, <
                  ! >  the partial of G with respect to X, GX, <
                  ! >  the partial of G with respect to Y, GY. <
                  ! >  If required parameters are functions of <
                  ! >  slope or intercept use estimated values <
                  ! >  for the slope A, and the intercept, B,  <
                  ! >  to Compute corresponding values for the <
                  ! >  required functions and partial derivatives. <
      do i=1,N    ! >  Set the FG output flag, flg, to a nonzero <
       flg=0      ! >  value when real, finite values cannot be  <
                  ! >  computed for the required parameters.     <
       Call FG(x(i),y(i),F,G,FX,FY,GX,GY,flg,A,B)
       if(flg.eq.0) then         ! Include modified data points.
        if(FY*GY.ne.0.) it=1
        if(GX*FX.ne.0.) it=1     ! Set iteration flag.
        if(cf.eq.0.) then
         if(GX-FX*A.ne.0. .and. GY-FY*A.ne.0.) then
          cf=dlog(abs(GX-FX*A))
          cf=cf+dlog(abs(GY-FY*A))
          if(cf.lt.dlog(of1)/2.0d0) then
           cf=(GX-FX*A)*(GY-FY*A)   ! Determine the
          else                      ! weight factor
           cf=1.0d0                 ! normalization
          end if                    ! coefficients.
         end if
         cf1=FX*GY
         cf2=FY*GX
        end if
        if(cf.ne.0.) then           ! Determine the weight factor.
         W=dabs(cf/(GX-FX*A)/(GY-FY*A))
        else
         if(cf1.ne.0.) then
          W=dabs(cf1/FX/GY)
         else
          if(cf2.ne.0.) then
           W=dabs(cf2/FY/GX)
          end if
         end if
        end if
      ! OPTIONAL INCLUSION:
      !   To normalize the weight factor on the uncertainty.
      !   include W=W/Ux(i)/Dy(i) at this point.
        c1=c1+W                   ! Form the sum of products and weight factors.
        c2=c2+W*F
        c3=c3+W*F*F
        c4=c4+W*F*G
        c5=c5+W*G
        c6=c6+W*G*G
        if(A.ne.0.0d0) c4=c4+W*(-G*G/A+F*G+G*B/A)
       else
        inv=inv+1                 ! Count invalid data points.
       end if
      end do                      ! Print invalid data warning.
      if(iv.ne.inv) print 3,inv,N
3     format(x,i4,' invalid data points out of',i4)
      if(c2.eq.0.) then
       c7=(c1*c3)
       c8=(c1*c4)
       c9=(c1*c6-c5*c5)
      else
       c7=(c1/c2*c3-c2)
       c8=(c1/c2*c4-c5)
       c9=(c1/c2*c6-c5/c2*c5)
      end if
      if(c7.eq.0.) then
       if(c8.eq.0. .and. c9.eq.0.) then
        flag=1    ! Set invalid regression flag and return.
        if(inv.gt.N-2) flag=2
        ic=nsc+1
        print 4,'The regression is invalid, c7=c8=c9=0.'
4       format(2x,a44,i1)
        goto 5
       end if
       if(c9.ne.0.) sgn1=dsign(1.0d0,c9)
       if(c9*c8.ne.0.) sgn1=dsign(1.0d0,c9*c8)
       slope=sgn1*of1             ! Set infinite slope default value.
      else                        ! Check conditions
       if(c8.eq.0. .and. c9.eq.0.) then    ! for zero slope.
        slope=0.0d0               ! Set zero slope.
        Gintercept=0.0d0          ! Set intercept.
        goto 5                    ! Exit if iteration is not required.
       end if
       slope=c8/c7
      end if
      c10=c3*c5-c2*c4             ! Prepare to compute intercepts.
      c11=c4*c5-c2*c6
      Gintercept=of1
      if(c5.ne.0.) Gintercept=dsign(of1,c5)
      if(c10.eq.0. .or. c11.eq.0.) Gintercept=0.0d0
      if(c10.eq.0. .and. c11.eq.0.) Gintercept=c5/c1
      if(c2.ne.0.) then           ! To prevent overflow.
       if(c7.ne.0. .and. c5/c2*c3-c4.ne.0.) then
        Bexp=dlog(dabs(c5/c2*c3-c4))-dlog(dabs(c7))
        if(Bexp.lt.dlog(of1)) Gintercept-(c5/c2*c3-c4)/c7
       end if
      else
       if(c1.ne.0. .and. c5.ne.0.) then
        Bexp-dlog10(dabs(c5))-dlog10(dabs(c1))
        if(Bexp.lt.dlog(of1)) Gintercept=c5/c1
       end if
      end if
5     ds1=ds2                     ! Prepare for iteration.
      ds2=slope-A
      di1=di2
      di2=Gintercept-B
      if(ds2.eq.0. .and. di2.eq.0.) goto 10
      if((dabs(di2).le.dabs(eii) .and. dabs(ds2).lt.dabs(esi)) .or.
     .   (dabs(di2).lt.dabs(eii) .and. dabs(ds2).le.dabs(esi))) then
       if(dabs(di2).lt.dabs(eii) .and. di2.ne.0.) ic=0    ! Reset
       if(dabs(ds2).lt.dabs(esi) .and. ds2.ne.0.) ic=0    ! count.
        if(di2.ne.0) eii=di2      ! Store intercept interation error.
        if(ds2.ne.0) esi=ds2      ! Store slope iteration error.
        Gin=Gintercept            ! Store closest value for intercept.
        slo=slope                 ! Store closest value for slope.
        Bdis=di2                  ! Store intercept discrepancy.
        Adis=ds2                  ! Store slope discrepancy.
        vnu=v                     ! Store value for nu.
        alp=alpha                 ! Store value for alpha.
        dif=sdif                  ! Store slope difference.
      end if         ! Estimate successive approximations.
                     !   using COMPARATIVE DIFFERENCES.
      if(ic.le.nsc .and. (ds2.ne.0. .or. di2.ne.0.)) then
```

-continued

```
          denom=(1.95d0+dble(ic)/dble(nsc)/10.0d0)
          if(dsign(1.0d0,di2)*di1.le.0.) then
            if(dsign(1.0d0,ds2)*ds1.le.0.) then
              A=slope-ds2/denom
              B=Gintercept-di2/denom
            else
              A=slope
              if(dabs(ds1).lt.dabs(ds2)) then
                A=slope-ds2-ds1/denom
                goto 7
              end if
            end if
          else
            if(dabs(di1).ge.dabs(di2)) B=Gintercept
            if((ds2.le.0. .and. ds1.gt.0.)
            .or. (ds2.ge.0. .and. ds1.lt.0.)) then
              if(dabs(di1).lt.dabs(di2)) goto 6
            else
              if(dabs(ds1).ge.dabs(ds2)) A=slope
              if(dabs(ds1).lt.dabs(ds2) .and. dabs(di1).lt.dabs(di2)) then
                A=slope-ds2-ds1/denom
6               B=Gintercept-di2-di1/denom
7               ds2-0.0d0
                di2=0.0d0
                ic=ic-1
              end if
            end if
          end if
          ic=ic+1
          if(ic.le.nsc) goto 2    ! Cycle through computations using
        end if                     ! updated values for the intercept.
8       A=slo-Adis  ! Set slope equal to best value.
        B=Gin-Bdis  ! Set intercept equal to best value.
        print 4,' ITERATION RESULTS:   Slope        Intercept'
        print 9,'          Estimated;',slope,Gintercept
        print 9,'          Computed;',slo,Gin
        if(ds2.ne.0. .or. di2.ne.0. .or. v.lt.0.)
        print 9,' Iteration error;',esi,eii
        print 9,'A,1/A difference;',dif
9       format(2x,a17,2e15.7)
10      slope=A
        Gintercept=B
        return
        end
```

EXAMPLE 2

The following form of Conformal Analysis, type 2, may for some applications reduce or eliminate need for iteration. (Iteration may still be required to include appropriate transformation weight factors.) The reduction employs an assumption of one additional parameter, and requires one additional row and one additional column in the solution determinants. The sum of the expressed coordinate-normalized datum variances is minimized with respect to the initial constant, $P_0$, all of the coefficients $P_{l_j}$, and one additional parameter, $P_c$, selected as the resolute. (The additional parameter need not be defined.) Equating the partial derivatives to zero will yield equations 29 through 31.

$$\sum_{i=1}^{N} W_i([w_i]) \left( P_{l_0} + \sum_{j=1}^{m_l} P_{l_j} Q_{jl} \right) \bigg|_{x_{1i},\ldots,x_{ni}} = 0. \tag{29}$$

$$\sum_{i=1}^{N} W_i([w_i]) Q_{kl} \left( P_{l_0} + \sum_{j=1}^{m_l} P_{l_j} Q_{jl} \right) \bigg|_{x_{1i},\ldots,x_{ni}} = 0. \tag{30}$$

$$k = 1, \ldots, m_l.$$

$$\sum_{i=1}^{N} W_i([w_i]) \frac{\partial}{\partial P_\zeta} \left( P_{l_0} + \tag{31}$$

-continued $$\sum_{k=1}^{m_l} P_{l_k} Q_{kl} \right)_{P_\zeta} \left( P_{l_0} + \sum_{j=1}^{m_l} P_{l_j} Q_{jl} \right) \bigg|_{x_{1i},\ldots,x_{ni}} = 0.$$

Equating the first derivatives to zero provides an excess of one equation. To obtain a solution form combined equations by subtracting equation 31 from each of the equations 30. Then, drop equation 31 from the system. The resolute parameter, $P_c$, can be assumed to be represented by a constant value, and an explicit solution can be obtained for the $m_l+1$ unknown parameters. The $m_l+1$ independent equations will take the form expressed by equations 32 and 33.

$$\sum_{i=1}^{N} W_i([w_i]) \left( P_{l_0} + \sum_{j=1}^{m_l} P_{l_j} Q_{jl} \right) \bigg|_{x_{1i},\ldots,x_{ni}} = 0. \tag{32}$$

$$\sum_{i=1}^{N} W_i([w_i]) \left[ Q_{kl} - \tag{33}$$

$$\frac{\partial}{\partial P_\zeta} \left( P_{l_k} + \sum_{k=1}^{m_l} P_{l_k} Q_{kl} \right)_{P_\zeta} \right] \left( P_{l_0} + \sum_{j=1}^{m_l} P_{l_j} Q_{jl} \right) \bigg|_{x_{1i},\ldots,x_{ni}} = 0.$$

The expression providing explicit solution for the coefficients in correspondence with the resolute will take the form given by equation 34.

$$\frac{\begin{vmatrix} a_{l_{0,0}} & \cdots & a_{l_{k-1,0}} & 0 & a_{l_{k+1,0}} & \cdots & a_{l_{ml,0}} \\ a_{l_{0,1}} & \cdots & a_{l_{k-1,1}} & a_\zeta & a_{l_{k+1,1}} & \cdots & a_{l_{ml,1}} \\ \cdots & \cdots & \cdots & \cdots & \cdots & \cdots & \cdots \\ a_{l_{0,ml}} & \cdots & a_{l_{k-1,ml}} & a_\zeta & a_{l_{k+1,ml}} & \cdots & a_{l_{ml,ml}} \end{vmatrix}}{\begin{vmatrix} a_{l_{0,0}} & \cdots & a_{l_{ml,0}} \\ \cdots & \cdots & \cdots \\ a_{l_{0,ml}} & \cdots & a_{l_{ml,ml}} \end{vmatrix}} \tag{34}$$

The matrix elements, $a_{l_{ij}}$, $a_{l_{i,0}}$, $a_{l_{0j}}$, and $a_c$, are given by equations 35 through 38.

$$a_{l_{ij}} \approx \sum_{i=1}^{N} W_i[w] Q_{il} Q_{jl} \big|_{x_{1i},\ldots,x_{ni}}. \tag{35}$$

$$a_{l_{i,0}} \approx \sum_{i=1}^{N} W_i[w] Q_{il} \big|_{x_{1i},\ldots,x_{ni}}. \tag{36}$$

$$a_{l_{0j}} \approx \sum_{i=1}^{N} W_i[w] Q_{jl} \big|_{x_{1i},\ldots,x_{ni}}. \tag{37}$$

$$a_\zeta \approx \tag{38}$$

$$\sum_{i=1}^{N} W_i([w_i]) \frac{\partial}{\partial P_\zeta} \left( P_{l_0} + \sum_{k=1}^{m_l} P_{l_k} Q_{kl} \right)_{P_\zeta} \left( P_{l_0} + \sum_{j=1}^{m_l} P_{l_j} Q_{jl} \right) \bigg|_{x_{1i},\ldots,x_{ni}}.$$

The relative amplitude of parameter, $a_c$, seems to be of the same order of magnitude as the sum the coordinate-normalized error and function deviations. It is a relative constant, and therefore., can be replaced by any constant nonzero (generally quite small) value. For simple applications the solution to equation 34 will not require iteration. If the relative error (including function deviation and computational error) is equal to zero (or excessively small) corresponding explicit solution will be indeterminate. The Fortran instructional code of APPENDIX 2 provides a selection of either type 1 or type 2 conformal analysis. The included provisions provide for explicit solution in correspondence with express value for a resolute.

In accordance with the present invention it should noted that for type 2 conformal analysis the denominator of equation 34 is also a relative constant which need not be evaluated nor included in provision to determine relative solution. A determinant equation for relative solution as provided by type 2 conformal analysis can therefore be expressed as by equation 39.

$$P_{l_k} = \begin{vmatrix} a_{l_0,0} & \cdots & a_{l_{k-1},0} & 0 & a_{l_{k+1},0} & \cdots & a_{l_{ml},0} \\ a_{l_0,1} & \cdots & a_{l_{k-1},1} & a_\zeta & a_{l_{k+1},1} & \cdots & a_{l_{ml},1} \\ \cdots & \cdots & \cdots & \cdots & \cdots & \cdots & \cdots \\ a_{l_0,ml} & \cdots & a_{l_{k-1},ml} & a_\zeta & a_{l_{k+1},ml} & \cdots & a_{l_{ml},ml} \end{vmatrix}. \quad (39)$$

The element $a_{l_{0,0}}$ is the sum or integral sum of the products of the weight factor coordinate normalizing proportions, $\Sigma_{i=1}^{N} W_i[w]$. The elements $a_{l_{ij}}$, $a_{l_{i,0}}$, and $a_{l_{0,j}}$, for values of i and j between 1 and $m_l$, are given respectively by equations 35, 36, and 37, or integral forms of the same. Relative solution as provided by conformal analysis type 2 and represented by equation 39 includes the distinct advantages of (a) not requiring resolution of the square matrix coefficient determinant,
(b) providing for the evaluation of parameters when the relative error including function deviation is negligible, and
(c) providing for the evaluation of zero valued coefficients without requiring reduction in number of matrix elements as would be required to prevent dividing by a zero valued coefficient determinant.

The amplitude of parameter, $a_c$, can be set to any relative value that will provide a solution set within system operational limits.

Type 2 conformal analysis used to for linear applications or used to process appropriately selected data samples can be provided so as not to require iteration.

Nested Parameter Evaluation

Discriminate reduction data processing can often be utilized to evaluate all included approximative parameters (including parameters that may be nested within terms of the approximative equation) by considering a parameter-corrected sum of coordinate-normalized datum variances as represented by the sum of the squares of a first order parametric Taylor series representation of coordinate normalizing approximation deviation, written in terms of first order corrections, $\Delta p_k$, to the estimated parameters, $P_k$. Consider the sum of the coordinate-normalized datum variances as given by equation 15. Employing a first order parametric Taylor series representation of parameter-corrected approximation deviation, the estimated sum will take the general form expressed by equation 40.

$$\xi \approx \sum_{i=1}^{N} W_i([w]) \left\{ p_{l_0} + \sum_{j=1}^{m_l} p_{l_j} Q_{jl} + \sum_{k=1}^{n} \Delta p_k \frac{\partial}{\partial P_k} \left[ P_{l_0} + \sum_{j=1}^{m_l} P_{l_j} Q_{jl} \right] \bigg|_{P_k} \right\}^2 \bigg|_{x_{1i},\cdots,x_{ni}} \quad (40)$$

By associating terms, as expressed by equation 41, the represented sum is provided in form which is readily adapted for discriminate reduction data processing.

$$\xi \approx \quad (41)$$

$$\sum_{i=1}^{N} W_i([w]) \left[ P_{l_0} + \sum_{j=1}^{m_l} P_{l_j} Q_{jl} + \sum_{k=1}^{n_{ij}} \Delta p_{jkl} P_{l_j} \left( \frac{\partial Q_{jl}}{\partial P_{jkl}} \bigg|_{P_{jkl}} \right) \right]^2 \bigg|_{x_{1i},\cdots,x_{ni}},$$

Each $P_{jkl}$ represents one of $n_{l_j}$ corrected nested parameters (equal to $p_{jlk} + \Delta p_{jkl}$) which are imbedded within in the corresponding term function, $Q_{jl}$. Approximations of first order corrections, $\Delta p_{jkl}$ to the estimated nested parameters, $p_{l_{j,k}}$, appear as factors along with respective term coefficients, $P_{l_j}$, to form composite coefficients, $P_{l_j} \Delta p_{l_{j,k}}$, for the partial derivatives, $$\frac{\partial Q_{jl}}{\partial P_{jkl}},$$

which are evaluated for $P_{jkl} = p_{jkl}$, at the error-affected datum coordinate location, $x_{1i}, \ldots, x_{ni}$.

The approximate first order corrections can be evaluated by minimizing to evaluate both the composite coefficients and the term coefficients and dividing the resultant composite coefficients by the corresponding term coefficients, as in APPENDIX 5. The approximated corrections are used to update the nested parameter estimates. (Reasonable initial estimates must be provided for each of the nested parameters.) Coefficients, if provided as initial estimates, must be quite accurate and must be consistent with both the data and the estimated nested parameters as well as the approximative equation. If initial estimates of coefficients are to be included, it may be advantageous to minimize with respect to the first order corrections, rather than the composite coefficients. When minimizing with respect to the first order corrections, estimated term coefficients are multiplied by the corresponding evaluated term derivatives to form the function cofactors of the first order corrections that are to be evaluated. Representative approximating parameters are obtained by iteration, assuming convergence to a unique solution (or assuming initial estimates are sufficiently accurate to afford convergence to an appropriate solution).

Real time Discriminate Reduction Data Processing Including Selective Data Sampling Real time data can sometimes be represented by orthogonal time dependent term functions. Assuming negligible error, and considering the form of the approximative equation to accurately represent the real time data, the first time derivative of the incoming signal should be directly proportional to the evaluated time derivative of the approximation deviation. Hence, as the first time derivative of the incoming signal goes to zero, the corresponding transformation weight factors will approach infinity. Considering continuously proportionate weighting of the relative deviation as represented by the real time signal, if all data points were to be included, only data points with zero slopes will contribute appropriately to the final results. By digitizing the data only at zero crossings of the first time derivative of the incoming signal, both orthogonality and discriminate coordinate normalization can be preserved without including the inverse of zero time derivatives in the formulation. Provision for the appropriate sampling circuitry and A to D trigger control as specified for at-zero-derivative data sampling is included in FIG. 5A and FIG. 5B. A similar provision is included with the switching circuitry of FIG. 6.

It should be noted that traditional orthogonal transforms which are considered for application in discriminate reduction data processing provide term function coefficient evaluation, not traditional coefficient band analysis, and consequently require selective data sampling and/or inclusion of transformation weight factors. Term coefficient evaluation also requires an assumed explicit form for the approximative equation. Valid application of orthogonal transforms to forms of discriminate reduction data processing would require orthogonality over the considered interval for all included term functions except cofactors of the resolute. For assumed orthogonality the off-diagonal time dependent matrix elements, $a_{l_{ij}} = \Sigma_{i=1}^{N}(W_i[w])Q_{if}(t_i)Q_{jf}(t_i)$, where i≠j, should vanish, providing for diagonal determinant solutions. Coefficients of orthogonal term functions need not be evaluated simultaneously. Coefficient band analysis may be included as a step in the preliminary discriminate rectification process to estimate the relevant terms that are or should be considered for inclusion in the provided approximative equation. Including any non-constant weight factor proportions in the approximative equation will generally negate natural orthogonality.

According to the present invention, one alternative to sampling data only at the zero crossings of the first time derivative is to sample data at points whereby the first time derivative or preferably, whereby the absolute value of the first time derivative of the incoming signal corresponds to a to preset value. These forms of data sampling are referred to by the inventor as at-set-derivative data sampling. At-zero-derivative data sampling is also a form of at-set-derivative data sampling. At-set-derivative data sampling provides the advantage of not requiring time related transformation weight factor coordinate normalizing proportions, and when used in conjunction with traditional regression analysis or in conjunction with conformal analysis type 2, they can provide a useful tool of transformation without iteration.

At-set-derivative sampling may also provide for sampling corresponding to more than one value for the derivative and thereby provide sets of data samples which can be individually processed and combined by averaging to formulate values for approximating parameters. If time limitations prevent sampling at more than one set value for the derivative, the data signal can be split and simultaneously passed through multiple sampling circuitry providing at-multiple-derivative data sampling.

Forms of at-set-derivative data sampling, with exception of at-zero-derivative data sampling, are also considered as forms of between-zero-derivative data sampling. According to the present invention, another alternative to sampling data only at the zero crossings of the first time derivative is to sample data between said zero crossings. Circuitry typical of equal interval between-zero-derivative data sampling is illustrated in FIG. 5A and FIG. B and included in FIG. 6. Discriminate reduction data processing of the between-zero-derivative data points also requires explicit form for the approximative equation and sufficient storage allocation and precision to provide for determinant resolution.

Forms of non-equal-interval sampling, also provided by the switching circuitry of FIG. 6, may be useful to reduce skew in time domain uncertainty distributions that may be introduced by traditional equal interval sampling.

Discriminate Analog Data Processing Including Selective Data Sampling

Referring again to FIG. 1, in consideration of real time discriminate reduction data processing as may be provided by the analog processor or circuitry 13, with an included final stage discriminate rectifier, and the function generator 12, for certain specific applications, namely, when the form of the incoming signal is known to be represented adequately by the approximative equation, and subject to limitations imposed by zero valued function derivatives, the present invention can be embodied to include the following:

1. formulation of time related transformation weight factor coordinate normalizing proportions as analog output provided by the operations of final stage discriminate rectification;

2. formulation of the sum of time and/or spatially related transformation weight factor coordinate normalizing proportions as analog integration of the output of the final stage discriminate rectifier;

3. formulation of the integrated sum of the product of time related transformation weight factor coordinate normalizing proportions and evaluated term functions as may be provided by an analog function generator and/or incoming data. Evaluating the approximating parameters from the integrated sums as formulated can be provided also by analog circuitry, but more likely will be provided by analog-to-digital conversion and digital processing. Division by zero can be avoided by included limits of the analog circuitry, and/or preferably, by integrating between zero crossings of the first time derivative, and summing piecewise continuous integrations so as to avoid regions of discontinuity that would be imposed on the data by including the inverse of zero in the formation of transformation weight factor coordinate normalizing proportion. Exemplary integral form for a determinant solution providing relative type 2 conformal analysis is expressed by equation 42.

$$P_{l_k} = \begin{bmatrix} \Sigma\int W_i dt & \ldots & \Sigma\int W_i Q_{k_f-1} dt & 0 & \Sigma\int W_i Q_{k_f+1} dt & \ldots & \Sigma\int W_i Q_{ml} dt \\ \Sigma\int W_i Q_{1l} dt & \ldots & \Sigma\int W_i Q_{k_f-1} Q_{1l} dt & a_\zeta & \Sigma\int W_i Q_{k_f+1} Q_{1l} dt & \ldots & \Sigma\int W_i Q_{ml} Q_{1l} dt \\ \ldots & \ldots & \ldots & \ldots & \ldots & \ldots & \ldots \\ \Sigma\int W_i Q_{ml} dt & \ldots & \Sigma\int W_i Q_{k_f-1} Q_{ml} dt & a_\zeta & \Sigma\int W_i Q_{k_f+1} Q_{ml} dt & \ldots & \Sigma\int W_i Q_{ml} Q_{ml} dt \end{bmatrix} \quad (42)$$

45

The included summations provide for intermittent integrations as interrupted by function discontinuities. They need not be included for continuous integrations.

Iteration Techniques

Now referring to FIG. 11A, FIG. 11B and FIG. 11C, as providing two parameter iteration, and considering also multiple parameter iteration 41, as included in APPENDIX 1, both of these forms of iteration, as incorporated into the exemplary reduction instructional code. require the designation of the number of search cycles to be allowed between improved results 76. Variation between repeated iteration cycles is insured by including a variable divisor in the extrapolation ratio 80. Successive approximations for both illustrated forms of iteration are determined by updating parameters based upon comparison of previous differences 81. Selections of best estimates 78 for the two parameter iterations are determined by the smallest differences encountered between estimated and computed values. Two parameter iterations may actually be determined by either the disclosed two parameter or the disclosed multiple parameter iteration processes. Selections of best estimates for the multiple parameter iterations are determined by the smallest value encountered for the average coordinate-normalized datum variance. For each of these examples, estimates are based upon a history providing means to compare at least two successive differences 77 between approximations and corresponding computed values.

Successive estimates for the two parameter iterations are based upon the table 82 which is included in FIG. 11A through FIG. 11C. The technique of estimating successive approximations for multiple parameter iterations is somewhat more involved. In accordance with the present invention, the projection of estimates to provide successive approximations includes the following:

1. If the history of differences is not available new estimates are set equal to the most recently computed values, the history of differences is established, the iteration count is incremented, and the iteration is continued.
2. If the absolute value of any current differences are smaller than the absolute value of previous ones, corresponding new estimates are set equal to the most recently computed values. The history of differences is maintained, the iteration count is incremented, and the iteration is continued.
3. If the absolute value for none of the current differences are smaller than previous ones, but the sign of one or more of the current differences is opposite to the previous sign, corresponding new estimates are extrapolated between the computed values and previous estimates. The iteration is continued. The history of differences is maintained, and the iteration count is incremented.
4. If the signs of any current differences are the same as the signs of the previous ones and the significant changes in differences are increasing in magnitude, corresponding new estimates are extrapolated back to reduce expected differences. The iteration is continued, but the history of differences is not maintained, and the iteration count is not incremented.
5. When improved estimates are encountered (as in these examples by comparative estimate differences or by direct or by indirect consideration of estimated values for the average normalized datum variance as provided for alternate applications) the improved values are stored and the iteration counter is reset to zero 79. The divisor of the extrapolation ratio is set to a value of approximately two, but slightly modified between each iteration cycle to prevent repetition 80. Further documentation of the iteration processes can be found embedded within the included Fortran instructional code.

Determinant resolution

The method pivotal condensation has been employed to provide determinant resolution for the included examples. This algorithm as included in APPENDIX 4 is efficient and accurate when used to resolve determinants with a small number of elements and limited dynamic range. Modifications are incorporated in the instructional code to improve the exponent range by utilizing column and row product logarithm normalization which provides larger variations between the magnitude of the included elements. The value of the determinant is expressed as the antilog of the logarithm of the determinant coefficient multiplied by the sign. Results of the determinant evaluation are maintained in logarithm form until they have been combined with results of other determinant evaluations to form solutions to the matrix equations. See APPENDIX 3 for sample instructional code to combine determinant evaluations thus formed into solution sets for matrix equations.

Evaluation of Power term Coefficients

Figure 12:
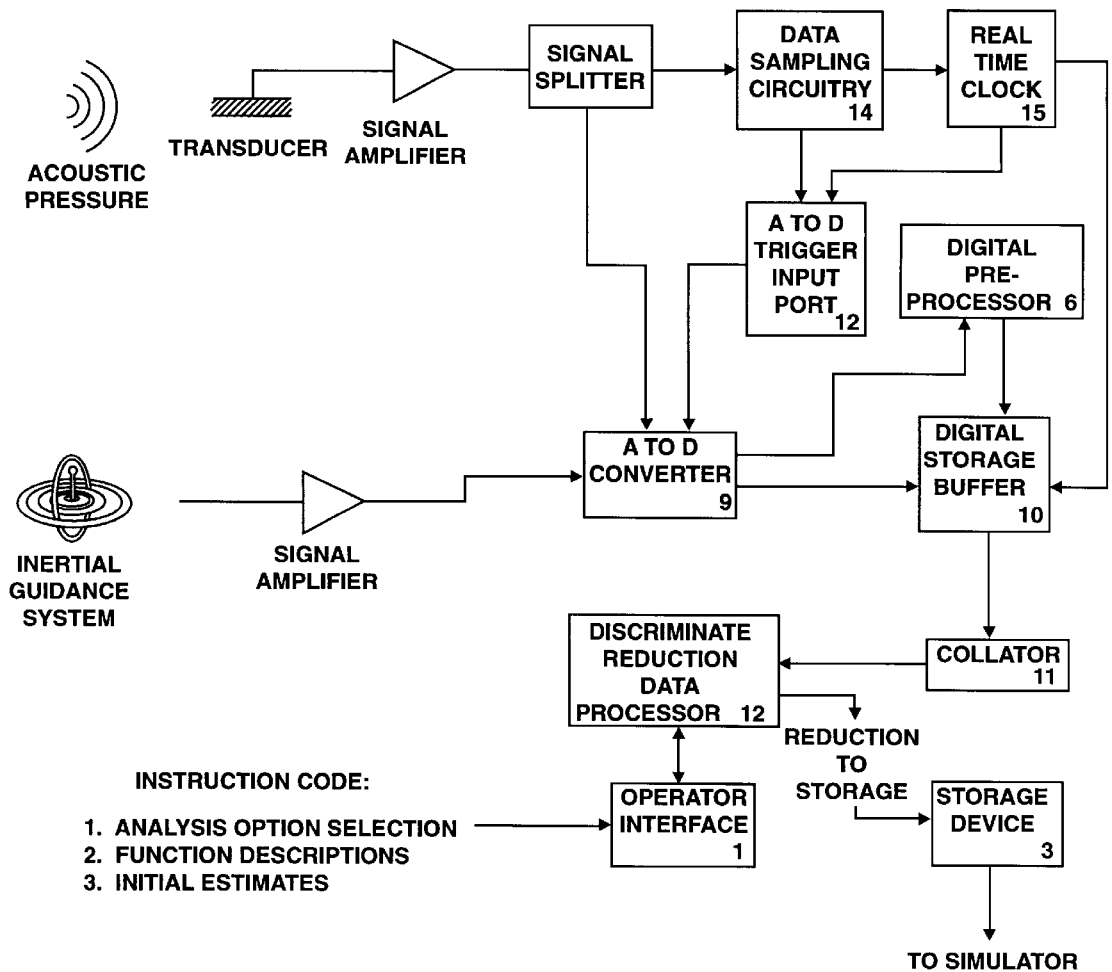
FIG. 12 illustrates an acoustic data acquisition and sequential reduction analysis system for providing velocity dependent representations of non-stationary hydroacoustic data for associated frequency bands in accordance with the present invention.

The following application according to this invention and considered with reference to FIG. 12, describes a data acquisition and sequential reduction analysis system designed to utilize discriminate reduction data processing to provide a representative description of velocity dependent frequency band sound pressure levels of an accelerating flow excited test vehicle. The application includes 1. transforming acoustical sound pressure levels (generated by the accelerating test vehicle as a nonstationary function of time) to the frequency domain;
2. collating the real and imaginary transform coefficients at each frequency as a function of velocity, U;
3. transferring the resultant velocity dependent time series transform coefficients to the discriminate reduction data processor to provide velocity dependent power term coefficients corresponding to each included frequency band; and
4. storing the power term coefficients as representative of the real and imaginary components of the transformed data.

Simulated band auto and cross spectral levels can be construction or reconstruction by specifying velocities and evaluating and combining power term components.

FIG. 12 illustrates the data acquisition portion of the system. Sound pressure is detected and converted to an electrical signal by an acoustical transducer. The electrical signals are amplified and passed through an analog input port, A to D converter 9 and digital preprocessor 6 and stored in a digital storage buffer 10. Simultaneously, velocity is determined by an inertial guidance system, converted to an electrical signal, amplified, digitized, and similarly stored. FIG. 12 depicts an implemented discriminate reduction data processing system. The digitized acoustical signal is initially transformed to the frequency domain in the digital preprocessor by means of a Fourier transform. The real and imaginary transform coefficients collated with the digitized velocity information, together with initial estimates, and data base support documentation as provided by the collator 11 are passed to the DRDP 2 according to system or user instructional code or control command logic which is consistent with the acquisition and preprocessing equipment of FIG. 12, as provided. A Fortran subroutine, as per this example, with call name retrieve can be provided to afford compatibility with the instructional code of APPENDIX 6.

```
Subroutine RETRIEVE
! Sample instructional code, including alternate application
!  instructions, set up to supply of data that is to be
!  represented by a power series approximative equation
!  of the form:
! P(1)Y+P(2)X**P(2+NoP/2)+...+P(NoP/2)X**P(NoP)+P(1+NoP/2)=0.
! Nopt is the selected option.
!  Set Nopt=0 when precision uncertainty is not required.
!  Set Nopt=1 when precision uncertainty is included.
!  Set Nopt=2 when evaluated function derivatives are
!   provided in place of or as cofactors with supplied
```

```
!    precision uncertainy.
!    Set Nopt=3 to apply alternative weight factors as provided
!       by system peripheral analog and/or digital equipment.
!  NDF is the number of pertinent degrees of freedom.
!  Npts is the number of provided data points in the
!     data array, x( ).
!  Ux( ) is the array of derivatives, cofactors, precision
!  uncertainty or alternative weight factors, as designated
!  by the option selection.
common/data/Nopt,NDF,Npts,x,Ux
integer i, Nopt,NDF,Npts
!-----------------------------------------------------------
! DIMENSION FOR THE APPROPRIATE NUMBER OF DEGREES OF FREEDOM
!    AND TH NUMBER OF SELECTED DATA POINTS:
real*8 x(2,100),Ux,(2,100)
!-----------------------------------------------------------
! SUPPLY APPROPRIATE PARAMETERS:
Nopt=0       ! Set option not to include precision uncertainty
NDF=2        ! Set the number of variable degrees of freedom.
Npts=100     ! State the number of available data points.
!-----------------------------------------------------------
! THE USER SUBROUTINE, ACQUISYS, CONSIDERED AS INCLUDED, MAY SERVE
!   AS MEANS TO PROVIDE INSTRUCTIONAL CODE FOR CONTROL COMMAND LOGIC
!   TO EFFECTUATE THE INITIALIZING PROCESS OF SAMPLE ACQUISITION
!   AND DATA TRANSPOSITION AS NEEDED TO RETRIEVE DATA, TO COLLATE
!   DATA, AND TO STORE DATA IN MEMORY, AS WELL AS TO ASSIGN DATA
!   SAMPLES AND REQUIRED DERIVATIVES, COFACTORS, PRECISION
!   UNCERTAINTY, OR SYSTEM PROVIDED WEIGHT FACTORS TO ARRAYS
!   x( ) and Ux( ), AS DESIGNATED BY THE SELECTED OPTIONS, FOR
!   IMPLEMENTATION OF DISCRIMINATE REDUCTION DATA PROCESSING.
call ACQUISYS(Npts,x,Ux)
return
end
```

Output from the system is provided in the form of evaluated initial constants and term coefficients corresponding to an approximating equation of the form $\phi = P_0 + P_1 U^2 + P_2 U^4 + P_3 U^6 + \ldots$. The actual number of term coefficients are designated along with other initializing parameters as by the following instructional code.

Parameter designation subroutine, Paramset:

```
subroutine PARAMSET
! A sample program designed to supply initializing parameters
!   for a power series approximative equation of the form:
! P(1)Y+P(2)X**2+P(3)X**4+P(4)X**6+RP0=0.
! Nco is the number of coefficients.
! Nnp is the number of nested parameters.
! Nt( ) is an integer array designating the term functions
!   which contain the corresponding nested parameters.
! RPn( ) is the array of estimated nested parameters.
!   During execution this array of values will be reset
!   with successive approximations.
common/Par/Nco,Ncp,Nt,RPn
integer i,Nco,Nnp,Nt(3)
real*8 RPn(3)
Nco=4    ! Set the number of coefficients.
Nnp=0    ! Set the number of nested parameters to be evaluated.
if(Nnp.gt.0) then
  do i=1,Nnp
    Nt(i)=i+1   ! Set nested parameter term coefficient designations.
  end do
end if
RPn(1)=6.0d0      ! Set exponents.
RPn(2)=4.0d0
RPn(3)=2.0d0d0
return
end
```

The above parameter designation subroutine is provided as example set up for evaluating bivariate term coefficients, but not precluding use of the system for more elaborate multivariate applications and/or nested parameter evaluations.

The following Fortran subroutine illustrates sample instructional code which can be used to define power term functions and derivatives for the reduction process with provision included (as an example) for nested parameter evaluation.

Power Term Functions and Derivatives, sample Subroutine QofX:

```
subroutine QofX(N,x,Q,QX,flg,RP,RP0)
! This sample user subroutine is designed to provide function
!   values and derivatives for a power series approximative
!   function of the form:
!   P(1)Y+P(2)X**P(2+NoP/2)+...+P(NoP/2)X**P(NoP)+P(1+NoP/2)=0.
!   Nop=N+1
! Input:
!   N is the (odd) number of coefficients in the rectified
!     approximation deviation including both the dependent
!     and independent term coefficients and the composite
!     coefficients of the corrected Taylor series representation.
!   The lower case x represents the assumed error-affected
!     datum. It should be dimensioned to accommodate both
!     dependent and independent variables, inclusive of
!     the two pertinent variable degree of freedom.
!   RP and RP0 are provided input from SCE.
! Output:
!   Q represents subscripted functions of the selected rectified
!     form, that is, RP(1)Q(1)+...RP(Nco)Q(Nco)+RP0=0.
!   QX represents the derivatives of the subscripted functions.
!   The integer, flg, is a flag that is to be set to 1 when the
!     subscripted functions or their derivatives can not be
!     determined.
! Optional input:
!   RP is the rectified form for the coefficients.
!   RP0 is the rectified form for the zero offset.
! Common:
!   Nco is the number of term coefficients
!   Nnp is the number of nested parameters
!   RPn is the array of nested parameter estimates.
!   Nt is an integer array designating the term that contains
!     each nested parameter.
common/Par/Nco,Nnp,Nt,RPn
```

-continued

```
! Dimensions should be set to accommodate the appropriate number
! of parameters and degrees of freedom.
real*8 Q(7),x(2),QX(7,2),RP(7),RP0,RPn(3)
integer i,N,Nnp,NoP,Nco,flg,Nt(3)
flg=0                    ! Preset flg to 0 for valid data.
if(x(1).le.0) flg=1      ! Accept only positive values for x(1).
if(flg.eq.1) return      ! Exit for invalid data.
  do i=2,Nco
    Q(i)=x(1)**Rpn(i-1)
    QX(i,1)=RPn(i-1)*x(1)**(RPn(i-1)-1.0d0)
    QX(i,2)=0.0d0
  end do
Q(1)=x(2)
QX(1,1)=0.0d0
QX(1,2)=1.0d0
! When N is greater than Nco then preparation needs to be
! made for nested parameter evaluation. The following
! instructional code example provides term function
! derivatives for nested parameter evaluation.
if(N.gt.Nco) then
  do i=Nco+1,N
    Q(i)=dlog(x(1))*x(1)**RPn(i-Nco)
    QX(i,1)=x(1)**(RPn(i-Nco)-1)*(1+RPn(i-Nco)*dlog(x(1)))
    QX(i,2)=0.0d0
  end do
end if
return
end
```

The output parameters are stored for future applications. Single channel data reductions provide for simulated auto spectra. Multiple channel data reductions provide for simulated auto spectra and also cross spectra, coherence, and phase.

The various forms of discriminate data processing and associated equipment as disclosed by this invention should provide for many automated and semi-automated forms of data acquisition and reduction processing. Applications are numerous. Modifications and variations of the invention will no doubt be required as the process is adapted to satisfy specific and general needs. Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

What is claimed is:

1. A memory for storing information for access by an application program being executed on a data processing system, said memory comprising a data representation of intermittent measure and related sample time;

said intermittent measure representing at least one analog signal;

said intermittent measure providing at-set-derivative digital representation of a plurality of measures of said at least one analog signal;

said memory comprising said plurality of measures as transformed from analog representation to corresponding digital format and stored in said memory;

at least one measure of said plurality of measures being transformed from analog representation to digital representation at a determined instant;

said digital representation being converted to said digital format and stored in said memory;

said instant being determined by a changing value for the first time derivative of said analog signal corresponding within processing accuracy to a predetermined value;

said data representation being stored in said memory and including information resident in a database used by said application programs;

said data representation being generated by the method comprising:

accessing and selectively sampling real time data by analog-to-digital conversion and simultaneously acquiring representation of time;

performing analog signal preprocessing including signal differentiation and criteria-related signal conditioning for providing automatic triggering; and performing said analog-to-digital conversion of incoming data at data-related time intervals, whereby recurrent sampling specificity is regulated corresponding to at least one selected value for the change in said real time data with respect to time;

said at least one selected value corresponding to said predetermined value;

wherein said at least one measure is transformed by means including means for said automatic triggering at said instant;

said means for said automatic triggering including:

means for encountering said predetermined value for the derivative of said analog signal;

means for establishing said instant relative to said analog signal; and means for executing said triggering at said instant within processing accuracy.

2. A memory as in claim 1, wherein said performing analog signal preprocessing includes processing real time data whereby representation of at least one transformation weight factor coordinate normalizing proportion is generated, said representation of at least one transformation weight factor coordinate normalizing proportion being generated by the method comprising:

accessing at least some said information which provides representative measure for at least one derivative; and subjecting said representative measure to operations including absolute value rectification, whereby numerical correspondence to said derivative is effectively converted to represent at least one positive value;

said at least one positive value, as considered within said processing accuracy, substantially corresponding in proportion to the absolute value of the inverse of said derivative being raised to a power other than two.

3. A memory as in claim 1, wherein:

said means for accessing and sampling real time data includes between-set-derivative data sampling circuitry whereby said sampling is restrained in correspondence with said at least one selected set value for the change in said real time data with respect to time; and said simultaneously acquiring representation of time includes acquiring information which will provide one-to-one correspondence between said triggerings of said analog-to-digital conversion and relative sample time.

4. A memory as in claim 1, wherein:

said means for accessing and sampling real time data includes at-set-derivative data sampling circuitry, said sampling occurring at a nonconstant sampling rate, said sampling occurring in correspondence with said at least one selected set value for the change in said real time data with respect to time; and said simultaneously acquiring representation of time includes acquiring representation of relative time between at least some unequal interval triggerings of said analog-to-digital conversion.

5. A memory as in claim 1, wherein:

said plurality of measures comprises a plurality of instantaneous measures of said analog signal transformed to digital form and stored in said memory; and said instantaneous measures are transformed from said analog representation at respectively corresponding points at which said changing value for the first time derivative of said analog signal corresponds within processing accuracy to said predetermined value.

6. A memory as in claim 5, wherein said performing analog signal preprocessing includes processing real time data whereby representation of at least one transformation weight factor coordinate normalizing proportion is generated, said representation of at least one transformation weight factor coordinate normalizing proportion being stored in said memory.

7. A memory as in claim 6, wherein:

said representation of at least one transformation weight factor coordinate normalizing proportion is an analog signal;

said represented measure is real time analog data; and said at least one positive value is included in a continuum of positive values which are represented by a rectified analog signal, said rectified analog signal being continuous over at least one time interval wherein the amplitude of said rectified analog signal proportionately corresponds to the absolute value of the inverse of the said derivative being raised to a power other than two.

8. A memory as in claim 7, wherein said data representation includes representation of at least two integrated sums, said representation of at least two integrated sums being generated by the method comprising:

formulating at least one analog signal which is the product of at least two analog signals, one of said at least two analog signals being said rectified analog signal;

integrating at least one said rectified analog signal and at least one said product of at least two analog signals, over said at least one interval of time; and sampling integrated analog signals at said data-related time intervals.

9. A memory as in claim 5, wherein said simultaneously acquiring representation of time includes acquiring representation of relative time between at least some unequal interval triggerings of said analog-to-digital conversion.

10. A selective data sampling device, comprising:

means for accessing and selectively sampling real time data by analog-to-digital conversion and simultaneously acquiring representation of time;

circuitry for analog signal preprocessing; and means for triggering said analog-to-digital conversion for providing at-set-derivative digital representation for a plurality of measures of at least one analog signal;

wherein at least one measure of said plurality of measures is transformed from analog representation to digital representation at an instant which is determined by the first time derivative of said analog signal corresponding within processing accuracy to a predetermined value;

wherein said analog signal preprocessing includes signal differentiation and criteria-related signal conditioning for triggering said analog-to-digital conversion of incoming data at data-related time intervals, whereby recurrent sampling specificity is regulated corresponding to at least one selected value for the change in said real time data with respect to time;

wherein said circuitry includes at-set-derivative data sampling circuitry whereby:

said sampling is not pre-set to equal time interval sampling;

said triggering occurs in correspondence with at least one selected set value as the derivative of said incoming data; and said simultaneously acquiring representation of time includes acquiring representation of relative time between at least some triggerings of said analog-to-digital conversion; and wherein said means for triggering includes:

means for encountering said predetermined value for the derivative of said analog signal;

means for establishing said instant relative to said analog signal; and means for executing said triggering in correspondence with said instant and within processing accuracy.

11. A selective data sampling device as in claim 10, wherein said circuitry includes at-multiple-derivative data sampling circuitry whereby said incoming data is provided in parallel components to a plurality of signal-conditioning circuitry paths, each said circuitry path individually providing a means to effectuate distinct analog-to-digital sampling for one of at least two of said parallel components over the same time interval.

12. A selective data sampling device as in claim 11, wherein said circuitry includes bioline sampling circuitry whereby said incoming data corresponding to positive and negative derivatives are sampled respectively by at least two different said circuitry paths, each providing means of analog-to-digital conversion.

13. A selective data sampling device as in claim 10, wherein said circuitry includes between-set-derivative data sampling circuitry whereby:

said triggering is restrained in correspondence to at least one selected value as the derivative of said incoming data; and said simultaneously acquiring representation of time includes acquiring information which will provide one-to-one correspondence between said triggerings of said analog-to-digital conversion and relative sample time.

14. A selective data sampling device as in claim 10, wherein switching is provided between at least two forms of data sampling.

15. A selective data sampling device as in claim 10, wherein said at-set-derivative data sampling circuitry is at-zero-derivative data sampling circuitry whereby said triggering occurs in correspondence with a value of zero as the derivative of said incoming data.

16. A selective data sampling device as in claim 10, whereby said triggering occurs in correspondence with at least one selected value as the absolute value of the derivative of said incoming data.

17. A selective data sampling device, comprising:

means for accessing and selectively sampling real time data by analog-to-digital conversion and simultaneously acquiring representation of time; and circuitry for analog signal preprocessing;

said analog signal preprocessing including signal differentiation and criteria-related signal conditioning for triggering said analog-to-digital conversion of incoming data at data-related time intervals, whereby recurrent sampling specificity is regulated corresponding to at least one selected value for the change in said real time data with respect to time;

wherein said circuitry includes at-set-derivative data sampling circuitry whereby:

said sampling is not equal time interval sampling;

said triggering occurs in correspondence with at least one selected set value as the derivative of said incoming data; and said simultaneously acquiring representation of time includes acquiring representation of relative time between at least some unequal interval triggerings of said analog-to-digital conversion;

wherein said at-set-derivative data sampling circuitry is at-zero-derivative data sampling circuitry whereby said triggering occurs in correspondence with a value of zero as the derivative of said incoming data.

18. A selective data sampling device, comprising:

means for accessing and selectively sampling real time data by analog-to-digital conversion and simultaneously acquiring representation of time; and circuitry for analog signal preprocessing;

said analog signal preprocessing including signal differentiation and criteria-related signal conditioning for triggering said analog-to-digital conversion of incoming data at data-related time intervals, whereby recurrent sampling specificity is regulated corresponding to at least one selected value for the change in said real time data with respect to time;

wherein said circuitry includes at-set-derivative data sampling circuitry whereby:
said sampling is not equal time interval sampling;
said triggering occurs in correspondence with at least one selected set value as the derivative of said incoming data; and
said simultaneously acquiring representation of time includes acquiring representation of relative time between at least some unequal interval triggerings of said analog-to-digital conversion;

whereby said triggering occurs in correspondence with at least one selected value as the absolute value of the derivative of said incoming data.

19. A selective data sampling device, comprising:

means for accessing and selectively sampling real time data by analog-to-digital conversion and simultaneously acquiring representation of time; and circuitry for analog signal preprocessing;

said analog signal preprocessing including signal differentiation and criteria-related signal conditioning for triggering said analog-to-digital conversion of incoming data at data-related time intervals, whereby recurrent sampling specificity is regulated corresponding to at least one selected value for the change in said real time data with respect to time;

wherein said circuitry includes at-set-derivative data sampling circuitry whereby:
said sampling is not equal time interval sampling;
said triggering occurs in correspondence with at least one selected set value as the derivative of said incoming data; and
said simultaneously acquiring representation of time includes acquiring representation of relative time between at least some unequal interval triggerings of said analog-to-digital conversion;

wherein said circuitry includes at-multiple-derivative data sampling circuitry whereby said incoming data is provided in parallel components to a plurality of signal-conditioning circuitry paths, each said circuitry path individually providing a means to effectuate distinct analog-to-digital sampling for one of at least two of said parallel components over the same time interval;

wherein said circuitry includes bioline sampling circuitry whereby said incoming data corresponding to positive and negative derivatives are sampled respectively by at least two different said circuitry paths, each providing means of analog-to-digital conversion.

20. A selective data sampling device, comprising:

means for accessing and selectively sampling real time data by analog-to-digital conversion and simultaneously acquiring representation of time; and circuitry for analog signal preprocessing;

said analog signal preprocessing including signal differentiation and criteria-related signal conditioning for triggering said analog-to-digital conversion of incoming data at data-related time intervals, whereby recurrent sampling specificity is regulated corresponding to at least one selected value for the change in said real time data with respect to time;

wherein said circuitry includes between-set-derivative data sampling circuitry whereby:
said triggering is restrained in correspondence to at least one selected value as the derivative of said incoming data; and
said simultaneously acquiring representation of time includes acquiring information which will provide one-to-one correspondence between said triggerings of said analog-to-digital conversion and relative sample time;

wherein said between-set-derivative data sampling circuitry is between-zero-derivative data sampling circuitry whereby said triggering is restrained in corresponds to zero value as the derivative of said incoming data.

* * * * *